US012633963B2

(12) United States Patent
Zhang

(10) Patent No.: US 12,633,963 B2
(45) Date of Patent: May 19, 2026

(54) SYSTEM AND METHOD FOR IMPROVING TRANSMISSION IN SATELLITE AND LOW POWER COMMUNICATION NETWORKS

(71) Applicant: The Florida State University Research Foundation, Inc., Tallahassee, FL (US)

(72) Inventor: Zhenghao Zhang, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 18/791,708

(22) Filed: Aug. 1, 2024

(65) Prior Publication Data

US 2025/0055499 A1     Feb. 13, 2025

Related U.S. Application Data

(60) Provisional application No. 63/518,440, filed on Aug. 9, 2023.

(51) Int. Cl.
H04B 1/00 (2006.01)
H04B 1/69 (2011.01)
(52) U.S. Cl.
CPC ....... H04B 1/69 (2013.01); *H04B 2001/6912* (2013.01)
(58) Field of Classification Search
CPC .......................... H04B 1/69; H04B 2001/6912
USPC .......................................................... 375/139
See application file for complete search history.

(56) References Cited

U.S. PATENT DOCUMENTS

| 7,773,664 B2 | 8/2010 | Myers | |
| 2014/0086280 A1* | 3/2014 | Huang | H04L 27/103 |
| | | | 375/139 |
| 2023/0209555 A1* | 6/2023 | Sosnin | H04L 5/0053 |
| | | | 370/329 |
| 2024/0106683 A1* | 3/2024 | Crompton | G06N 3/08 |

OTHER PUBLICATIONS

RPMA Technology, Available online at URL—https://www.ingenu.com/technology/rpma, 6 pages, Retrieved on Apr. 15, 2025.

(Continued)

*Primary Examiner* — Helene E Tayong
(74) *Attorney, Agent, or Firm* — Mamie Carlin & Curfinan LLC

(57) ABSTRACT

A novel wireless technology, referred to as ZChirp, is proposed. ZChirp is based on the chirp modulation that has been used in the past, but with the key distinction of multiplying the chirp with a binary sequence called the Z sequence, which serves dual purposes. First, chirps multiplied with different Z sequences have very low cross-correlations, which significantly reduces demodulation errors due to interference and allows for multiple access. Second, a node can double the communication speed by multiplying different Z sequences depending on the data. Real-world experiments prove that multiplying the chirp with the Z sequence does not increase bandwidth usage or reduce the communication range. The Z sequences have been designed to reduce the interference and the computation complexity.

19 Claims, 26 Drawing Sheets

(56) References Cited

OTHER PUBLICATIONS

Weightless Specification, Available online at URL—http://www.weightless.org/about/weightlessspecification, 2 pages, Retrieved on Apr. 7, 2025.

Abbas, et al., "A Multi-Layer Grant-Free Noma Scheme for Short Packet Transmissions", In 2018 IEEE Global Communications Conference (GLOBECOM), 1-6 pages, 2018.

Akpakwu, et al., "A Survey on 5g Networks for the Internet of Things: Communication Technologies and Challenges", IEEE Access, vol. 6, pp. 3619-3647, 2018.

Al-Hourani, et al., "Session Duration Between Handovers in Dense Leo Satellite Networks", IEEE Wireless Communications Letters, vol. 10, No. 12, 1-5 pages, Dec. 2021.

Au, et al., "Uplink Contention Based SCMA for 5g Radio Access", In 2014 IEEE Globecom Workshops, 6 pages, Dec. 8, 2014.

Balevi, et al., "Aloha-Noma for Massive Machine-to-Machine IoT Communication", IEEE International Conference on Communications (ICC), 5 pages, May 20, 2018.

Berardinelli, et al., "Reliability Analysis of Uplink Grant-Free Transmission over Shared Resources", IEEE Access, vol. 6, pp. 23602-23611, Apr. 17, 2018.

Berrou, et al., "Near Shannon Limit Error Correcting Code and Decoding : Turbo-Codes (1)", IEEE International Conference on Communications, pp. 1064-1070, May 23, 1993.

Breen, et al., "POWDER: Platform for Open Wireless Data-Driven Experimental Research", In Proceedings of the 14th International Workshop on Wireless Network Testbeds, Experimental Evaluation and Characterization (WiNTECH), 8 pages, Sep. 21, 2020.

Casini, et al., "Contention Resolution Diversity Slotted Aloha (CRDSA): An Enhanced Random Access Schemefor Satellite Access Packet Networks", IEEE Transactions on Wireless Communications, vol. 6, No. 4, pp. 1408-1419, Apr. 2007.

Chang, et al., "The IEEE 802.15.4g Standard for Smart Metering Utility Networks", IEEE Third International Conference on Smart Grid Communications, Nov. 5, 2012, pp. 476-480.

Chen, et al., "A Novel Preamble Design for 5G Enabled LEO Non-Terrestrial Networks", GLOBECOM 2022—2022 IEEE Global Communications Conference, pp. 680-686, Dec. 4, 2022.

Chen, et al., "Aligntrack: Push the Limit of LoRa Collision Decoding", IEEE 29th International Conference on Network Protocols (ICNP), 11 pages, Nov. 1, 2021.

Chen, et al., "Narrow Band Internet of Things", IEEE Access, vol. 5, pp. 20557-20577, Sep. 15, 2017.

Choi, et al., "Grant-Free Random Access in Machine-Type Communication: Approaches and Challenges", IEEE Wireless Communications, vol. 29, No., 1, pp. 151-158, Feb. 2022.

Dai, et al., "Pattern Division Multiple Access: A New Multiple Access Technology for 5g", IEEE Wireless Communications, vol. 25 No. 2, pp. 54-60, Apr. 2018.

Eletreby, et al., "Empowering Low-Power Wide Area Networks in Urban Settings", In Proceedings of the Conference of the ACM Special Interest Group on Data Communication, pp. 309-321, Aug. 21, 2017.

Digital Video Broadcasting (DVB), Interaction channel for satellite distribution systems, 117 pages, Sep. 2025.

Ferre, et al., "A Dual Waveform Differential Chirp Spread Spectrum Transceiver for Leo Satellite Communications", IEEE International Conference on Communications, pp. 1-6, Jun. 14, 2021.

Gallinaro, et al., "ME-SSA: an Advanced Random Access for the Satellite Return Channel", IEEE International Conference on Communications (ICC), pp. 856-861, Jun. 8, 2015.

Gaudenzi, et al., "Asynchronous Contention Resolution Diversity Aloha: Making CRDSA Truly Asynchronous", IEEE Transactions on Wireless Communications, vol. 13, No. 11, pp. 6193-6206, Jul. 2, 2014.

Gaudenzi, et al., "Random Access Schemes for Satellite Networks, from VSAT to M2M: A Survey", International Journal of Satellite Communications and Networking, vol. 36, No. 1, pp. 66-107, 2018.

Gold, "Optimal Binary Sequences for Spread Spectrum Multiplexing (Corresp.)", IEEE Transactions on Information Theory, vol. 13, No. 4, pp. 619-621, Oct. 1967.

Herrero, et al., "High Efficiency Satellite Multiple Access Scheme for Machine-to-Machine Communications", IEEE Transactions on Aerospace and Electronic Systems, vol. 48, No. 4, pp. 2961-2989, Oct. 8, 2012.

Heyn, et al., "E-SSA Satellite Messaging Return Channel: Performance Analysis and Field Trials Results", 2012 6th Advanced Satellite Multimedia Systems Conference (ASMS) and 12th Signal Processing for Space Communications Workshop (SPSC), 7 pages, Sep. 5, 2012.

Hu, et al., "SCLoRa: Leveraging Multi-Dimensionality in Decoding Collided LoRa Transmissions", IEEE 28th International Conference on Network Protocols (ICNP), 11 pages, Oct. 13, 2020.

Humphreys, et al., "Signal Structure of the Starlink Ku-Band Downlink", arXiv:2210.11578v1, 14 pages, Oct. 2022.

Hyun, et al., "MPTCP Performance Simulation in Multiple LEO Satellite Environment", IEEE 12th Annual Computing and Communication Workshop and Conference (CCWC), pp. 895-899, Jan. 26, 2022.

Ieee, "IEEE P802.11-TASK Group AH", https://www.ieee802.org/11/Reports/tgah_update.htm, 39 pages, Apr. 7, 2025.

Isca, et al., "Recent Advances in Design and Implementation of Satellite Gateways for Massive Uncoordinated Access Networks", Sensors, vol. 22, No. 2, 565, 21 pages, Jan. 12, 2022.

ITU-R, "Propagation data required for the design systems in the land mobile-satellite service", P Series Radiowave propagation, Recommendation ITU-R P.681-11, 63 pages, Aug. 2019.

Kak, et al., "Large-Scale Constellation Design for the Internet of Space Things/CubeSats", IEEE Globecom Workshops (GC Wkshps), pp. 1-6, Dec. 9, 2019.

Kassem, et al., "A Browser-Side View of Starlink Connectivity", Proceedings of the 22nd ACM Internet Measurement Conference, 8 pages, Oct. 25, 2022.

Khan, et al., "Random Access Preamble Design for 3GPP Non-terrestrial Networks", IEEE Globecom Workshops (GC Wkshps), pp. 1-5, Dec. 7, 2021.

Kim, et al., "IEEE 802.15.4a CSS-Based Localization System for Wireless Sensor Networks", IEEE International Conference on Mobile Adhoc and Sensor Systems Conference, 3 pages, Oct. 8, 2007.

Kodheli, et al., "Random Access Procedure Over Non-Terrestrial Networks: From Theory to Practice", IEEE Access, vol. 9, pp. 109130-109143, Jul. 30, 2021.

Kodheli, et al., "Satellite Communications in the New Space Era: A Survey and Future Challenges", IEEE Communications Surveys & Tutorials, vol. 23, No. 1, pp. 70-109, 2021.

Li, et al., "CurvingLoRa to Boost LoRa Network Throughput via Concurrent Transmission", In Proceedings of Usenix Networked Systems Design and Implementation, 17 pages, 2022.

Lin, et al., "5g from Space: An Overview of 3gpp Non-Terrestrial Networks", IEEE Communications Standards Magazine, vol. 5, No. 4, 8 pages, Dec. 2021.

Mahmood, et al., "Uplink Grant-Free Access Solutions for Urllc Services in 5g New Radio", 16th International Symposium on Wireless Communication Systems (ISWCS), pp. 607-612, Aug. 2019.

Matlab, "Model NR NTN Channel", https://www.mathworks.com/help/satcom/ug/model-nr-ntn-channel.html, 10 pages, Apr. 2, 2025.

Mclemore, et al., "Navigation Using Doppler shift from LEO Constellations and INS Data", IEEE Transactions on Aerospace and Electronic Systems, vol. 58, No. 5, pp. 4295-4314, Oct. 2022.

Mo, et al., "Up-Link Capacity Derivation for Ultra-Narrow-Band IoT Wireless Networks", International Journal of Wireless Information Networks, vol. 24, No. 3, pp. 300-316, Jun. 6, 2017.

Muller, et al., "Pedestrian localization using IEEE 802.15.4a TDoA Wireless Sensor Network", IEEE 1st International Symposium on Wireless Systems (IDAACS-SWS), pp. 23-27, Sep. 20, 2012.

Musumpuka, et al., "Performance Analysis of Correlated Handover Service in LEO Mobile Satellite Systems", IEEE Communications Letters, vol. 20, No. 11, 4 pages, Aug. 30, 2016.

(56) References Cited

OTHER PUBLICATIONS

Nguyen, et al., "TCP Performance Over Satellite-Based Hybrid FSO/RF Vehicular Networks: Modeling and Analysis", IEEE Access, vol. 9, pp. 108426-108440, Aug. 2, 2021.

Nikopour, et al., "Sparse code multiple access", IEEE 24th Annual International Symposium on Personal, Indoor, and Mobile Radio Communications (PIMRC), pp. 332-336, Sep. 8, 2013.

Nordstrom, et al., "An Optimum Nonlinear Code", Information and Control, vol. 11, Issues 5-6, pp. 613-616, Nov. 1967.

Okati, et al., "Nonhomogeneous Stochastic Geometry Analysis of Massive LEO Communication Constellations", IEEE Transactions on Communications, vol. 70, No. 3, Mar. 2022, pp. 1848-1860.

Ordentlich, et al., "Low Complexity Schemes for the Random Access Gaussian Channel", IEEE International Symposium on Information Theory (ISIT), 5 pages, Jun. 25, 2017.

Parvez, et al., "A Survey on Low Latency Towards 5G: Ran, Core Network and Caching Solutions", IEEE Communications Surveys & Tutorials, vol. 20, No. 4, 34 pages, May 28, 2018.

Ping, et al., "Interleave Division Multiple-Access", IEEE Transactions on Wireless Communications, vol. 5, No. 4, pp. 938-947, Apr. 2006.

Prol, et al., "Position, Navigation, and Timing (PNT) Through Low Earth Orbit (LEO) Satellites: A Survey on Current Status, Challenges, and Opportunities", IEEE Access, vol. 10, pp. 83971-84002, Jul. 26, 2022.

Qian, et al., "The Performance of Chirp Signal Used in LEO Satellite Internet of Things", IEEE Communications Letters, vol. 23, No. 8, pp. 1319-1322, Aug. 2019.

Rathi, et al., "TnB Implementation", https://github.com/raghavrathi10/TnB, 3 pages, Apr. 2, 2025.

Rathi, et al., "TnB: Resolving Collisions in LoRa based on the Peak Matching Cost and Block Error Correction", Proceedings of the 18th International Conference on Emerging Networking EXperiments and Technologies, Nov. 30, pp. 401-416, 2022.

Raza, "Low Power Wide Area Networks: An Overview", IEEE Communications Surveys & Tutorials, vol. 19, No. 2, pp. 855-873, 2017.

Reichman, Arie, "Enhanced Spread Spectrum Aloha (E-SSA), an Emerging Satellite Return Link Messaging Scheme", In 2014 IEEE 28th Convention of Electrical Electronics Engineers in Israel, pp. 1-4, Dec. 3, 2014.

Saarnisaari, et al., "Application of 5g New Radio for Satellite Links with Low Peak-to-Average Power Ratios", International Journal of Satellite Communications and Networking, vol. 39, No. 4, pp. 445-454, 2021.

Saho, et al., "Dynamic IoT Device Clustering and Energy Management With Hybrid Noma Systems", IEEE Transactions on Industrial Informatics, vol. 14, No. 10, 8 pages, Jul. 17, 2018.

Saho, et al., "Toward Ubiquitous Connectivity via LoRaWAN: An Overview of Signal Collision Resolving Solutions", IEEE Internet of Things Magazine, vol. 4, No. 4, pp. 114-119, Dec. 2021.

Shahab, et al., "Grant-Free Non-Orthogonal Multiple Access for IoT: A Survey", IEEE Communications Surveys & Tutorials, vol. 22, No. 3, pp. 1805-1838, May 20, 2020.

Shahid, "Concurrent Interference Cancellation: Decoding Multi-Packet Collisions in LoRa", Proceedings of the 2021 ACM SIGCOMM 2021 Conference, pp. 503-515, Aug. 23, 2021.

Shirvanimoghaddam, et al., "Massive Non-Orthogonal Multiple Access for Cellular IoT: Potentials and Limitations", IEEE Communications Magazine, vol. 55, No. 9, p. 55-61, Sep. 8, 2017.

Sigfox, "Sigfox 0G Technology by Unabiz", https://www.sigfox.com, 10 pages, Apr. 7, 2025.

Sornin, N., "LoRaWAN 1.1 Specification", https://www.lora-alliance.org/resourcehub/lorawantm-specification-v11, 101 pages, 2017.

Sum, et al., "On Communication and Interference Range of IEEE 802.15.4g Smart Utility Networks", IEEE Wireless Communications and Networking Conference, 7 pages, Apr. 1, 2012.

Tian, et al., "New Constructions of Binary Golay Spreading Sequences for Uplink Grant-Free Noma", IEEE Communications Letters, vol. 26, No. 10, pp. 2480-2484, Oct. 2022.

Tong, et al., "CoLoRa: Enabling Multipacket Reception in LoRa", IEEE Conference on Computer Communications, 9 pages, Jul. 6, 2020.

Tong, et al., "Combating Packet Collisions Using Non-Stationary Signal Scaling in LPWANs", In International Conference on Mobile Systems, Applications, and Services (MobiSys '20), pp. 234-246, Jun. 15, 2020.

Tozlu, et al., "Wi-Fi Enabled Sensors for Internet of Things: A Practical Approach", IEEE Communications Magazine, vol. 50, No. 6, pp. 134-143, Jun. 2012.

3rd Generation Partnership Project (3GPP), Technical Specification Group Radio Access Network; Study on Non-Orthogonal Multiple Access (NOMA) for NR (Release 16), 134 pages, Dec. 2018.

3rd Generation Partnership Project (3GPP), Technical Specification Group Radio Access Network; Study on physical layer enhancements for NR ultra-reliable and low latency case (URLLC) (Release 16), 78 pages, Mar. 2019.

European Telecommunication Standardisation Institute(ETSI), Satellite earth stations and systems; air interface for s-band mobile interactive multimedia (s-mim). Part 3: Physical layer specification, return link asynchronous access, 33 pages, Dec. 2011.

3rd Generation Partnership Project (3GPP), Technical Specification Group Radio Access Network; NR; NR and NG-RAN Overall Description; Stage 2 (Release 15), 87 pages, Jun. 2018.

Vaezi, et al., "Cellular, Wide-Area, and Non-Terrestrial IoT: A Survey on 5G Advances and the Road Towards 6G", IEEE Communications Surveys & Tutorials, vol. 24, No. 2, 59 pages, Feb. 2022.

Vardy, "The Nordstrom-Robinson Code: Representation Over GF(4) and Efficient Decoding", IEEE Transactions on Information Theory, vol. 40, No. 5, pp. 1686-1693, Sep. 1994.

Vasisht, et al., "L2D2: Low Latency Distributed Downlink for Low Earth Orbit Satellites", SIGCOMM '21: Proceedings of the 2021 ACM SIGCOMM 2021 Conference, pp. 151-164, Aug. 23, 2021.

Wang et al., "A Joint Computation Offloading and Resource Allocation Strategy for LEO Satellite Edge Computing System", IEEE 20th International Conference on Communication Technology (ICCT), pp. 649-655, Oct. 28, 2020.

Wang, et al., "A Primer on 3GPP Narrowband Internet of Things", IEEE Communications Magazine, vol. 55, No. 3, pp. 117-123, Mar. 2017.

Wang, et al., "Joint User Activity and Data Detection Based on Structured Compressive Sensing for Noma", IEEE Communications Letters, vol. 20, No. 7, pp. 1473-1476, Jul. 2016.

Wang, et al., "Load-Balancing Method for LEO Satellite Edge-Computing Networks Based on the Maximum Flow of Virtual Links", IEEE Access, vol. 10, pp. 100584-100593, Sep. 16, 2022.

Wang, et al., "mLoRa: A Multi-Packet Reception Protocol in LoRa networks", IEEE 27th International Conference on Network Protocols (ICNP), 11 pages, Oct. 8, 2019.

Xhonneux, et al., "A Low-Complexity LoRa Synchronization Algorithm Robust to Sampling Time Offsets", IEEE Internet of Things Journal, vol. 9, No. 5, 13 pages, Mar. 1, 2022.

Xia, et al., "FTrack: Parallel Decoding for LoRa Transmissions", IEEE/ACM Transactions on Networking, vol. 28, No. 6, pp. 2573-2586, Dec. 2020.

Xia, et al., "PCube: Scaling LoRa Concurrent Transmissions with Reception Diversities", In ACM Mobicom, 14 pages, Oct. 25, 2021.

Xiao, et al., "On Capacity-Based Codebook Design and Advanced Decoding for Sparse Code Multiple Access Systems", IEEE Transactions on Wireless Communications, vol. 17, No. 6, pp. 3834-3849, Jun. 2018.

Xu, et al., "Pyramid: Real-Time LoRa Collision Decoding with Peak Tracking", IEEE INFOCOM 2021—IEEE Conference on Computer Communications, pp. 1-9, May 10, 2021.

Ye, et al., "Deep Learning Aided Grant-Free Noma Toward Reliable Low-Latency Access in Tactile Internet of Things", IEEE Transactions on Industrial Informatics, vol. 15, No. 5, pp. 2995-3005, May 2019.

Ye, et al., "Help From Space: Grant-Free Massive Access for Satellite-Based IOT in the 6g Era", Digital Communications and Networks, vol. 8, No. 2, pp. 215-224, Apr. 2022.

(56)  References Cited

OTHER PUBLICATIONS

Ye, et al., "On Constellation Rotation of Noma With SIC Receiver", IEEE Communications Letters, vol. 22, No. 3, pp. 514-517, Mar. 2018.

Yu, et al., "Optimal Design of Resource Element Mapping for Sparse Spreading Non-Orthogonal Multiple Access", IEEE Wireless Communications Letters, vol. 7, No. 5, pp. 744-747, Oct. 2018.

Yuan, et al., "Blind Multiple User Detection for Grant-Free MUSA without Reference Signal", 017 IEEE 86th Vehicular Technology Conference (VTC-Fall), 2017, pp. 1-5, Sep. 24.

Yuan, et al., "Design of Nonorthogonal Multiple Access Systems: An Information Bottleneck Perspective", IEEE Communications Letters, vol. 26, No. 8, pp. 1750-1754, Aug. 2022.

Yuan, et al., "Multi-User Shared Access for Internet of Things", IEEE 83rd Vehicular Technology Conference (VTC Spring), 6 pages, May 15, 2016.

Zhen, et al., "PRACH in Self-Powered Satellite Internet of Things: Low-Cubic Metric Preamble Design and Detection", IEEE Sensors Journal, vol. 23, No. 18, pp. 20882-20893, Sep. 15, 2023.

Zheng, et al., "Robust Random Access Preamble Detection Scheme for 5G Integrated LEO Satellite Communication Systems", IEEE 22nd International Conference on Communication Technology (ICCT), pp. 463-467, Nov. 11, 2022.

* cited by examiner (a)

(b)

(a)

(b)

Identical Segment Books $N$ $N/4$ $W^2_x$

Table 1: Network Capacity Comparison

| Chan. | Test Type | Comp. | E-SSA (Mbps) | QCode (Mbps) | Gain |
|---|---|---|---|---|---|
| NTN-TDL-A | Single-SF | SF 4 | 1.60 | 5.00 | 3.13× |
| | | SF 5 | 1.67 | 5.25 | 3.15× |
| | | SF 6 | 1.80 | 7.24 | 4.03× |
| | Multi-SF | min | 1.38 | 4.84 | 3.50× |
| | | mean | 1.69 | 5.64 | 3.33× |
| NTN-TDL-D | Single-SF | SF 4 | 2.30 | 7.91 | 3.43× |
| | | SF 5 | 3.40 | 9.86 | 2.59× |
| | | SF 6 | 4.18 | 11.31 | 2.71× |
| | Multi-SF | min | 2.85 | 8.24 | 2.90× |
| | | mean | 3.10 | 8.68 | 2.80× |

SYSTEM AND METHOD FOR IMPROVING TRANSMISSION IN SATELLITE AND LOW POWER COMMUNICATION NETWORKS

RELATED APPLICATION

This US application claims priority to, and the benefit of, U.S. Provisional Patent Application No. 63/518,440, filed Aug. 9, 2023, which is incorporated by reference herein in its entirety.

GOVERNMENT LICENSE RIGHTS

This invention was made with government support under grant numbers 1910268 and 2312113, awarded by the National Science Foundation. The government has certain rights in the invention.

TECHNICAL FIELD

Embodiments of the present invention relate to wireless communication signal modulation, specifically a system and method for improving transmission in satellite and/or low-power long-distance communication networks.

BACKGROUND

Early satellite uplink standards include Digital Video Broadcasting-Return Channel via Satellite (DVB-RCS) and Internet Protocol Over Satellite (IPoS). Recently, 3GPP has started the expansion to Non-Terrestrial Networks where current proposals are similar to those in existing cellular networks with Orthogonal Frequency-Division Multiplexing (OFDM), although challenges due to the high peak-to-average power ratio (PAPR) of OFDM signals have been noted.

Chirp has been used in sonar, radar, and laser systems, as well as in data communication systems, such as LoRa and IEEE 802.15.4a, where it is commonly referred to as Chirp Spread Spectrum (CSS) modulation. Wi-Fi allows grant-free access to the medium with Carrier Sense Multiple Access (CSMA), which, however, cannot be applied to LEO networks, primarily because many user terminals cannot sense each other due to the physical distance. Since 5G, grant-free communication has been proposed for cellular networks to support new service classes, such as Ultra-Reliable Low Latency Communication (URLLC). Grant-free communications are expected to further expand in 6G. Current proposals include those that do not need fundamental modifications to the physical layer, such as repeating a packet K times or transmitting a packet in a random frequency channel, as well as those based on Non-Orthogonal Multiple Access (NOMA), which resolves collisions in the physical layer. Well-known NOMA schemes include Sparse Code Multiple Access (SCMA), Interleave Division Multiple-Access (IDMA), Multi-User Shared Access (MUSA), Pattern Division Multiple Access (PDMA), etc., which have achieved impressive overload factors under the grant-based model where nodes operate according to parameters given by a central controller, such as codes, patterns, and transmission power.

Uncoordinated Access Channels (UCACH) can be used that allow user terminals to transmit packets to the satellite without prior resource allocation by the satellite or coordination with each other. As a result, latency is reduced to the minimum, i.e., the one-way propagation delay, because user terminals may simply transmit packets at will. As a tradeoff, the receiver must be capable of decoding packets from multiple user terminals that may overlap in any fashion. In essence, the responsibility of supporting multiple access is shifted from the Medium Access Control (MAC) layer to the Physical (PHY) layer. UCACH may be best suited for transmitting latency-sensitive data from user terminals to the satellite.

There is a benefit to improving protocols for long-distance and satellite wireless communication.

BRIEF SUMMARY OF THE DISCLOSURE

An exemplary system and method are disclosed that includes a long preamble symbol with a higher number of modulated bits based on chirp to provide high network capacity without sacrificing data rates for individual user terminals and without prior network access or synchronization for long-distance wireless communication or satellite communication. The chirp is implemented as a complex vector with constant magnitude. Simulations with satellite channel models show the exemplary system and method can achieve higher network throughput than existing satellite communication technology.

The preamble can be further modified to include the long preamble chirp-based symbol and additionally its conjugate (referred to as a "Chirp Pair"). The chirp can be a complex vector with constant magnitude and linearly increasing frequency to facilitate the pairing. Real-world experiments over-the-air transmission experiments demonstrate the Chirp Pair modulation can increase the accuracy of packet detection without incurring high computation complexity.

To provide high network capacity (i.e., number of accessible devices) and high data rates (throughout of data that can be transmitted), a codebook (referred to as "QCode") can be employed to increase the number of bits modulated on each symbol used in the modulation of the data in a packet payload for data transmission. Each symbol can be a complex vector of length $2^{SF}$, where SF is a Spreading Factor. Each element of the symbol can be one of four possible values from the QPSK constellation: 1, i, −1, and −i. Results show that for a given data rate, the capacity of QCode can be increased 3× over that of state-of-the-art Uncoordinated Access Channels (UCACH) communication protocols.

Additional advantages of the invention will be set forth in part in the description that follows, and in part will be obvious from the description or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the System and Method for Improving Transmission in Satellite and Low Power Communication Networks, as well as the structure and operation of the various embodiments of the System and Method for Improving Transmission in Satellite and Low Power Communication Networks, are described in detail below with reference to the accompanying drawings.

It is to be understood that both the foregoing general description and the following detailed description are exemplary and explanatory only and are not restrictive of the invention as claimed.

BRIEF DESCRIPTION OF THE DRAWINGS

The accompanying figures, which are incorporated herein and form part of the specification, illustrate the System and Method for Improving Transmission in Satellite and Low Power Communication Networks. Together with the description, the figures further serve to explain the principles of the System and Method for Improving Transmission in Satellite and Low Power Communication Networks described herein and thereby enable a person skilled in the pertinent art to make and use the System and Method for Improving Transmission in Satellite and Low Power Communication Networks.

FIGS. 6A-6B show aspects of the method of operation of QCode.

FIGS. 15A-15I show experimental results associated with QCode.

DETAILED DESCRIPTION

Reference will now be made in detail to embodiments of the System and Method for Improving Transmission in Satellite and Low Power Communication Networks with reference to the accompanying figures. The same reference numbers in different drawings may identify the same or similar elements.

Example System

Figure 1:
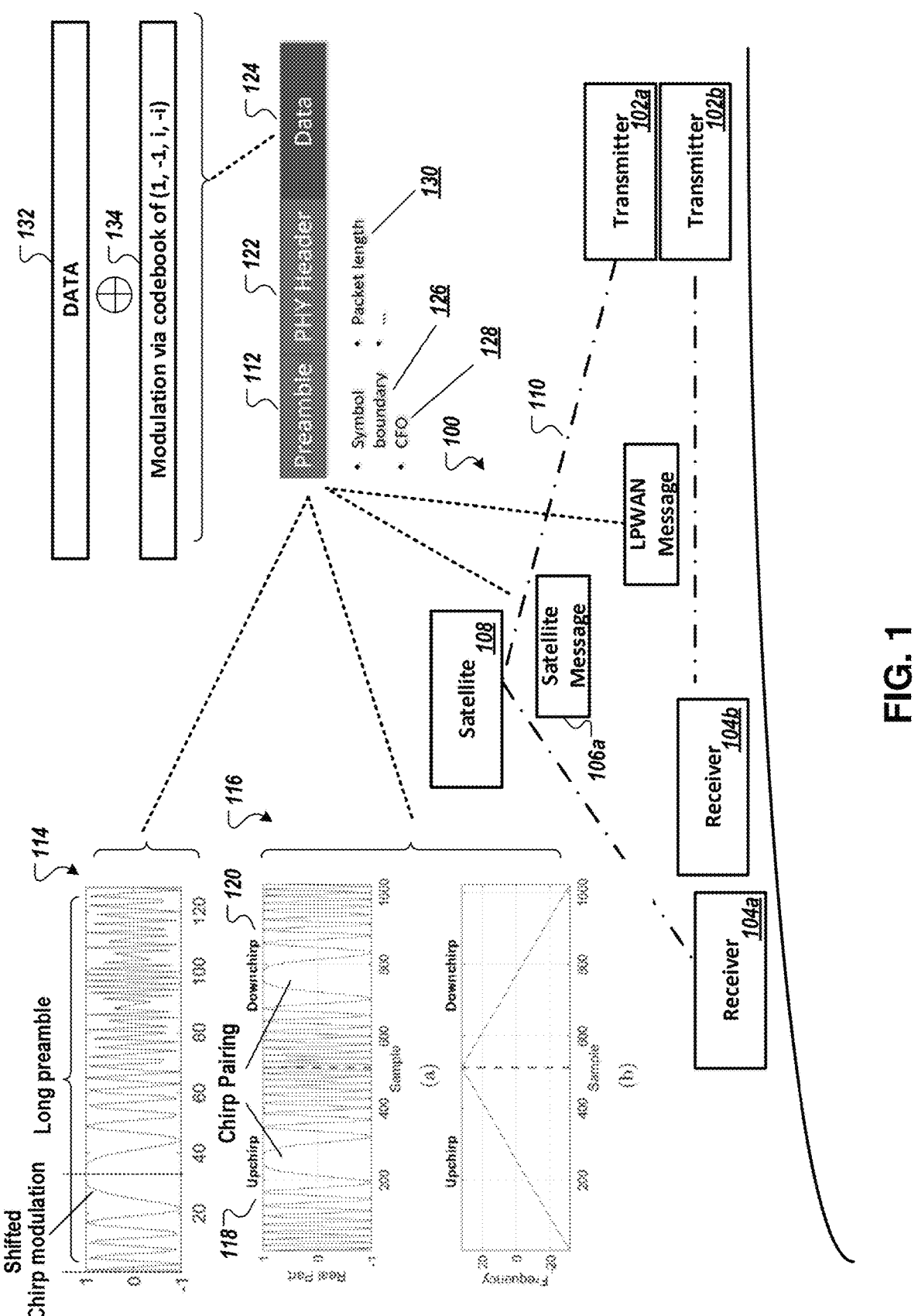
FIG. 1 shows an example communication system comprising a transmitter and receiver with enhanced modulation and demodulation operation employing a message preamble having chirp modulated signal or data packet generated via quadrature-based modulation.

FIG. 1 shows two examples of communication system 100, each comprising a transmitter 102 and receiver 104 with enhanced modulation and demodulation operation employing a message preamble optimized for long-distance terrestrial or satellite communication, in accordance with an illustrative embodiment. The first relates to satellite wireless communication, and the second relates to long-distance wireless communication.

In FIG. 1, a satellite uncoordinated access channel message 106 (i.e., UCACH message and shown as "Satellite Message" 106a) is transmitted from a device having the transmitter 102 (shown as 102a) to a device having a receiver 104 (shown as 104a) through a satellite 108 serving as a relay. In the one-way or two way-communication exchange, the devices 102 and 104 can serve as both transmitter 102a and receiver 104a. In each transmission, a signal 110 having the message 106a, e.g., framed as a packet, that is bounced off a LEO satellite (e.g., 108) can take tens of micro-seconds to travel at the speed of light from the transmitter 102a located on Earth to the satellite 108 to a receiver 104a. The exemplary uncoordinated access channel message 106a can be sent once without further handshaking or verification to avoid associated latency with such protocols and is thus practical for such long-distance communication.

The transceiver (e.g., 102a) can generate a preamble 112 for the message 106 (e.g., 106a) by applying chirp modulation 114 to the preamble sequence and further modulate the chirp modulated data by multiplying the chirp modulated data with one or a set of candidate z-transform binary sequence of the same length. The chirp modulation 114 may employ a spreading factor SF. The preamble 112, as a long preamble, can have a length corresponding to 8 data symbols. The chirp modulation 114 includes a shifted chirp signal C cyclically shifted k times ($C_k$), where k is the number of potential shifts. In some embodiments, the modulating is performed according to the phase t, shift k, and Z sequence h, wherein a modulated symbol is where $0 \leq t < 4$, $0 \leq k < N$, and $0 \leq h < G$, and the modulated symbol is $\Omega_{t,k,h} = e^{(it\pi)/2} C_k \odot Z^h$, where $Z^h$ denotes Z sequence h for $0 \leq h < G$.

An alternative preamble modulation 116 is shown in which the preamble 112 includes an upchirp 114 followed by a downchirp 116. In some embodiments, each of the upchirp 118 and the downchirp 120 includes a spreading factor SF+2. The chirp may be implemented as a complex vector with a constant magnitude and linearly increasing frequency. The chirp modulation 116 may include a chirp 118 concatenated with a conjugate (e.g., 120) of the chirp 118. While shown as with an upchirp followed by a downchirp, the modulation may include a downchirp followed by an upchirp. In some embodiments, the chirp may be the concatenation of an upchirp signal and a downchirp signal but shifted within the allotted preamble window.

The packet (e.g., 106a) may include the preamble 112, PHY header 122, and data payload 124. The preamble 112 may include the symbol boundary 126 and a Carrier Frequency Offset (CFO). The PHY header 122 may include a packet length field 130. To increase data rate/throughput, the data 124 in the packet 106a may include the data 132 encoded with a quadrature-based codebook 134 having codebook elements based on QPSK constellation including 1, −1, i, and −i.

In addition to satellite communication, the exemplary protocol can be implemented, e.g., for long-distance terrestrial communication. In the example shown in FIG. 1, the transceiver (e.g., 102b) can generate a preamble 112 for a message 106 (shown as "LPWAN Message" 106b) by also applying chirp modulation 114 or 16 to the preamble sequence and further modulate the chirp modulated data by multiplying the chirp modulated data with one or a set of candidate z-transform binary sequence of the same length. The LPWAN message may also employ chirp conjugate in the preamble 112 and/or the quadrature-based symbol codebook for the data 124. While the two protocols and communication systems employ similar technical features, they are not shown to be used interchangeably in FIG. 1.

Indeed, the chirp bits (e.g., via modulation 114 or 116) can provide high network capacity without sacrificing data rates for individual user terminals and without prior network access or synchronization. The operation without prior network access or handshake operation allows the transceiver to communicate with the receiver to operate at improved latency. The long preamble and chirp structures allow more transceivers to communicate to the receiver without affecting each other.

Satellite/Long-Distance Communication Networks with Z Transform of Chirps

As noted above, the transceiver (e.g., 102a) can generate a preamble 112 for the message 106 (e.g., 106a) by applying chirp modulation 114 to the preamble sequence and further modulate the chirp modulated data by multiplying the chirp modulated data with one or a set of candidate z-transform binary sequence of the same length.

A chirp, as used herein in the context of the z-transform modulation, is a complex vector with constant magnitude and linearly increasing frequency. A chirp is a signal in which the frequency increases (up-chirp) or decreases (down-chirp) with time. It is commonly applied to sonar, radar, and laser systems and to other applications in data communication systems, such as LoRa [3] and IEEE 802.15.4a [40], [52], where it is commonly referred to as Chirp Spread Spectrum (CSS) modulation.

The modulation system and method described herein is referred to as ZChirp. The system is based on chirps but is very different from the traditional CSS, primarily because the presently described ZChirp modulation involves multiplying a chirp with a Z sequence to generate completely different baseband signals, which allows for higher network capacity. In addition, traditional CSS is typically designed for low data rates, while ZChirp is designed for broadband access in satellite networks and can address challenges in high bandwidth channels. There have also been proposals to modify the chirp for LEO networks [60], [33], which are very different from the presently described method of multiplying the chirp with the Z sequence.

Example ZChirp Modulation. By way of example, the spreading factor (SF) can be a positive integer such as 6, 7, 8, etc. The chirp C is a complex vector of length $N=2^{SF}$, whose t-th element or sample is given by Equation 1.

$$C_t = \exp\left[i\pi(t - N/2)^2/N\right], t = 0, 1, \ldots, N-1 \qquad \text{(Eq. 1)}$$

Referring to FIG. 1A, the top panel shows the real part of the upchirp C when the spreading factor is 7. The conjugate of upchirp C is the downchirp and is denoted as C'. The duration of a sample is 1/B, where B is the system bandwidth. The duration of the upchirp C is N/B. $\beta$ is used to denote the frequency that completes one cycle in the chirp time, i.e., $\beta=B/N$. The traditional chirp modulation is a cyclic shift and modulates SF bits on a chirp. To modulate a value k, where $0 \leq k < N$, the upchirp C is cyclically shifted to the left k times, denoted as $C_k$. For example, the bottom of FIG. 1A shows the shifted chirp when k=32. Let Y be the received symbol and "$\odot$" the element-wise vector multiplication. Let $Q=Y \odot C'$, which is called the dechirped symbol. The signal vector, denoted as S, is computed with the Fast Fourier Transform (FFT), i.e., S=FFT(Q). If the received signal is the upchirp signal cyclically shifted k times (i.e., $Y=C_k$), the dechirped symbol Q is a sinusoid that completes k cycles in N samples so that the signal vector S has a peak at location k. For example, the signal vectors when Y=C and $Y=C_{32}$ are shown in FIG. 1B, where the peaks are at locations 0 and 32, respectively.

According to the principles described herein, the transmission may use a packet format as shown in FIG. 1. When the node has data to transmit, the node can pick a spreading factor (SF) and transmission power depending on the channel condition and transmits the packet. A ZChirp packet (e.g., 106a, 106b) includes the preamble 112, the physical layer header (PHY header) 122, and the data 124, as shown in FIG. 1. The preamble 112 is employed by the gateway to detect the packet and estimate key parameters, such as the symbol boundary and the Carrier Frequency Offset (CFO). The PHY header 122 includes a small number of symbols in a field and is employed by the gateway to learn information, such as the length of the packet. The data symbols 124 are transmitted back-to-back.

Example Node-Side Method of Operation. When the node (e.g., transmitter 102a, 102b or receiver 104a, 104b) has data to transmit, the nodes may select an SF and transmission power depending on the channel condition and transmits the packet. In some embodiments, the SF and transmission power are user-selectable.

Preamble. In ZChirp, for when G=N, the preamble may include an upchirp C followed by a downchirp, both with spreading factor SF+2, where SF is the spreading factor used in the data modulation. The length of the preamble is, therefore, the same as 8 data symbols. Using a higher spreading factor makes the preamble more resilient to noise and interference. The combination of the upchirp and downchirp allows for robust estimations of timing offset and the CFO. The preamble is not multiplied with any Z sequence to reduce the search space. Without limitation, other preamble may be used, e.g., using a smaller G to reduce computational complexity.

PHY Header. In ZChirp, symbols in the PHY header are modulated only with the shift modulation and encoded with an RS code with a coding rate 1/2. The modulated symbols are multiplied with a special binary vector, which may be, for example, generated according to the Gold sequence [34] for the sole purpose of guaranteeing low correlations with the data symbols. The PHY header contains the information of the packet, including the packet length, followed by a 4-bit CRC. The number of symbols in the PHY header is a constant for a given SF, which is 8 if SF≤7 and 6 for other SFs.

The data symbol may be a transformed version of a chirp C. The transformation may be multi-dimensional; that is, in addition to the traditional shift modulation, two other modulations are also adopted, namely, the phase modulation and the Z modulation. The phase modulation may be based on quadrature phase shift keying (QPSK). In some embodiments, the chirp is multiplied by one of the values in $\{e^0, e^{(i\pi)/2}, e^{i\pi}, e^{(i3\pi)/2}\}$ to modulate 2 bits. The Z modulation may multiply the chirp with a binary sequence of the same length, namely, the Z sequence, in which each element is either 1 or −1. The total number of Z sequences may be referred to as G; therefore, the Z modulation can modulate $\log_2 G$ bits. To be more specific, let the values to be modulated with the phase, shift, and Z modulations be t, k, and h, respectively, where $0 \leq t < 4$, $0 \leq k < N$, and $0 \leq h < G$. The modulated symbol can be expressed per Equation 2.

$$\Omega_{t,k,h} = e^{(it\pi)/2} C^k \odot Z^h, \qquad \text{(Eq. 2)}$$

In Equation 2, $Z^h$ denotes Z sequence h for $0 \leq h < G$. To demodulate the received symbol Y, a demodulation matrix per Equation 3 may be used.

$$\Xi^h = FFT(Q \odot Z^h) \qquad (3)$$

In Equation 3, Q is the de-chirped symbol of the received symbol Y. If the received symbol $Y=\Omega_{\tau,k,h}$, then Equation 3 can be expressed as Equation 4.

$$\Xi^h = FFT\big(e^{(it\pi)/2}W^k\big), \tag{Eq. 4}$$

In Equation 4, $W^k$ is the vector that completes k cycles in N samples, i.e., $$W_t^k = e^{i2\pi kt/N}$$

for 0≤t<N, so that the demodulation matrix $\Xi^h$ has a peak at k with phase $$\frac{t\pi}{2}.$$

On the other hand, the demodulation matrix $\Xi^l$ will have no peaks where l≠h. The receiver can calculate the demodulation matrix $\Xi$, where row h in the matrix is $\Xi_h$ (Equations 3 and 4).

Figures 2A, 2B:
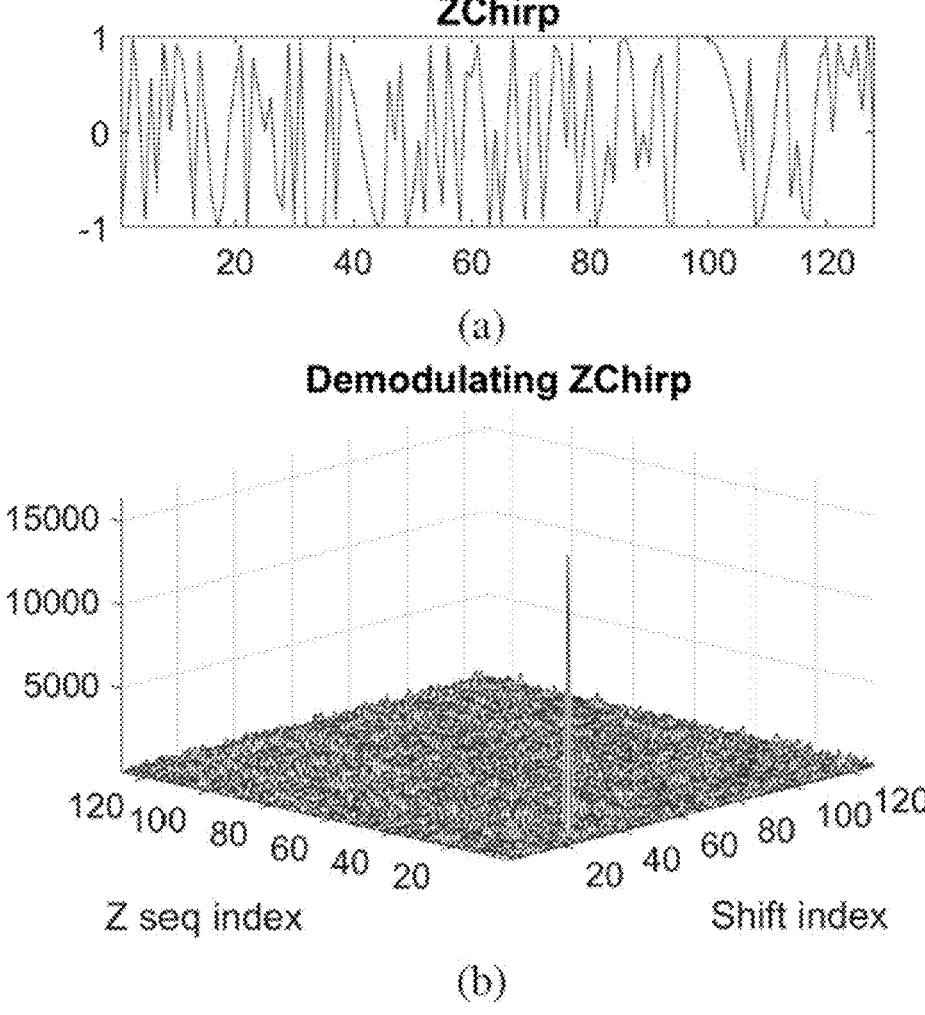
FIGS. 2A and 2B illustrate modulation with a chirp-based signal and a baseline chirp signal for the modulation.

If the highest peak is at row h and column k, the demodulated data for the Z and shift modulations can be h and k, respectively. The phase value can then be found according to the phase of the peak and demodulated. For example, FIG. 2A shows an example of the shifted chirp in FIG. 1 multiplied with the open-circuit input impedance $Z^{11}$. FIG. 2B shows an example demodulated matrix of the ZChirp preamble in FIG. 2A, which has a peak at row 11 and column 32. It can be seen that the signals at other rows and columns are very low.

The data to be transmitted can be split into three parts to be modulated by the phase, shift, and Z modulation. Each may employ independent error correction codes, which, for example, can be the Turbo code [22] with a coding rate of 1/2 for the phase modulation and the Reed-Solomon (RS) code with a coding rate of 1/2 for the shift and Z modulations. The PHY layer data rate can be calculated as follows with SF=7 and $\log_2$ G=SF as an example. On each symbol, a total of 2/2+7/2+7/2=8 coded bits are modulated. For LEO networks with 100 MHz bandwidth, each symbol can be 1.28 s; therefore, the data rate is 6.25 Mbps. For LPWANs, with 125 kHz bandwidth, each symbol is 1.024 ms; therefore, the data rate is 7.81 kbps.

Example Gateway-Side Method of Operation. The gateway (e.g., satellite 108 or LPWAN gateway, not shown) runs a packet detection algorithm constantly to search for packets in every SF. Once a packet is detected, the gateway may decode the packet and remove the signal of the packet from the time-domain signal. FIG. 2B shows a signal reconstruction where the power of a node is concentrated around the peak. The peak in the signal vector can be identified to reconstruct the signal by reversing the symbol modulation process, which does not require the estimation of the Channel State Information (CSI). After removing the signals of the strong nodes, more packets can be detected. In this implementation, the gateway can run the packet detection process a total of 3 times and decode the newly detected packets every time.

Example Method of ZChirp Operation. Multiplying the Z sequence with the chirp does not affect the bandwidth and communication performance. In a communication system, the bandwidth limits how fast the signal can change and is a factor in determining the communication speed. As the Z sequence changes the signs of the elements in the chirp, one concern is if ZChirp uses more bandwidth than the original chirp. Because the chirp itself can include the highest possible frequency, changing the signs does not produce higher frequencies, which can be seen in FIGS. 2A and 2B.

Figure 3A:
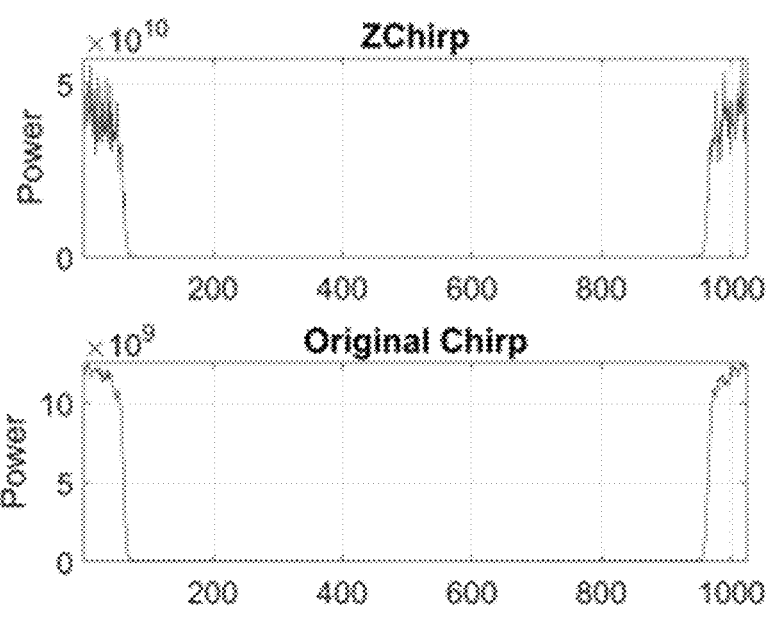
FIGS. 3A and 3B shows bandwidth analysis for Zchirp.

FIGS. 3A, subpanels A and B, shows bandwidth analysis for Zchirp. Specifically, FIG. 3A shows the bandwidth of a transmitted original chirp and a transmitted Zchirp. The received signal shows the 2 chirps occupying the same bandwidth. FIG. 3A is the average of 50 FFTs, each for 1024 samples. With OSF 8, the signal should occupy ⅛ of the FFT length, which is true for both the original chirp and the ZChirp. In the test step for FIG. 3A, a signal was transmitted and received by 2 USRP B210. In the test, the carrier frequency was 910 MHz, the bandwidth was 250 kHz, the SF was 7, and the Over Sampling Factor (OSF) was 8, i.e., the receiver takes 8 samples for each transmitted sample.

It was noted above, multiplying a Z sequence does not degrade the communication performance because the ability to decode weak signals is not due to the special structure of chirp but due to adding the samples constructively. To verify, a head-to-head comparison can be performed, e.g., between two schemes called LocOnly and ZLocOnly, where, in LocOnly, the data symbols are modulated only with the shift modulation on the original chirp, while ZLocOnly further multiplies the data symbols produced by LocOnly with a randomly chosen Z sequence. Both LocOnly and ZLocOnly can be implemented with minor modifications to ZChirp, mainly by disabling the phase and Z modulations.

Figure 3B:
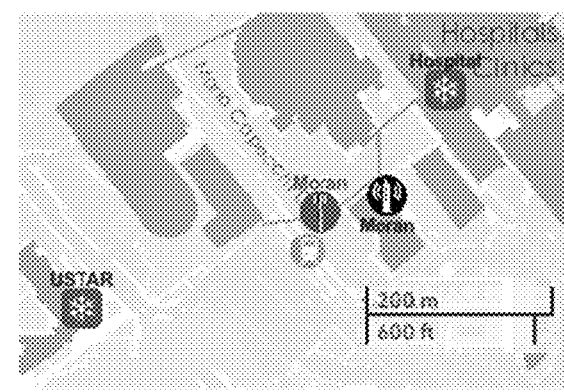
Figure 3B:
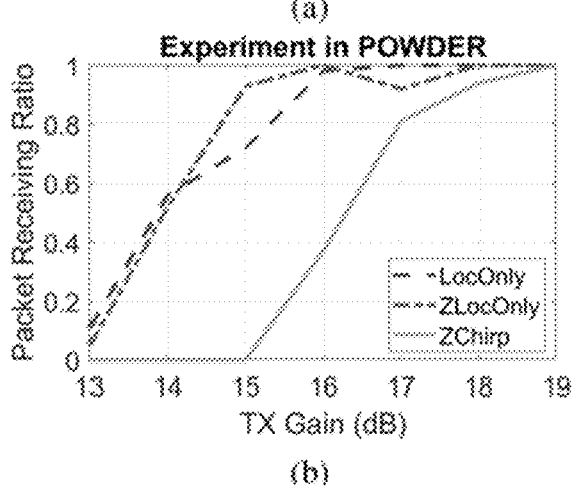

FIGS. 3B, having subpanels A and B, illustrates an experiment in the POWDER platform [23] where packets are transmitted from node "ustar" to node "hospital" shown in FIG. 3B, subpanel A, where the SF was 7, the packet size was 64 bytes, the carrier frequency was 3.675 GHz, the bandwidth was 500 kHz, and the OSF was 8. FIG. 3B, subpanel B shows the Packet Receiving Ratios (PRR) of the compared schemes as a function of the transmitter gain. It can be seen that the PRRs of LocOnly and ZLocOnly are very close, confirming that multiplying the Z sequence does not degrade the communication performance.

In FIG. 3B, subpanel B, the PRR of Zchirp is different from ZLocOnly because ZChirp also uses the Z sequences to further modulate data so that the data rate of ZChirp more than twice that of LocOnly. It is observed that the SNR threshold of ZChirp is about 2 dB higher. Overall, there is a gain; the SNR is expected to be increased by 3 dB if the data rate is doubled. The SNR threshold difference appears to exist only in the Additive White Gaussian Noise (AWGN) channels, where there is no multi-path and fluctuation of channel conditions.

Figure 4:
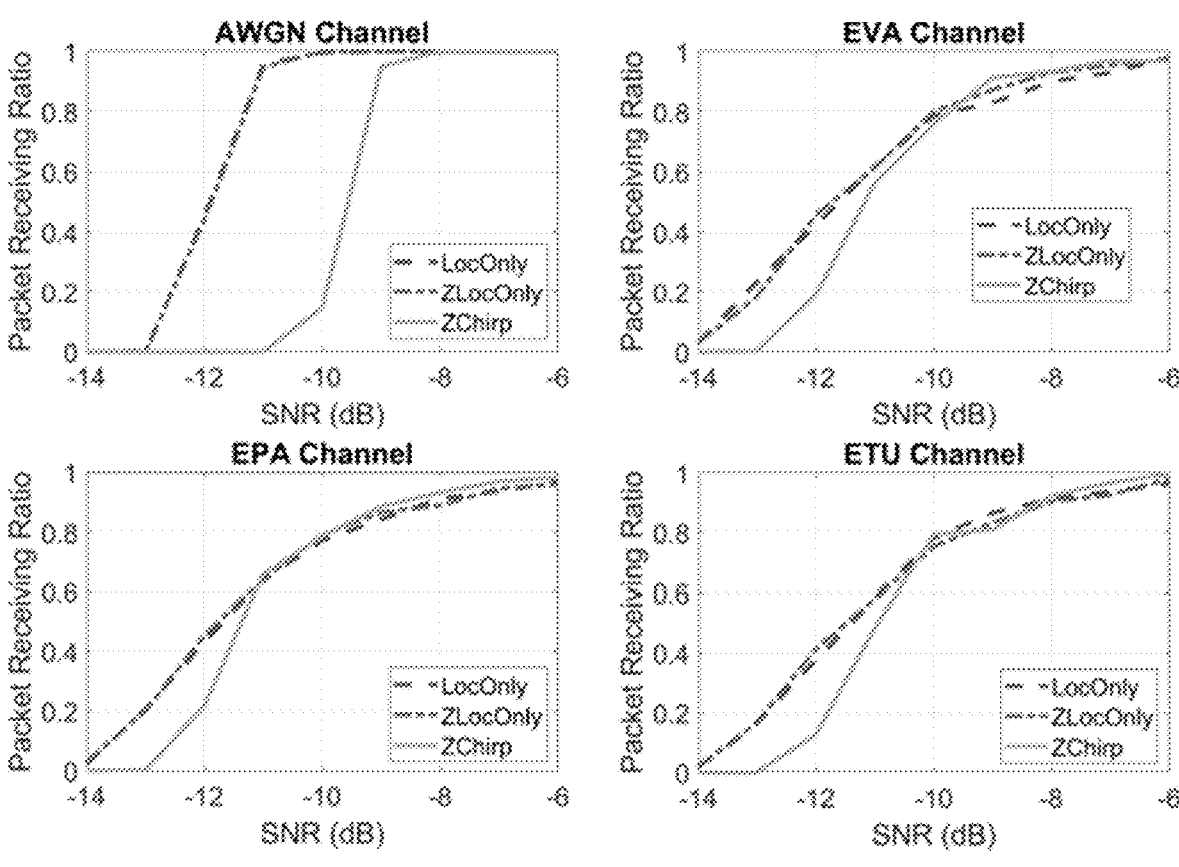
FIGS. 4A-4D show the results of communication performance tests/simulations for Zchirp

FIG. 4 shows the results with simulations under the AWGN channel as well as the LTE EPA, EVA, and ETU channels [1], [2], where the EPA, EVA, and ETU channels have increasingly stronger multipath components and larger delay spread. It can be seen that the results of the AWGN channel match those from the experiment from FIG. 3B. In each of the channels for FIG. 4, LocOnly and ZLocOnly appear to be indistinguishable, illustrating that multiplying the Z sequence does not degrade the communication performance. More over, the gap in SNR between ZChirp and LocOnly is much smaller; the gap exists only when the SNR is less than −10 dB, which is very weak when neither scheme can deliver operational PRRs for a link. If the SNR threshold is defined as the minimum SNR to reach a PRR of 0.9, ZChirp and LocOnly have the same SNR thresholds, illustrating that ZChirp could perform as well as the original chirp modulations in terms of communication range in challenging channel conditions, despite more than doubling the data rate.

Z Transform. The Z sequences can guarantee that no two sequences are similar so it is unlikely for a message modulated with one Z sequence to be mistaken for another. While this can be achieved to a degree by random binary sequences, Z sequences with internal structures can reduce the computation complexity.

The Z transform refers to the process of converting the de-chirped symbol Q to a demodulation matrix $\Xi$, after which the data modulated with the shift and Z sequences can be found. Much of the reduction of the complexity can be with the layered design of the Z sequence where the Z transform can be carried out by constructing a matrix and taking summations of the rows of the matrix. To be more specific, let $W^{-k}$ be the vector that completes k cycles in N samples with a negative frequency, i.e., $$W_t^{-k} = e^{-i2\pi kt/N}$$

for $0 \leq t < N$. The definition of Discrete-time Fourier Transform (DFT) as it pertains to this application is provided in Equation 5.

$$\Xi_k^h = \sum_{t=0}^{N-1} W_t^{-k} Q_t Z_t^h \tag{Eq. 5}$$

$$\sum_{t \in Z^{h+}} W_t^{-k} Q_t - \sum_{t \in Z^{h-}} W_t^{-k} Q_t$$

In Equation 5, $Z^{h+}$ and $Z^{h-}$ denote the indices where $Z^h$ is 1 and −1, respectively. An intermediate matrix $\Psi$ as a N by N matrix where row t can be denoted as $\Psi^t$ can be determined as $Q_t$ multiplied with $W^{-t}$, i.e., the element at row t and column k, denoted as $\Psi_{t,k}$, is $$Q_t W_t^{-k}.$$

The row of the demodulation matrix $\Xi^h$ can be obtained by adding and subtracting rows in the intermediate matrix $\Psi$.

The Layered Z Sequence. The Z sequences can be constructed with multiple layers where a Z sequence can be divided into S segments referred to as symbols, e.g., where each symbol is either L or L+1 bits. Each symbol may take V values, i.e., there are a total of V binary patterns that can be assigned to each symbol. Correspondingly, the intermediate matrix $\Psi$ may be partitioned into S submatrices, one for each symbol, where each submatrix consists of either L or L+1 rows of $\Psi$. The computation may be carried out first in the submatrices independently, which are then combined into the final result. The overall saving may be achieved where S is much smaller than N, and the symbol value V is much less than G.

As an example, the case with a different number of bits is a simple extension. For the case where each symbol has the same number of bits, the operation can be performed for the layered approach in which $Z^h$ can be generated according to a codeword $\Theta^h$, which is a vector of length $$S: [u_0^h, u_1^h, \ldots, u_{S-1}^h],$$

where each element is within [0, V−1]. There are a total of V binary vectors of length L are the symbol patterns, where symbol pattern u is denoted as $\eta^u$ for $0 \leq u < V$. The symbol $\Pi^m(\ )$ can be the permutation used for the symbol m, and $\Pi^m(u)$ is the value mapped from u where $0 \leq u < V$. The Z sequence can then be determined as the concatenation of the corresponding symbol patterns per Equation 6.

$$\eta^{\Pi^0(u_0^h)} \| \eta^{\Pi^0(u_1^h)} \| \eta^{\Pi^0(u_{S-1}^h)} \tag{Eq. 6}$$

For symbol m, the associated submatrix can be $\psi^m$, and $\lambda_{m,u}$ be the value of $\psi^m$ evaluated for $\eta^{\Pi^m}(u)$. $\lambda_{m,u}$ as a vector of length N can be calculated according to Equation 7.

$$\lambda_{m,u} = \sum_{t \in \eta^{\Pi^m(u)+}} \psi^{m,t} - \sum_{t \in \eta^{\Pi^m(u)-}} \psi^{m,t} \tag{Eq. 7}$$

In Equation 7, $\psi^{m,t}$ denotes row t of $\psi^m$, and $\eta^{\Pi^m(u)+}$ and $\eta^{\Pi^m(u)-}$ denote the indices where $\eta^{\Pi^m(u)}$ is 1 and −1, respectively. The row of the demodulation matrix can be expressed as Equation 8.

$$\Xi^h = \sum_{m=0}^{S-1} \lambda_{m,u_m^h} \tag{Eq. 8}$$

Reduction of Addition with the Layered Approach. The reduction of additions can be achieved with the layered approach. It can be assumed that each symbol is L bits, while the analysis can be readily extended to the case where the number of bits in the symbols differs. To obtain all values of all symbols, no more than SV LN additions are needed. For each row vector in the demodulation matrix $\Xi$, the summation of the symbol values can be obtained with no more than SN additions. The total number of additions may thus be no more than SV LN+GSN, which can be simplified to $VN^2$+GSN because SL=N. Because binary vectors V>S, the bound can be further simplified to V $(N^2$+GN). In addition, binary vectors V can be chosen so that $V^2$ is as close to G as possible so that the bound can be approximated by $\sqrt{G}(N^2$+GN). In contrast, a naïve implementation may need GN(N−1) additions.

To this end, the amount of savings can be roughly a factor of $\sqrt{N}$ when G=N. With the fast addition method discussed herein, the number of additions can be further reduced by a factor of 4.

Codeword Generation with the RS code. The Reed-Solomon (RS) code may be used, as one example, to generate the codewords to guarantee the minimum distances between the codewords. The codeword includes the data symbols and the parity-checking symbols. Currently, the number of data symbols is 2 so that the RS code can generate $V^2$ unique codewords and guarantee that any two codewords differ in at least S−1 symbols. Constraints may be applied when choosing the parameters of the RS code. First, V may be the power of 2, i.e., $V=2^v$ for some integer v. Second, V>S, to provide the maximum length of the codeword as V−1. Third, $V^2 \geq G$.

Choice of Parameters. The parameters of the layered approach can be S, L, and V. Fewer symbols can lead to fewer computations; however, they also can mean a larger length L and a higher cost of having an identical symbol in two codewords. In some embodiment, the codeword length S is chosen according to a rule that leads to provable theoretical guarantees, e.g., if SF is even, codeword length $$S = 2^{\frac{SF}{2}} - 1;$$

else, $$S = 2^{\frac{SF-1}{2}}.$$

As a result, it can be verified that $$L = 2^{\frac{SF}{2}} + 1$$

if SF is even and $$L = 2^{\frac{SF+1}{2}}$$

otherwise. As binary vectors V should be greater than the codeword length S and no less than $\sqrt{G}$, which is $$2^{\frac{SF}{2}}, V = 2^{\frac{SF}{2}}$$

if SF is even, and $$V = 2^{\frac{SF+1}{2}}$$

if SF is odd.

Symbol Pattern Generation with Linear code. The symbol patterns may also be different from each other, so that $\lambda_{m,u}$ should be small if $\eta^u$ is not the transmitted symbol pattern. Therefore, for any $u_1 \neq u_2$, the Hamming distance between $\eta^{u_1}$ and $\eta^{u_2}$ may be maximized. In addition, because the elements are either 1 or −1 and the receiver demodulates the signal by choosing the highest point in the demodulation matrix $\Xi$, the Hamming distance between $\eta^{u_1}$ and $-\eta^{u_2}$ as the negative Hamming distance may also be minimized. One way to see this is by considering a case in which $\eta^{u_1}$ and $\eta^{u_2}$ differ at every element while $\lambda_{m,u_1}$ and $\lambda_{m,u_2}$ may have the same magnitude and just different signs. The quality of the symbol patterns may be measured by the double minimum Hamming distance (DMHD), which is the minimum of the original Hamming distance and the negative Hamming distance.

The symbol patterns may be generated according to a linear binary (L, v) code. The generator matrices can be denoted as $$G_{L+1,v}^{SF}.$$

The generator matrices can include a base matrix By and configured as a v by $2^v$ binary matrix, in which column a is the binary representation of a for $0 \leq a < 2^v$. For example, $$B_2 = \begin{bmatrix} 0 & 0 & 1 & 1 \\ 0 & 1 & 0 & 1 \end{bmatrix}.$$

A generator matrix with v rows and L columns may be then obtained by concatenating $\lfloor L/2^v \rfloor$ base matrices horizontally and then taking the first L columns. The construction is further illustrated per Theorems 1-3.

Theorem 1. Denote DMHD of the symbol patterns according to a generator matrix as D( ). $D(B_v)=2^{v-1}$.

Proof. The proof is based on induction. First, the claim is clearly true for symbol patterns generated by $B_2$, namely, 0000, 0011, 0101, and 0110. Suppose the claim is still true till v−1. Note that By can be obtained by concatenating two $B_{v-1}$ horizontally, then adding one row in which the first half is '0' and the second '1'. The difference between any two symbol patterns is a linear combination of the rows in Bv. If the new row is not involved, due to the induction hypothesis, there are exactly 2v−2 elements that are '1' in both the first and second half; therefore, the claim is true. If the new row is involved, the claim is still true because the '1' in the second half is all flipped to '0' and '0's to '1'.

The qualities of the generator matrices are further analyzed in the following, where the maximum DMHD for given L and v is denoted as $\Phi_{L,v}$.

Lemma 1. If L=2d+1 for some integer d, $\Phi_{L,v} \leq d$ for any v.

Proof. Suppose the claim is not true and $\Phi_{L,1} \geq d+1$. Without Loss of Generality, consider an arbitrary symbol pattern, denoted as f, with the all-0 symbol pattern, denoted as $\eta_0$. To achieve an original minimum Hamming distance of d+1, 1 should have at least d+1 '1's. To achieve a negative minimum Hamming distance of d+1, $\eta$ should have at least d+1 '0's. Clearly, this cannot be achieved with only 2d+1 bits.

Lemma 2. If L=2d for some odd integer d, $\Phi_{L,v} \leq d-1$ for any v>1.

Proof. Suppose the claim is not true and $\Phi_{L,2} \geq d$. Therefore, any non-zero symbol pattern must have exactly d '1's and d '0's. Without Loss of Generality, suppose there is a symbol pattern $\eta_1$, in which the first half of the bits are '1' and the second half is '0'. Consider another symbol pattern $\eta_2$.

Denote the number of '1's in the first half of $\eta_2$ as x. Clearly, the Hamming and negative Hamming distances between $\eta_1$ and $\eta_2$ are 2d−2x and 2x, respectively, the minimum of which is less than d for any x.

Theorem 2. The generator matrices used for symbol pattern generation are theoretically optimum in the sense that they achieve the maximum DMHD.

Proof. When SF is even, the generator matrices have $$\frac{SF}{2}$$

rows but L or L+1 columns, where $$L = 2^{\frac{SF}{2}} + 1.$$

The DMHDs of, which are both types of matrices, are at least $$2^{\frac{SF}{2}-1},$$

as padding additional columns does not reduce the DMHD. The DMHD of the first type of matrices is optimal based on Lemma 1. The DMHD of the second type of matrices is optimal based on Lemma 2.

When SF is odd, there is only one type of generator matrix with $$\frac{SF+1}{2}$$

rows and $$2^{\frac{SF+1}{2}}$$

columns. The DMHD of the matrix is $$2^{\frac{SF-1}{2}},$$

which is optimal based on similar arguments as those in Lemma 1.

DMHD of the Z Sequences. The following theorem gives the DMHD of the Z sequences, which is defined as the minimum of the original Hamming distance and the negative Hamming distance among all pairs of Z sequences.

Theorem 3. The DMHD of the generated Z sequences is at least $$\frac{N}{2} - \sqrt{N}$$

when SF is even and $$\frac{N}{2} - \sqrt{\frac{N}{2}}$$

when SF is odd, where N is the length of the chirp.

Proof. With the RS code, two codewords differ in at least $(S-1)$ symbols. Clearly, the DMHD of the Z sequences is $(S-1)$ times the DMHD of symbol patterns, which is at least $2^{v-1}\lfloor L/2^v \rfloor$. As $L=\lfloor N/S \rfloor$, the bound is $$(S-1)2^{v-1}\left\lfloor \frac{N}{S2^v} \right\rfloor \qquad \text{(Eq. 9)}$$

When SF is even, $$S = 2^{\frac{SF}{2}} - 1$$

and $$v = \frac{SF}{2}.$$

It can be quickly verified that $$\left\lfloor \frac{N}{S2^v} \right\rfloor = 1.$$

Therefore, the bound can be expressed per Equation 10.

$$(S-1)2^{v-1} = \left(2^{\frac{SF}{2}} - 1 - 1\right)2^{\frac{SF}{2}-1} = \frac{N}{2} - \sqrt{N} \qquad \text{(Eq. 10)}$$

In Equation 10, when SF is odd $$S = 2^{\frac{SF-1}{2}}$$

and $$v = \frac{SF+1}{2}.$$

It can also be quickly verified that $$\left\lfloor \frac{N}{S2^v} \right\rfloor = 1.$$

Therefore the bound can be expressed per Equation 11.

$$(S-1)2^{v-1} = \left(2^{\frac{SF-1}{2}} - 1\right)2^{\frac{SF+1}{2}-1} = \frac{N}{2} - \sqrt{\frac{N}{2}} \qquad \text{(Eq. 11)}$$

The ideal DMHD is $$\frac{N}{2},$$

in which case the Z sequences are orthogonal. Based on Theorem 3, the generated Z sequences are at most $\sqrt{N}$ away from the optimal, which means that the highest peak in $\Xi$ other than the actually transmitted peak has most of the samples canceled with each other, leaving at most $2\sqrt{N}$ samples that can be added constructively, reaching a fraction of $4/N$ of the power of the actual transmitted peak. The actual performance is better than the bound because the bound is the worst case.

Mapping of Symbol Values to Symbol Patterns. It was observed that the RS code can generate codewords that are different, but the differences are not random, leading to high correlations between a small number of Z sequences. By changing the mapping of the symbol values to the symbol patterns by applying different permutations for different symbols, the issue can be avoided, e.g., with $\Pi'''(u)=\text{mod }[(2m+1)u, V]$ if m is odd and $\Pi'''(u)=\text{mod }[(2m+1)u(u+1)/2, V]$ if m is even.

The permutation can also address shifted RS codewords where a cyclically shifted version of a codeword forms a codeword. With a certain degree of phase shift or misalignment, the issue can be present. With the permutation, the identical symbols from the nodes would be mapped to different symbol patterns.

Examples of additional Optimization. Steps in the implementation of the Z transform can be further optimized.

i. Obtaining $\Psi$. To obtain $\Psi$, naively, one may need N complex multiplications for each row of $\Psi$ and $N^2$ in total. Because of the introduction of the intermediate matrix $\Psi$, the multiplication can be reduced to 9 for each row and 9N in total if some very slight loss of accuracy can be accepted, e.g., for a generic row, denoted as $\Psi^1$.

First, consider multiplying $|Q_t|$ with vector $$\Lambda = \left[1, e^{\frac{i2\pi}{N}}, e^{\frac{i4\pi}{N}}, \dots, e^{\frac{i2(N-1)\pi}{N}}\right].$$

Actual multiplications may be needed only for $\frac{1}{8}$ of values in $\Lambda$, i.e., those with phases in $[0, \pi/4]$, because those with phases in $(\pi/4, \pi/2]$ can be obtained by swapping the real and imaginary parts of those in $[0, \pi/4]$; subsequently, those in $(\pi/2, \pi]$ can be obtained by swapping the real and imaginary parts and flipping the signs of the imaginary parts of those in $[0, \pi/2]$; lastly, those in $(\pi, 2\pi]$ are simply the negatives of those in $[0, \pi]$. Then, after approximating the phase of $Q_t$ as a multiple $$e^{\frac{i2\pi}{N}},$$

$Q_t\Lambda$ can be obtained by cyclically shifting $|Q_t|\Lambda$ according to the phase of Qt. Lastly, the intermediate matrix $\Psi^t$ can be obtained by relocating the elements in $Q_t\Lambda$, with the unique values in $W^{-t}$ being a subset of those in $\Lambda$.

The demodulation may employ N/8+1 multiplication to obtain a row of the intermediate matrix $\Psi^t$. With the number in $$\left[1, e^{\frac{i2\pi}{N}}, e^{\frac{i4\pi}{N}}, \dots, e^{\frac{i\pi}{4}}\right]$$

being evenly-spaced constants, at a very slight loss of accuracy, typically less than 1%, multiplications of only 9 points, $$\left[1, e^{\frac{i\pi}{32}}, e^{\frac{i\pi}{16}}, \dots, e^{\frac{i\pi}{4}}\right]$$

can be employed and the rest can be approximated with linear interpolation. No actual divisions are needed in the interpolation as the number of steps between two points can be a multiple of 2. To further avoid multiplications in real time, pre-computed multiplication tables can be stored having values for the the same 9 constants multiplied with $|Qt|$ for every t.

ii. Fast Summation. After obtaining the intermediate matrix $\Psi$, additions can be performed to obtain the demodulation matrix $\Xi$. The fast summation can be employed using $\Psi$ with a saving factor of 4. The fast summation may be performed by letting t'=mod (t, 4) for the type of $\Psi^t$. Consider $$\Psi_k^t$$

for $0 \leq k < N/4$. For $0 \leq a < 4$, the fast summation can be expressed per Equation 12.

$$\Psi_{k+aN/4}^t = Q_t e^{-i2\pi kt/N} e^{-iat'\pi/2} \quad \text{(Eq. 12)}$$
$$= \Psi_k^t e^{-iat'\pi/2}$$

Different scenarios and conditions for the calculation of Equation 12 are provided in Table 1.

TABLE 1

| Conditions | Type of $\Psi$ |
|---|---|
| when t' = 0, for all $0 \leq a < 4$ and $0 \leq k < N/4$ | $\Psi_{k+aN/4}^t = \Psi_k^t$ |
| when t' = 1, for $0 \leq k < N/4$ | $\Psi_{k+\frac{N}{4}}^t = \mathfrak{I}[\Psi_k^t] - i\mathfrak{R}[\Psi_k^t]$ |
| while for $0 \leq k < N/2$ | $\Psi_{k+\frac{N}{2}}^t = -\Psi_k^t$ |
| when t' = 2, for $0 \leq k < N/4$ | $\Psi_{k+\frac{N}{4}}^t = -\Psi_k^t$ |
| while for for $0 \leq k < N/2$ | $\Psi_{k+\frac{N}{2}}^t = \Psi_k^t$ |
| when t' = 3, for $0 \leq k < N/4$: | $\Psi_{k+\frac{N}{4}}^t = \mathfrak{I}[\Psi_k^t] - i\mathfrak{R}[\Psi_k^t]$ |
| While for for $0 \leq k < N/2$: | $\Psi_{k+\frac{N}{4}}^t = -\Psi_k^t$ |

Indeed, the intermediate matrix $\Psi$ can be partitioned into 4 submatrices, one for each type. The summations of each submatrix can be carried out for the first quarter of the columns because the rest can be obtained by simply changing signs or swapping the real and imaginary parts. The number of additions is, therefore, reduced by a factor of 4.

To combine the fast summation with the layered design, ideally, a symbol may be assigned to rows of the same type whenever possible so that each symbol produces the summation of only type, which can be readily combined with those of the same type. In an implementation, 4 symbols can be used that contain rows of two types, which can be processed separately. The overall saving factor would be close to 4.

Packet Detection, Synchronization, and CFO Estimation. Packet detection is particularly challenging in networks with an ALOHA-style Medium Access Control (MAC) layer where the incoming packets may start at any time. In addition, parameters, such as the symbol boundary and CFO, are often learned during packet detection; thus, improper detection acquisition can affect the decoding of the data.

Assume the Over-Sampling Factor (OSF) is a as the number of samples the receiver takes for each transmitted sample by the node. With $\alpha > 1$ (e.g., $\alpha=8$), a higher timing granularity can be achieved to better match the propagation delay. The timing offset $\tau$ of a packet can be written as $\tau = \tau_i\alpha + \tau_f$, where $\tau_i$ and $\tau_f$ are called the integer timing offset and the fractional timing offset, respectively. The CFO of a packet can be written as $\gamma\beta$, where the integer and fraction parts of $\gamma$ are denoted as $\gamma_i$ and $\gamma_f$, and are called the integer CFO and fractional CFO, respectively.

Figure 5A:
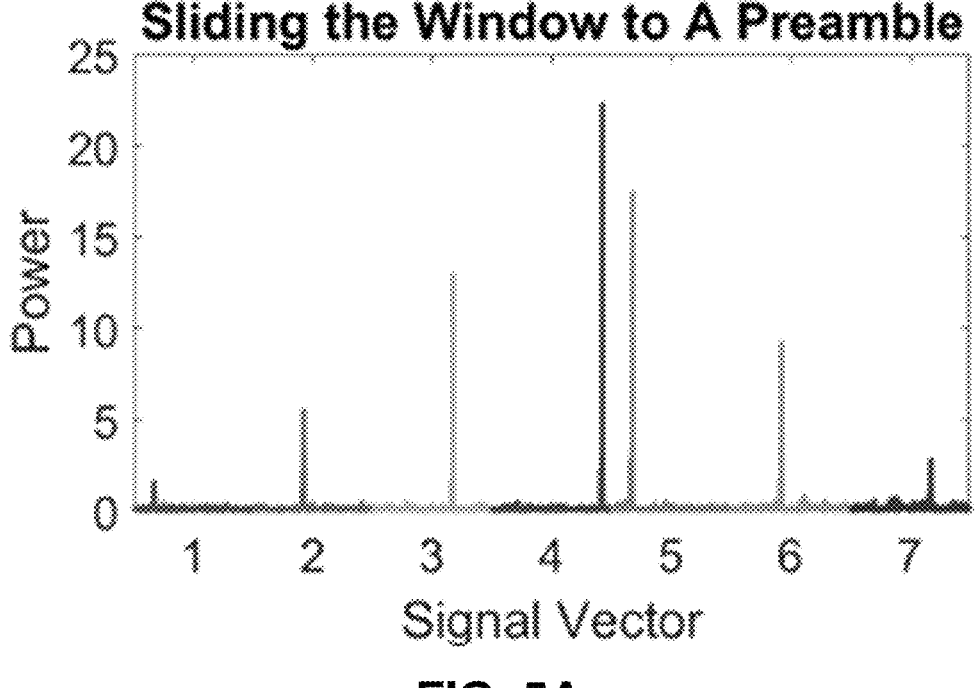
FIGS. 5A-5C show aspects of the method of operation of ZChirp.

Pre-screening. The packet acquisition procedure may include pre-screening, coarse estimation, fine estimation, and PHY header check. TPre-screening can be performed to quickly spot the locations where a packet may occur. By sliding a window of length $2^{SF+2}$ by $2^{SF}$ samples at a time and computing the signal vector of the samples in the window, the upchirp of the preamble can result in visible peaks in 7 consecutive signal vectors when the window partially overlaps with the upchirp. Where the peaks are shifted by $2^{SF}$ in consecutive signal vectors, clear pattern of a potential packet even when there is a timing misalignment. FIG. 5A shows an example of peaks in consecutive windows found in pre-screening.

At this point, the CFOs of the packets are unknown. The height of the peak is heavily related to the fractional CFO. Therefore, the pre-screening process is repeated one more time with a sinewave with frequency $\beta/2$ multiplied by the time domain signal. The same process can also be applied to the downchip in the preamble. All potential packets that pass the pre-screening are called candidates.

Coarse Estimation. Coarse estimation can find coarse estimates of the start time and the integer CFO of packets, as well as removing candidates that are actually not packets. That is, by estimating the integer timing offset and integer CFO by applying the method proposed in [86] and removing a candidate if certain patterns cannot be found after the integer timing offset and integer CFO have been canceled, $x_u$ and $x_d$ can be at 0 or 1, where $x_u$ and $x_d$ are the locations of the upchirp peak and the downchirp peak, respectively.

In an example, consider a candidate detected with the upchirp because the process is the same for a candidate detected with the downchirp. According to [86], the integer start time and the integer CFO are $\lfloor (x_u - x_d)/2 \rfloor$ and $\lfloor (x_u + x_d)/2 \rfloor$, where $\lfloor \ \rfloor$ denotes rounding a number to the nearest integer. During the coarse estimation, the start time of the candidate is first adjusted based on the peak location of the upchirp, so that the peak is close to location 0, i.e., $x_u$ is close to 0. The location of the downchirp peak may not be simply obtained by finding the highest point in the signal vector because the highest point could be caused by another packet or by another path. Instead, the signal around the peak in the upchirp signal vector may be defined as the path feature, and $x_d$ is the location in the downchirp signal vector that best matches the path feature.

Figure 5B:
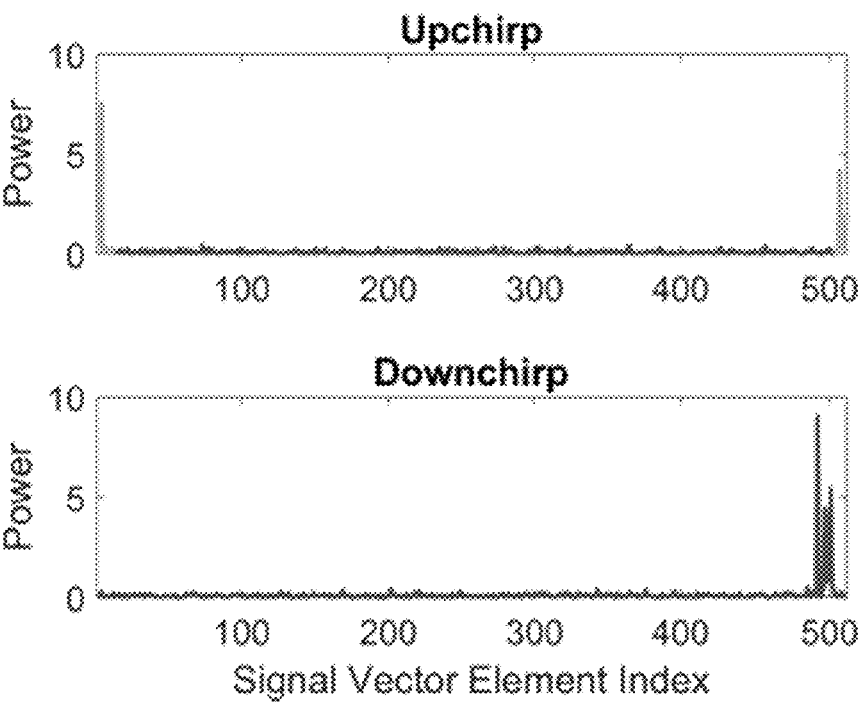

FIG. 5B shows an example of the path feature. There could also be some candidates that result in the same or similar detected packet, i.e., packets with starting time differ by no more than $4\alpha$. Such duplicates are filtered out by selecting only the one with the highest power.

Figure 5C:
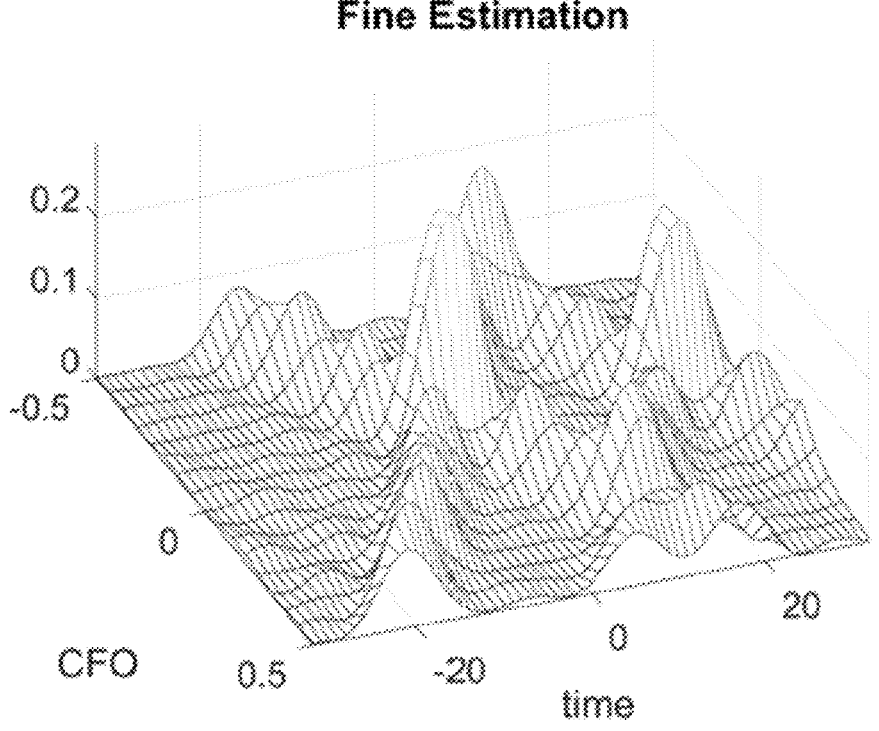

Fine Estimation. FIG. 5C shows a fine estimation of timing and CFO. Fine estimation can find the fractional timing offset and CFO, which are important for the decoding of ZChirp symbols because the effect of permutation cannot be removed with residual timing error and CFO. The estimation may be based on the energy at frequency 0 being maximized after the dechirping step if the timing error and CFO have been completely canceled. That is, let the received preamble signal according to the coarse estimate after dechirping be R. Let the preamble with timing error $\tau_f$ and CFO $\gamma_f$ after dechirping be $\lambda_{\tau_f \gamma_f}$. The estimated residue timing offset and CFO, denoted as $\hat{\tau}_f$ and $\hat{\gamma}_f$, respectively, can be determined per Equation 13.

$$(\hat{\tau}_f, \hat{\gamma}_f) = {}^{argmax}_{\tau_f, \lambda_f} \left| \sum [R \odot \lambda'_{\tau_f, \gamma_f}] \right| \qquad \text{(Eq. 13)}$$

In Equation 13, $\tau_f \in [-4\alpha, 4\alpha]$ and $\gamma_f \in [-0.5, 0.5]$ at a step of $\frac{1}{16}$. Equation 13 is determined when $\tau_f$ and $\gamma_f$ match the actual fractional timing and CFO, assuming there is only one path, R and $\lambda'_{\tau_f \gamma_f}$ are identical and $R \odot \lambda'_{\tau_f \gamma_f}$ should be an all-1 vector, which leads to the largest value after the summation. When there are multiple paths, the signals from other paths tend to cancel after the summation.

PHY Header Check. Lastly, the PHY header of the packet can be decoded. In addition to learning the necessary information to decode the data in the packet, the CRC in the PHY header also helps remove falsely detected packets because the CRC will most likely fail for false packets.

Zchirp Discussion. ZChirp was based on the chirp modulation that was used in the past but with the key distinction of multiplying the chirp with a binary sequence for several purposes. First, chirps multiplied with different binary sequences (e.g., Z sequences) had very low crosscorrelations, which significantly reduced demodulation errors due to interference and allowed for multiple access. In addition, a node may double the communication speed by multiplying different Z sequences depending on the data. Real-world experiments show that multiplying the chirp with the binary sequence did not increase bandwidth usage or reduce the communication range. The binary sequences can be designed to reduce the interference and the computation complexity.

ZChirp can be applied to Low Earth Orbit (LEO) satellite networks, such as StarLink, for ALOHA-style grant-free uplink communications, which does not need the nodes to request medium access before the data transmissions and significantly reduces the latency. ZChirp can also be applied to Low Power Wide Area Networks (LPWAN) to support the communications from the nodes to the gateway. ZChirp has been designed, implemented, and tested, which includes data modulation, packet acquisition, and interference canceling. Experiments in the POWDER platform confirm that ZChirp packets can be received correctly over real-world wireless channels without prior synchronization. Simulations with the satellite channel models and the LTE ETU channel models show that ZChirp achieves significantly higher network capacity than existing satellite communication technologies and LPWAN technologies, where the improvement is typically 200-300% or more.

Chirp has been used in sonar, radar, and laser systems, as well as in data communication systems, such as LoRa [3] and IEEE 802.15.4a [40], [52], where it is commonly referred to as Chirp Spread Spectrum (CSS) modulation. ZChirp is very different from the traditional CSS, primarily because Zchirp multiplies the chirp with the Z sequence and generates completely different baseband signals to achieve higher network capacity. In addition, traditional CSS is typically designed for low data rates, while ZChirp is designed for broadband access in satellite networks and will address challenges in high bandwidth channels. There have also been proposals to modify the chirp for LEO networks [60], [33], which are very different from multiplying the chirp with the Z sequence.

Early satellite uplink standards include DVB-RCS [8] and IPoS [73]. Recently, 3GPP has started the expansion to Non-Terrestrial Networks [41], [45], [42], [65], where current proposals are similar to those in existing cellular networks with Orthogonal Frequency-Division Multiplexing (OFDM), although challenges due to the high PAPR of OFDM signals have been noted [65]. ZChirp signal can provide a constant envelop and has 0 dB PAPR. In addition, ZChirp signal facilitates random access, which complements the connection-orientated services in 3GPP. Existing satellite random access techniques include Contention Resolution Diversity Slotted ALOHA (CRDSA) [24], [30], which decodes the packets from multiple user terminals with Successive Interference Cancellation (SIC). Another example is Enhanced Spread Spectrum Aloha (E-SSA) [64], [35], [31], with which a user terminal multiplies the data with a binary code to spread the interference. ZChirp can achieve higher spectrum efficiency than E-SSA. Commercial LEO networks, such as Starlink, use proprietary modulation techniques. Starlink downlink signal has been analyzed and found to be OFDM [37]; however, the uplink modulation is still unclear. The PAPR of the uplink signal is more critical, because the transmitter is the user terminal, which cannot use high-cost amplifiers as the satellite.

Wi-Fi allows grant-free access to the medium with Carrier Sense Multiple Access (CSMA) [72], which, however, cannot be applied to LEO networks, primarily because many user terminals cannot sense each other due to the physical distance. Since 5G, grant-free communication has been proposed for cellular networks to support new service classes, such as Ultra-Reliable Low Latency Communication (URLLC) [13], [14], [12]. Grant-free communications are expected to further expand in 6G [93]. Current proposals include those that do not need fundamental modifications to the physical layer, such as repeating a packet K times [46] or transmitting a packet in a random frequency channel [21], as well as those based on Non-Orthogonal Multiple Access (NOMA) [46], which resolves collisions in the physical layer. Well-known NOMA schemes include Sparse Code Multiple Access (SCMA) [54], Interleave Division Multiple-Access (IDMA) [58], Multi-User Shared Access (MUSA) [97], [96], Pattern Division Multiple Access (PDMA) [29], etc., which have achieved impressive overload factors under the grant-based model where nodes operate according to parameters given by a central controller, such as codes, patterns, and transmission power. In contrast, ZChirp is designed to support random access; therefore, ZChirp is different from grant-based NOMA [94], [89], [92], [69] and can be considered as a form of grant-free NOMA [78], [66], [70], [19], [20], [74], [28], [56], [15], [91], [95], [80]. However, Zchirp can explore the chirp for random access and is expected to be more suitable for satellite communications because it has 0 dB PAPR and does not need symbol level synchronization or perfect Channel State Information (CSI).

There have been studies on other aspects of LEO networks, such as the downlink [79], performance measurement [39], handover [18], [50], navigation [59], [48], TCP over LEO networks [53], [57], satellite constellation [38], [55], and edge computing [84], [81]. ZChirp focuses on the physical and link layers of the uplink and, therefore, complements such work.

Many LPWAN technologies have emerged today, including LoRa [3], Sigfox [6], [49], RPMA [5], [51], Weightless-W/N/P [7], IEEE 802.11ah [16], [77], IEEE 802.15.4g [25], [71], NB-IoT [4], [26], [83], EC-GSM [17], [63] and eMTC [17], [63]. LoRa has attracted significant interest in recent years because of its simplicity, long communication range, and large existing global footprint. The capacity of LoRa has drawn much attention with a focus on resolving packet collisions [68]. Many solutions have been proposed, such as Choir [32], mLoRa [82], FTrack [88], CoLoRa [76], Nscale [75], SCLoRa [36], Pyramid [90], AlignTrack [27], PCube [87], CIC [67], and TnB [62]. The key advantage of such solutions is that they do not need to modify existing LoRa nodes and can be immediately deployed. At the same time, they are also limited by the current design of LoRa, in particular, the chirp modulation, which makes it difficult to separate the signals from different nodes. For a higher performance, it has been proposed to rethink the chirp modulation.

CurvingLoRa [44] is the most recent that focuses on improving the network capacity by a modified chirp in which the frequency increases non-linearly. ZChirp also belongs to this category.

In addition to satellite networks, ZChirp can also be applied to Low-Power Wide-Area Networks (LPWAN). Many LPWAN technologies have emerged as of today, including LoRa, RPMA, Weightless-W/N/P, IEEE 802.11ah, IEEE 802.15.4g, NB-IoT, EC-GSM, and eMTC. LoRa has attracted significant interest in recent years because of its simplicity, long communication range, and large existing global footprint. ZChirp has been compared with the state-of-the-art version of LoRa, namely CurvingLora, and has shown an improvement in network capacity by more than 200%.

An advantage of ZChirp cancan be that it achieves much higher network capacity than the existing technologies, where the improvement can be over 200% or even 400%. As a result, the network service providers or operators can support much more users and generate much more revenue.

The improvement of network capacity can be achieved by multiplying the chirp with a binary sequence with very low cross-correlations to reduce demodulation errors due to interference and allow multiple nodes to transmit packets at the same time without causing errors to each other. Second, the binary sequences can be used to modulate data to double the communication speed and, therefore reduce the transmission time of packets and free up more air time for the network. Real-world experiments prove that multiplying the chirp with such a binary sequence does not increase bandwidth usage or reduce the communication range while reducing the interference and the computation complexity.

In addition to the increased network capacity, ZChirp also can be used for satellite networks and LPWANs in having a constant-envelope modulation and a node can transmit packets without any prior coordination with the satellite or the gateway.

Example Quadrature Code (QCode)

To provide higher network capacity (i.e., number of accessible devices) and higher data rates (throughout of data that can be transmitted), the QCode codebook can be optionally employed to increase the number of bits modulated on each symbol used in the modulation of the data in a packet payload for data transmission. Each symbol can be a complex vector of length $2^{SF}$, where SF is a Spreading Factor. Each element of the symbol can be one of four possible values from the QPSK constellation: 1, i, −1, and −i. Results show that for a given data rate, the capacity of QCode can be increased 3× over that of state-of-the-art Uncoordinated Access Channels (UCACH) communication protocols.

QCode can achieve both high network capacity and high data rates for broadband LEO networks by being configured to aggressively increase the number of bits modulated on each symbol. To this end, with the same symbol length and, hence, roughly the same network capacity, QCode can achieve higher data rates for the user terminals. To be more specific, with QCode, each symbol may be a complex vector of length $2^{SF}$, where SF is the Spreading Factor, which may be 4, 5, 6, etc.

An element in a symbol may be one of 4 possible values from the QPSK constellation, namely, 1, i, −1, and −i. The QCode symbol can be modulated $2^{SF+2}$ bits as the signal of a symbol can be one of $2^{2SF+2}$ possibilities. In contrast, E-SSA modulated only 2 bits per symbol with QPSK. QCode has been implemented and demonstrated with real-world experiments in the POWDER wireless platform [14], which is an open wireless testbed at the University of Utah with radios that can be controlled remotely. Further evaluations had also been conducted with simulations using the 3GPP New Radio (NR) Non-Terrestrial Network (NTN) channel model [3], [5], [4], [47], [30]. The results showed that, with similar data rates for the user terminals, the network capacity of QCode can be 3.14× that of E-SSA.

To reduce computation complexity in real-time, the exemplary system and method use the QPSK constellation, which avoids the inner product calculation because multiplying a complex number with 1, i, −1, and −i requires changing the sign and swapping the real and imaginary parts. QCode can further reduce the computation complexity with a segmented design of the code vectors. The overall complexity of demodulating a QCode symbol can be $4N^2$ complex additions, where $N=2^{SF}$ and denoted the symbol length, which is comparable to a Fast Fourier Transform (FFT) of a vector of the same length when SF was small, such as 6 or less.

Node Side Operation. A user terminal (i.e., node) can estimate and cancel the Carrier Frequency Offset (CFO) and Doppler frequency shift based on the downlink beacon signals from the gateway. When there is data to transmit, the node can pick an SF depending on the channel condition, and transmits the packet. A QCode packet (e.g., 106) can include the preamble 112, the physical layer header (PHY header) 122, and the data 124. The preamble 112 can be employed to allow the gateway to detect the packet 106, and estimate parameters such as the start of the packet, the Carrier Frequency Offset (CFO), the power level, as well as the delays and gains of paths in multi-path channels. The PHY header 122 can be employed to inform the gateway about the length of the packet 106 and could also carry other information, such as the coding rate of the packet.

Data Modulation and Demodulation. An SF is a small integer, such as 4, 5, or 6. A data symbol is a complex vector of length N and modulates $2^{SF+2}$ bits, where $N=2^{SF}$. The exemplary QCode modulation and demodulation can be pre-computed as a codebook, e.g., consisting of at least 22SF code vectors, where each code vector is a complex vector of length N and each element is either 1, i, −1, or −i. To modulate $2^{SF+2}$ bits, the first $2^{SF}$ bits can be used as an index to select a specific code vector, while the remaining 2 bits determine the phase shift to be applied to the selected code vector with respect to the previous symbol, where the phase shift value could be 0, $\pi/2$, $\pi$, or $3\pi/2$.

The demodulation operation can include computing the inner products of a received symbol Y as a complex vector of length N, with all code vectors in the codebook. If the largest norm of the inner products is determined with code vector h, the first 2SF demodulated bits can be the binary of h. Then, the phase difference of Y with the last received symbol can be computed, which can be used to determine the 2 bits modulated with phase. It can be observed that no complex multiplication is needed in the demodulation thus, the demodulation operation is low in complexity and computation requirement.

The demodulation operation can split the to-be-transmitted data into two parts to be modulated by the code vector and phase, respectively. Each modulation may employ independent error correction codes, e.g., the Reed-Solomon (RS)

code with a coding rate of 1/2 for code vector modulation and the Turbo code [13] with a coding rate of 1/2 for phase modulation. The encoding of the Turbo code and the RS code involves only straightforward linear calculations and does not significantly increase the node complexity or power consumption. As the coding rates are 1/2 for both the code vector and phase modulations, each symbol can modulate SF+1 coded bits. If the communication bandwidth is B Hz, the PHY layer data rate is $(SF+1)B/2^{SF}$ measured in bps as it takes $2^{SF}/B$ seconds to transmit a complete symbol. For example, when B is 25 MHz, the data rates are 7.81 Mbps, 4.69 Mbps, and 2.73 Mbps for SFs 4, 5, and 6, respectively.

To confine the signal within the system bandwidth, pulse-shaping filters may be used to remove the high frequency signals caused by transitions from one QPSK constellation point to another. For example, the standard Raised Cosine filter with a roll-off factor of 0.5, spanning 5 symbols, can be used. The signal can also be clipped so that the typical PAPR is 2.2 dB. SFs from 4 to 6 were evaluated, where the codebook length is $2^{2SF}$; however, the modulation may be applied to other values of SF and other codebook sizes. With SFs from 4 to 6, QCode may be employed for broadband UCACHs with high data rates. SFs higher than 6 may lead to low data rates, while SFs lower than 4 may not be robust against interference.

Gateway Side Operation. The gateway may execute a packet detection operation continuously to search for packets in every SF. The detected packets may be sorted according to the estimated power levels, where packets with higher power levels are decoded first. If the decoding of a packet is successful, a Successive Interference Canceling (SIC) operation may be applied, where the signal of the packet is reconstructed and removed from the time-domain signal. After removing the signals of strong packets, more packets may be detected. Indeed, the gateway may run the packet detection process multiple times (e.g., for a total of 3 times or more) and decode any newly detected packets.

Symbol Design. The design of the Qcode codebook can provide code vectors sufficiently different from each other while reducing the computation complexity that could reach complex additions of $N^3$ if the inner product is to be computed directly between the received symbol and every code vector.

Segmented symbol design can guarantee low similarities of segment vectors, as well as sharing at most one common segment vector between any two code vectors, to achieve low similarities of code vectors. With the segmented design, the total number of additions can be reduced to $4N^2$.

In some embodiments, each code vector can be the concatenation of 4 segment vectors, each of length N/4. Other concatenations can be used, e.g., 5, 6, 7, 8 segment vectors. Accordingly, the received symbol Y can be divided into 4 parts, each of length N/4, denoted as $Y^k$ for $0 \leq k < 4$. Partial inner products can be first computed between $Y^k$ and the corresponding segment vectors for all $0 \leq k \leq 3$, which can then be added together to obtain the full inner product. To reduce the computation complexity, the system can select the segment vectors of all code vectors from the same segment book, where the segment book is an N by N/4 matrix. In other words, code vectors can differ only in the choices of segment vectors. As a result, $Y^k$ is employed in the computations of N partial inner products between itself and all vectors in the segment book, which requires $N^2/4$ complex additions. In total, the computation of all partial inner products requires $N^2$ complex additions. The inner product of a code vector can be obtained by taking the sum of 4 partial inner products and employing 3 complex additions. To this end, the overall number of complex additions is $4N^2$.

Symbol Design Definitions and Notations. A code vector is denoted as $W^h$, where $0 \leq h < N^2$. The index vector of the code vector $W^h$ is $I^h$, which can include the indices of the segment vectors chosen by the code vector $W^h$. Let index vector $$I^h = [I_0^h, I_1^h, I_2^h, I_3^h],$$

where $0 \leq I^h < N$ for $0 \leq k < 4$. Let $S_l$ be a segment vector 1 in a segment book where $0 \leq l < N$, and the code vector $W^h$ can be written as per Equation 14.

$$W_h = S_{I_0^h} \| S_{I_1^h} \| S_{I_2^h} \| S_{I_3^h} \qquad \text{(Eq. 14)}$$

In Equation 14, $\|$ denotes vector concatenation.

Figure 6A:
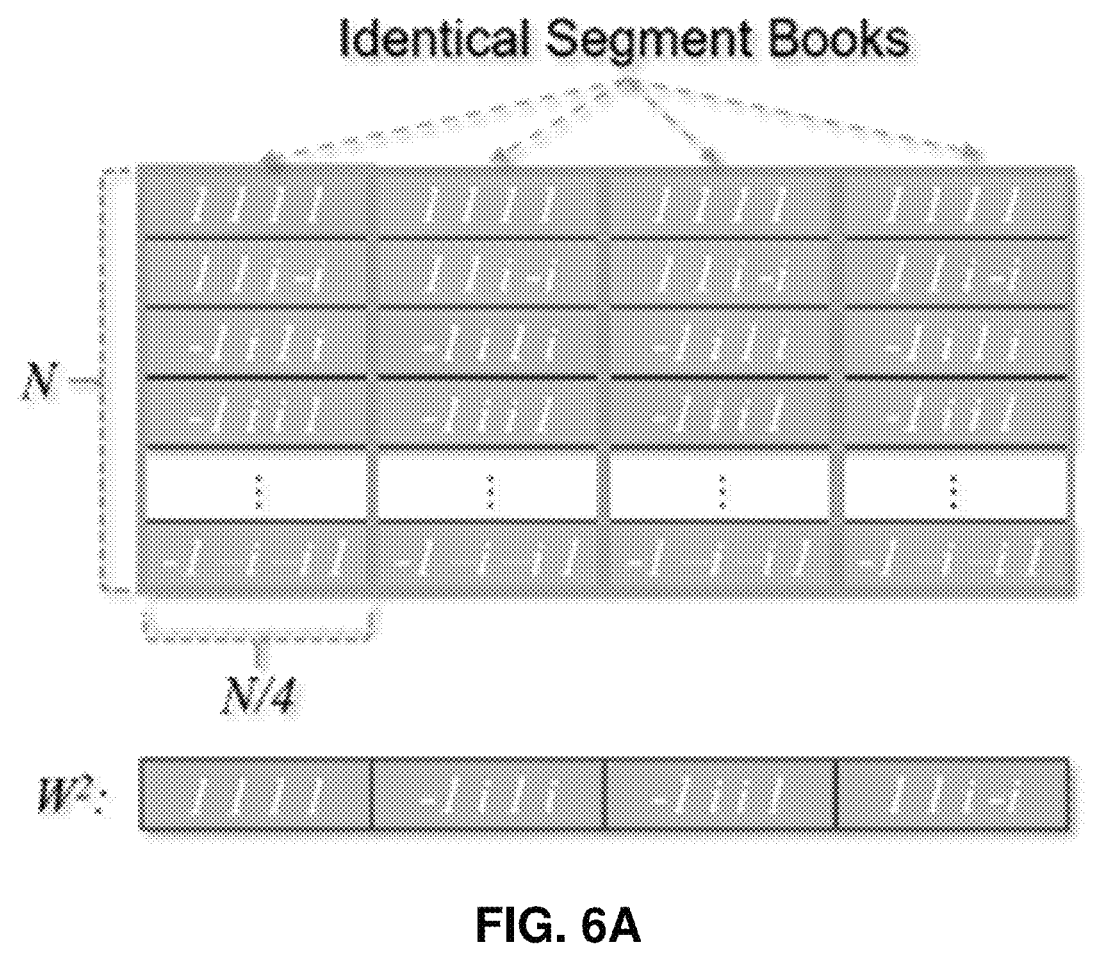

FIG. 6A shows the QCode for one code vector when N=16. The top of FIG. 6A shows four identical segment books, where a segment book contains 16 vectors, each segment of length 4. The code vector in FIG. 6A is $W^2$, the index vector of which is $I^2=[0, 2, 3, 1]$. The selected segment vectors according to F have been highlighted in the segment books, which are combined to form $W^2$.

Figure 6B:
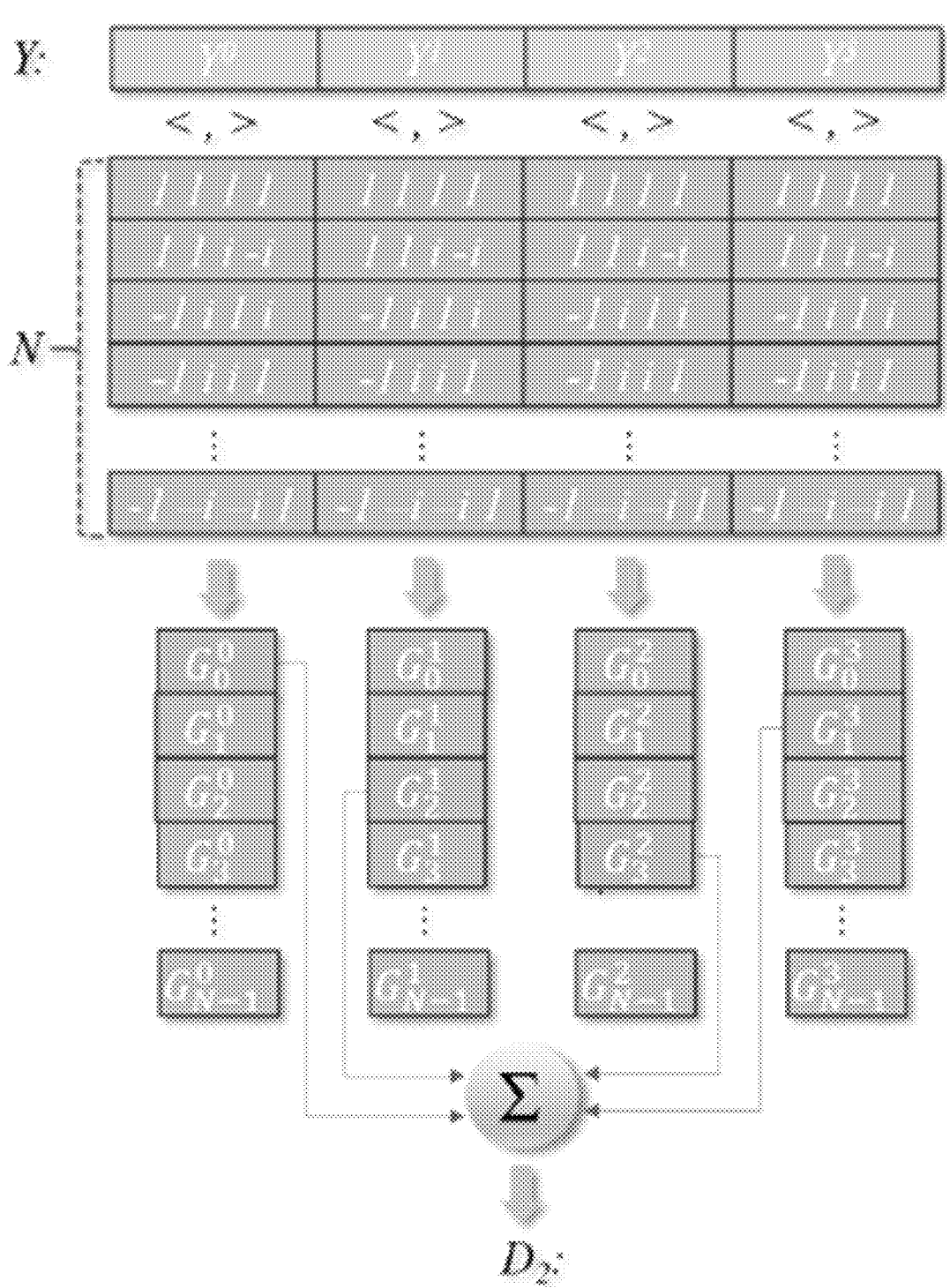

FIG. 6B shows the computation of $D_2$ with the approach, continuing with the example in FIG. 6A. Let $D_h=<Y, W^h>$ as the inner product of the received symbol Y and $W^h$ where $0 \leq h < N^2$. To demodulate a symbol, the inner product $D_h$ can be obtained for all h. The received symbol Y can then be divided into 4 parts, denoted as $Y^k$ for $0 \leq k < 4$. Segment k can be computed per Equation 15:

$$G_l^k = <Y^k, S_l>, \text{ for } 0 \leq l < N \qquad \text{(Eq. 15)}$$

The inner product $D_h$ may be determined per Equation 16.

$$D_h = \sum_{k=0}^{3} G_{I_k^h}^k \qquad \text{(Eq. 16)}$$

Index Vectors. QCOde can employ $N^2$ index vectors, one for each code vector. In the QCode modulation/demodulation, the first two elements in the index vector can be one of the $N^2$ combinations of two integers in $[0, N-1]$, while the last two elements are determined by the first two elements. The last two elements may be determined by treating the first two elements as data symbols in a Reed-Solomon (RS) code and the last two the parity checking symbols as the RS code can guarantee that no two index vectors share more than one common element to provide separability of the code vectors.

Segment Vector Design. To ensure the segment vectors are different from each other as possible, a segment vector may be employed. The similarity of two vectors, $S_a$ and $S_b$, may be defined as the squared norm of their inner product per Equation 17.

$$\Phi_{S_a}, S_b = |<S_a, S_b>|^2 \qquad \text{(Eq. 17)}$$

In QCode, the similarity of any two segment vectors can be no more than N/4 as the maximum similarity constraint. Multiplying two vectors, such as $S_a$ and $S_b$, can result in the multiplying of $S_a$ and $S_b$ element-wise and is written as $S_a S_b$. Vectors may be written with the integer representation in $Z_4$, i.e., complex numbers 1, i, −1, and −i are represented by 0, 1, 2, and 3, respectively. Multiplying two vectors is to add the integer representation of the vectors then take modulo 4.

The segment vectors may be constructed based on the Hadamard matrix, which may be expanded with 4 gadget vectors. Specifically, let m=N/4 as the length of the segment vector. The Hadamard matrix may be an m by m binary matrix, where the row vectors are the base vectors and are included as part of the segment book. Each base vector may be multiplied with the gadget vectors to produce 4 segment vectors. The total number of segment vectors can, therefore, be N. As the base vectors are to be included in the segment book, one of the gadget vectors may be an all-0 vector according to the integer representation. The Hadamard matrix and the gadget vectors can simplify the search of the segment vectors by a divide-and-conquer approach. That is, as the base vectors in the Hadamard matrix are orthogonal to each other and provide a good starting point, only 3 gadget vectors may be found to meet the maximum similarity constraint.

The m by m Hadamard matrix (denoted as $H_m$) may be constructed per Equation 18.

$$H_m = \begin{bmatrix} H_{m/2} & H_{m/2} \\ H_{m/2} & -H_{m/2} \end{bmatrix} \qquad \text{(Eq. 18)}$$

According to the integer representation, $H_1=[0]$. When m=4, the Hadamard matrix may be defined as Equation 19.

$$\begin{bmatrix} 0 & 0 & 0 & 0 \\ 0 & 2 & 0 & 2 \\ 0 & 0 & 2 & 2 \\ 0 & 2 & 2 & 0 \end{bmatrix} \qquad \text{(Eq. 19)}$$

The gadget vectors when m=4 may be defined per Equation 20.

$$\begin{bmatrix} 0 & 0 & 0 & 0 \\ 0 & 0 & 1 & 3 \\ 2 & 1 & 0 & 1 \\ 2 & 1 & 1 & 0 \end{bmatrix} \qquad \text{(Eq. 20)}$$

In Equation 20, base vector a is denoted as $\beta_a$ where $0 \leq a < m$. In an example, the segment vectors produced by $\beta_1$ may be defined per Equation 21.

$$\begin{bmatrix} 0 & 2 & 0 & 2 \\ 0 & 2 & 1 & 1 \\ 2 & 3 & 0 & 3 \\ 2 & 3 & 1 & 2 \end{bmatrix} \qquad \text{(Eq. 21)}$$

Denote gadget vector b as $\gamma_b$ where $0 \leq b < 4$. The constructed segment vectors satisfy the maximum similarity constraint per Equation 22.

$$\Phi(\beta_{a1} \gamma_{b1}, \beta_{a2} \gamma_{b2}) \leq N/4, \qquad \text{(Eq. 22)}$$

-continued for any $0 \le a_1, a_2 < m$ and $0 \le b_1, b_2 < 4$

To achieve Equation 22, a computer program searched and found the gadget vectors. The search is simpler than that suggested by Equation 22 by exploiting a property of the Hadamard matrix, i.e., the product of two base vectors is another base vector. Therefore, the gadget vectors should satisfy Equation 23 because of the equality per Equation 24.

$$\Phi(\beta_a \gamma_{b1}, \gamma_{b2}) \le N/4, \text{ for all } 0 \le a < m \text{ and } 0 \le b_1, b_2 < 4 \quad \text{(Eq. 23)}$$

$$\Phi(\beta_{a1} \gamma_{b1}, \beta_{a2} \gamma_{b2}) = \Phi(\beta_a \gamma_{b1}, \gamma_{b2}), \text{ where } \beta_a = \beta_{a1}/\beta_{a2} \quad \text{(Eq. 24)}$$

Using Equation 24, the search space may be reduced by one dimension.

Lastly, the gadget vectors for m=8 and m=16 are defined per Equation 25 and Equation 26, respectively.

$$\begin{bmatrix} 0 & 0 & 0 & 0 & 0 & 0 & 0 & 0 \\ 1 & 2 & 1 & 2 & 1 & 0 & 3 & 2 \\ 2 & 3 & 0 & 3 & 3 & 2 & 1 & 2 \\ 3 & 0 & 0 & 3 & 1 & 2 & 0 & 3 \end{bmatrix} \quad \text{(Eq. 25)}$$

$$\begin{bmatrix} 0 & 0 & 0 & 0 & 0 & 0 & 0 & 0 & 0 & 0 & 0 & 0 & 0 & 0 & 0 & 0 \\ 1 & 0 & 3 & 0 & 0 & 3 & 2 & 3 & 0 & 1 & 0 & 3 & 1 & 2 & 1 & 0 \\ 3 & 1 & 3 & 3 & 1 & 3 & 1 & 1 & 0 & 0 & 0 & 2 & 0 & 0 & 0 & 2 \\ 1 & 0 & 1 & 0 & 0 & 3 & 2 & 1 & 3 & 0 & 3 & 0 & 2 & 3 & 0 & 1 \end{bmatrix} \quad \text{(Eq. 26)}$$

Figure 7:
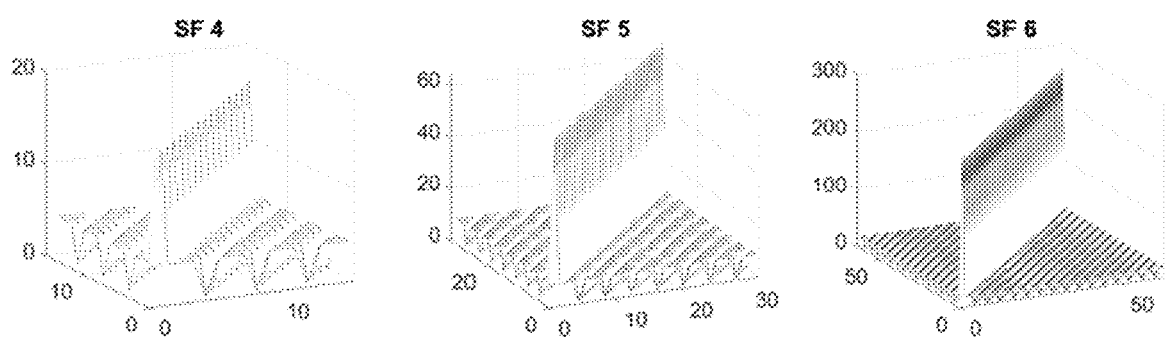
FIG. 7 shows similarities of the generated QCode segment vectors.

FIG. 7 shows the similarities of the generated segment vectors for SF 4, 5, and 6. The high ridge points along the diagonal line are the similarities of segment vectors with themselves, which are all $N^2/16$. The similarities of distinct segment vectors are either 0 or N/4.

Bounds of the Segment Vectors. The segment vectors can be analyzed theoretically to show that QCode is optimum when the SF is 4 because there may not be another set of segment vectors that are more dissimilar to each other.

Let $\zeta(V, m, n)$ be the minimum of maximum similarity of any combinations of V segment vectors when the segment vectors have length m and are defined in Zn.

Theorem 1. $\zeta(16, 4, 4) \ge 4$; that is, when the SF is 4, among any possible combinations of 16 segment vectors, the maximum similarity may not be less than 4.

Proof. For a vector $S_a$, let $\theta_{S_a, t}$ be the set of vectors with similarity t to $S_a$ and call it the neighbor set t of $S_a$. The proof is based on two claims. First, the number of vectors in $\theta_{S_a}, 10$, is 32. Second, $\theta_{S_a}, 10 \cap \theta_{S_b}, 10 = \emptyset$ if $\Phi_{S_a, S_b} <= 2$.

To see the first claim, Without Loss of Generality (WLOG), let $S_a$ be the all-0 vector. Denote an arbitrary vector in $\theta_{S_a}, 10$ as $S_x$. When $\Phi_{S_a}, S_x = 10$, $S_x$ may be of two types, i.e., [0001] and [0003], or their equivalent, i.e., reassigning the locations of the elements and/or adding a constant in $Z_4$ to all elements. It follows that the size of $\theta_{S_a}, 10$ is 32.

To see the second claim, WLOG, consider a vector in $\theta_{S_a}, 10$, denoted as $S_x$, which may be either [0001], [0010], [0100], or [1000], because the same argument applies to other cases. First, consider when $\Phi_{S_a, S_b} = 2$. $S_b$ may be of one type, i.e., [0012], or its equivalent. WLOG, suppose $S_b$= [0012]. It can be verified that $\Phi_{S_b, S_x}$ is 8, 4, 0, and 0 for the 4 possibilities of $S_x$, which are all less than 10. Second, consider when $\Phi_{S_a, S_b} = 0$. $S_b$ may be of one type, i.e., [0022], or its equivalent. WLOG, suppose $S_b$=[0022]. It can be verified that $\Phi_{S_b, S_x} = 2$ for the 4 possibilities of S.

If $\zeta(16, 4, 4) < 4$, there exist 16 segment vectors with similarities 2 or less. According to the two claims, each of such vectors can label at least 32 unique vectors, which is a contradiction because the total number of labeled vectors is 512, while the total number of vectors of length 4 is only 256.

Theorem 1 proves that the segment vector design of QCode is optimum when the SF is 4. The bound of SF 5 is not as tight but is still given in the following.

Theorem 2. $\zeta(32, 8, 4) \ge 4$; that is, when the SF is 5, among any possible combinations of 32 segment vectors, the maximum similarity cannot be less than 4.

Proof. The proof is similar to Theorem 1 and is based on two claims. Let $\Theta_{S_a, t}$ denote the set of vectors with similarity t or more to $S_a$. First, there are 3068 vectors in $\theta_{S_a}, 26$ for any vector $S_a$. Second, $|\theta_{S_a}, 26 \cap \theta_{S_b}, 26| \le 8$ if $\Phi_{S_a, S_b} <= 2$, where $\|$ denotes the size of a set. Therefore, suppose the theorem is not true, i.e., there exist 32 vectors with maximum similarity 2, say, $S_0, S_1, \ldots, S_{31}$. Consider labeling those in $\theta_{S_0}, 26$ first, then those in $\theta_{S_1}, 26$ that have not been labeled, and so on. The number of labeled vectors is at least $$\sum_{a=0}^{31} (3068 - 8a)$$

which is more than $4^8$, a contradiction. The proof of the two claims is a straightforward case analysis, and the claims may be verifiable.

The above theorems are based on the sphere-packing approach, i.e., by partitioning the vector space according to the similarity or distance to the selected segment vectors. The sphere-packing approach, however, becomes cumbersome when the SF is 6 because the number of neighbor sets with non-empty intersections becomes large.

Comparing to the Binary Constellation. QCode implements the QPSK constellation because QPSK can yield better segment vectors with lower similarities to each other, which can improve the resilience to noise, especially when the SF is small. QCode can also use other modulation, e.g., BPSK constellation.

When the SF is 4, QCode can implement 16 segment vectors each of length 4. With QPSK, the maximum similarity is 4.

When SF is 5, QCode can implement 32 segment vectors each of length 8. With QPSK, the maximum similarity is 8. It can be proved that $\zeta(32, 8, 2) \ge 16$; therefore, QCode reduces the maximum similarity value by at least half. To see this, note that the possible similarity values between any two binary vectors are the square of an even number, e.g., 0, 4, 16, 36, etc. Suppose the claim is not true, i.e., there exists a set of 32 binary vectors, denoted as $\Omega$, with maximum similarity 4. To any vector, say, A, there are exactly 16 vectors with similarity 36 because any such vector is either identical to A in 7 locations or just one location. Consider any two vectors in $\Omega$, say, A and B. As the maximum similarity is 4, A and B differ in 3, 4, or 5 locations. Therefore, if $\Phi_{A, X} = 36$ for some vector X, $\Phi_{B, X} < 36$. As a result, every vector in $\Omega$ can label 16 vectors with similarity 36 to itself as its own, which is a contradiction because the number of labeled vectors plus the vectors in $\Omega$ is greater than 256, while there are only 256 binary vectors of length 8.

When SF is 6, QCode can implement 64 segment vectors, each of length 16. With QPSK, the maximum similarity is

27

16. It can be proved that $\zeta(64, 16, 2)\geq16$. The proof is similar to the proof when SF is 5 and is therefore omitted. It also turns out that the bound is tight, i.e., there do exist 64 binary vectors with maximum similarity 16. One possible construction, for example, can be based on the Nordstrom-Robinson code [32, 45], which is a binary code of length 16 with 256 codewords and minimum Hamming distance 6, by using codeword 2 to 65 of Nordstrom-Robinson code.

Rake Receiver for Multi-Path Channels. Broadband service requires high system bandwidth, with which path delay spread may become significant. For example, if the bandwidth is 25 MHz and the Over-Sampling-Factor (OSF) is 8, i.e., the receiver takes 8 samples per transmitted sample, a sample is taken every 5 ns. If the delay spread is 30 ns, the earliest and latest paths are separated by 6 samples, which may affect the demodulation of symbols if paths are of similar strength. It is likely that users will try to set up the antenna with a strong and dominant line-of-sight path to the sky, which should minimize the effect of multi-path. In situations when multi-path cannot be avoided, the Rake receiver can be used to adapt to the multi-path situation.

With a Rake receiver, the path information may be found during packet acquisition based on the packet preamble. Let the number of significant paths be T. Path p is denoted as $P_p$, where $0\leq p<T$. The delay and gain of $P_p$ are denoted as $\tau_p$ and $g_p$, respectively. WLOG, it is assumed that the paths are sorted according to the delays, where $\tau_0=0$, although $P_0$ may not be the strongest path. Let the transmitted code vector be $W^h$. WLOG assumes the phase modulated on the symbol is 0. The received symbol may, therefore, be approximated as in Equation 27:

$$Y \approx \sum_{p=0}^{T-1} g_p W^{h,\tau_p} + \Gamma \qquad \text{(Eq. 27)}$$

In Equation 27, $W^{h,\tau_p}$ denotes $W^h$ shifted by $\tau p$ samples and F denotes noise. Equation 27 is an approximation where the first and the last $\tau_{T-1}$ samples have contributions from neighboring symbols. It is a reasonable approximation because symbols in QCode are long.

The Rake receiver in QCode added the signals from different paths coherently. That is, let $Y^{\tau P}$ be the received symbol aligned to the delay of $P_p$. Let the Rake-combined symbol be defined in Equation 28:

$$\tilde{Y} \approx \sum_{p=0}^{T-1} |g_p|^2 Y^{\tau p}/g_p \qquad \text{(Eq. 28)}$$

In Equation 28, dividing $Y^{\tau P}$ by $g_p$ can cancel the phase of $P_p$ and normalize the gain, while multiplying $|g_p|^2$ adds the paths together according to Maximum Ratio Combining (MRC). $\tilde{Y}$ can then be processed by the logic depicted in FIG. 6B.

The Rake receiver in QCode can provide simplicity as only one Rake-combined symbol needs to be demodulated because symbols in QCode are long and can spread interference from misaligned paths. It may also be extended to multiple-antenna systems by viewing signals from different antennas as signals from different paths.

Successive Interference Cancellation. One of the factors of UCACH is Successive Interference Cancellation (SIC). In QCode, SIC can reconstruct the time-domain signal of symbols individually.

For one generic symbol, when SIC is executed, the packet can be decoded so that the code vector used for this symbol, $W^h$, is known. Suppose the number of significant paths is T and the symbol aligned to the delay of $P_p$ is denoted as $Y^{\tau_p}$, the time-domain signal can be reconstructed for each path. For $P_p$, it may be defined per Equation 29.

$$W^h < Y^{\tau p}, W^h > \qquad \text{(Eq. 29)}$$

In Equation 29, the time-domain signal is assumed to be the ideal waveform ($W_h$) multiplied by the path gain ($<Y^{\tau p}$, $W^h>$). The overall reconstructed time-domain signal can be the summation of individual path signals shifted according to path delays.

The approach is simple with no Channel State Information (CSI) to be estimated and maintained. The modulated phase value can also be absorbed into the path gain and need not be reconstructed. Because of long QCode, when approximating the path gain of a particular path, the interference from other paths is spread thin and does not lead to errors.

QCode Discussion. Low Earth Orbit (LEO) satellite networks emerged as an alternative that complements the existing wireless infrastructure. Due to the long propagation delay between the earth and the satellite, there is a benefit to achieving low latency for applications in LEO networks such as automatic driving.

One direction to reduce the latency in LEO networks is to deploy Uncoordinated Access Channels (UCACH) that allow user terminals to transmit packets to the satellite without prior resource allocation by the satellite or coordination with each other. As a result, latency may be reduced to the minimum, i.e., the one-way propagation delay, because user terminals may transmit packets at will. Although technologies such as Enhanced Spread Spectrum Aloha (E-SSA) [36'], [23'], [19'] were developed for UCACH in satellite networks, it is desirable to further increase the network capacity and user terminal data rates for broadband access in LEO networks, which is closely related to the physical layer symbol design. In wireless communications, a symbol is a complex vector that modulates a certain number of bits and is the basic unit for data transmission. To achieve high capacity, the system prefers longer symbols, which are more resilient to interference caused by overlapping packets; on the other hand, to achieve high data rates, the system prefers shorter symbols, which take less time to transmit.

QCode can achieve both high network capacity and high data rates for broadband LEO networks by being configured to aggressively increase the number of bits modulated on each symbol. With the same symbol length and, hence, roughly the same network capacity, QCode can achieve higher data rates for the user terminals. To reduce computation complexity in real time, the QCode uses the QPSK constellation to avoid the inner product calculation. QCode can further reduce the computation complexity with a segmented design of the code vectors.

Existing satellite uncoordinated access techniques include Contention Resolution Diversity Slotted ALOHA (CRDSA) [15'], [18'], which decodes packets from multiple user terminals with Successive Interference Cancellation (SIC), as well as Enhanced Spread Spectrum Aloha (E-SSA) [36'], [23'], [19'], [21'], with which a user terminal multiplies the data with a binary code to spread the interference. QCode was compared with E-SSA because E-SSA had been adopted for standardization [2'] and continuously ignites interest [25'] and was observed to have higher spectrum efficiency than E-SSA. Early satellite uplink standards include DVB-RCS [1'] and IPoS [42']. Recently, 3GPP started expanding to Non-Terrestrial Networks [26'], [28'], [27'], [37'], where current proposals were similar to those in existing cellular networks with Orthogonal Frequency-Division Multiplexing (OFDM), although challenges due to the high Peak-to-Average Power Ratio (PAPR) of OFDM signals have been noted [37']. QCode signal employed QPSK where the constellation points had the same magnitude. Although the baseband signal magnitude was not constant due to pulse-shaping, the PAPR of QCode was still very low and could be limited at 2.2 dB. In addition, QCode focused on uncoordinated access, which complemented the connection-orientated services in 3GPP.

Since 5G, grant-free communication has been proposed for cellular networks to support new service classes, such as Ultra-Reliable Low Latency Communication (URLLC) [7'], [8'], [6']. Grant-free communications are expected to further expand in 6G [51']. Proposals include those that did not need fundamental modifications to the physical layer, such as repeating a packet K times [29'] or transmitting a packet in a random frequency channel [12'], as well as those based on Non-Orthogonal Multiple Access (NOMA) [29'], which resolved collisions in the physical layer. Well-known NOMA schemes included Sparse Code Multiple Access (SCMA) [31'], Interleave Division Multiple-Access (IDMA) [35'], Multi-User Shared Access (MUSA) [55, 54'], Pattern Division Multiple Access (PDMA) [17'], etc., which had achieved impressive overload factors under the grant-based model where nodes operated according to parameters given by a central controller, such as codes, patterns, and transmission power. QCode supported uncoordinated access and therefore is different from grant-based NOMA [52'], [48'], [50'], [39'] and may be considered as a form of grant-free NOMA [44'], [38'], [40'], [10'], [11'], [43'], [16'], [33'], [9'], [49'], [53'], [46']. However, QCode would be suitable for satellite communications because it did not have a high PAPR and did not need symbol level synchronization or accurate estimation of the Channel State Information (CSI).

Wi-Fi allowed grant-free access to the medium with Carrier Sense Multiple Access (CSMA) [41'], which may not be applied to LEO networks, primarily because many user terminals may not sense each other due to the physical distance. Commercial LEO networks, such as Starlink, used proprietary modulation techniques. Starlink downlink signal employs OFDM [24']. The PAPR of the uplink signal by a transmitter of the user terminal can employ a high-cost amplifier to communicate to satellites.

Example ChirpPair Operation

The preamble can be further modified to include the long preamble chirp-based symbol and additionally, its conjugate, referred to as the ChirpPair. A user terminal transmits packets to the satellite at random times.

To achieve a higher timing granularity, the receiver can take a samples for each transmitted sample, where $\alpha > 1$ is the Over-Sampling Factor (OSF). In some embodiments, $\alpha=8$, although the same principles applied to other values of a. The timing offset $\tau$ of a packet can be the difference between the actual and the estimated start time of the packet measured in the number of samples. Let $\beta$ be the frequency that completes one cycle in the time to transmit a chirp. A sinusoid with frequency $\gamma\beta$ Hz generally has frequency $\gamma$ because it completes $\gamma$ cycles within the time of a chirp.

The upchirp and the downchirp can be denoted as $\Theta$ and $\overline{\Theta}$, respectively. $\Theta$ can be a complex vector of length $2^{SF}$, where SF is the Spreading Factor. Let $N=2^{SF}$. The t-th element in $\Theta$ is defined per Equation 30:

$$\Theta_t = \exp\left[i\pi(t - N/2)^2/N\right], t = 0, 1, \ldots, N-1. \tag{Eq. 30}$$

Figures 8A, 8B:
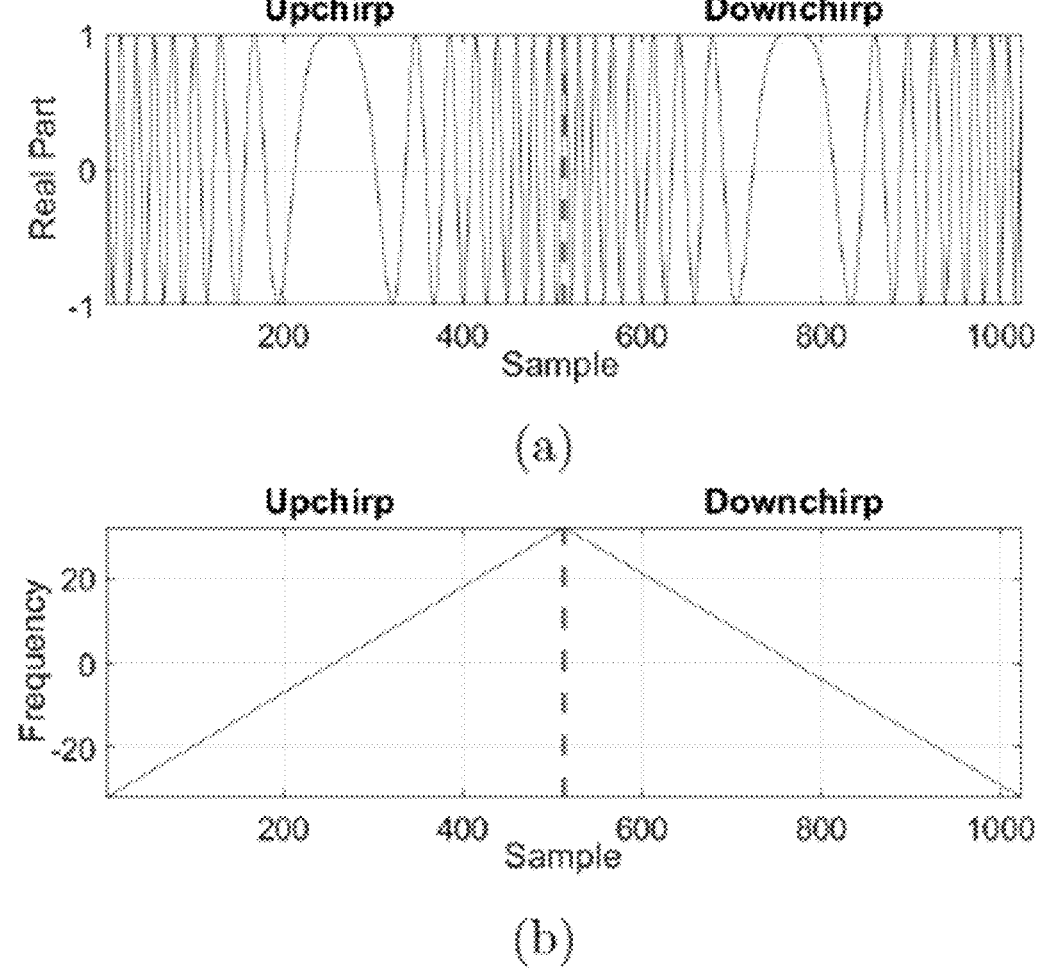
FIGS. 8A-8B show an example ChirpPair.

It takes N/B seconds to transmit $\Theta$ where B is the system bandwidth measured in Hz. FIG. 8A shows the real part of the preamble when SF=6 and $\alpha=8$. FIG. 8B shows the change of the frequency.

Up-dechirping refers to multiplying a vector with $\overline{\Theta}$ element-wise. That is, consider a vector Y of length N. The up-dechirped vector of Y is $Y\odot\overline{\Theta}$, where "$\odot$" denotes element-wise multiplication. Consider a simple case when there is one path in the channel and the receiver detects a packet, but the timing offset and CFO are $\tau$ and $\gamma$, respectively. Let $R^u$ be the received upchirp in the preamble; that is, $R^u$ is obtained by taking one sample every $\alpha$ samples, starting at the estimated start time of the packet, for a total of N samples. $R^u\odot\overline{\Theta}$ should be a sinusoid with frequency, as shown in Equation 31.

$$\tau/\alpha + \gamma \tag{Eq. 31}$$

In Equation 13, in the first $N-\lfloor\tau/\alpha\rfloor$ elements if $\tau\geq0$ or the last $N-\lfloor\tau/\alpha\rfloor$ elements if $\tau<0$, where $\lfloor x\rfloor$ denotes the largest integer no more than x.

A signal vector S is defined per Equation 32, where FFT refers to the Fast Fourier Transform. S can have a peak at a location close to $\tau/\alpha+\gamma$.

$$S = FFT\left(R^u\odot\overline{\Theta}\right) \tag{Eq. 32}$$

Similarly, down-dechirping refers to multiplying a vector with $\Theta$ element-wise. If the received downchirp in the preamble is $R^d$, the down-dechirped vector of the received downchirp $R^d$ is sinusoid with frequency (defined in Equation 33) in the first or the last $N-\lfloor\tau/\alpha\rfloor$ elements depending on the sign of r.

$$-\tau/\alpha + \gamma \tag{Eq. 33}$$

Figure 9:
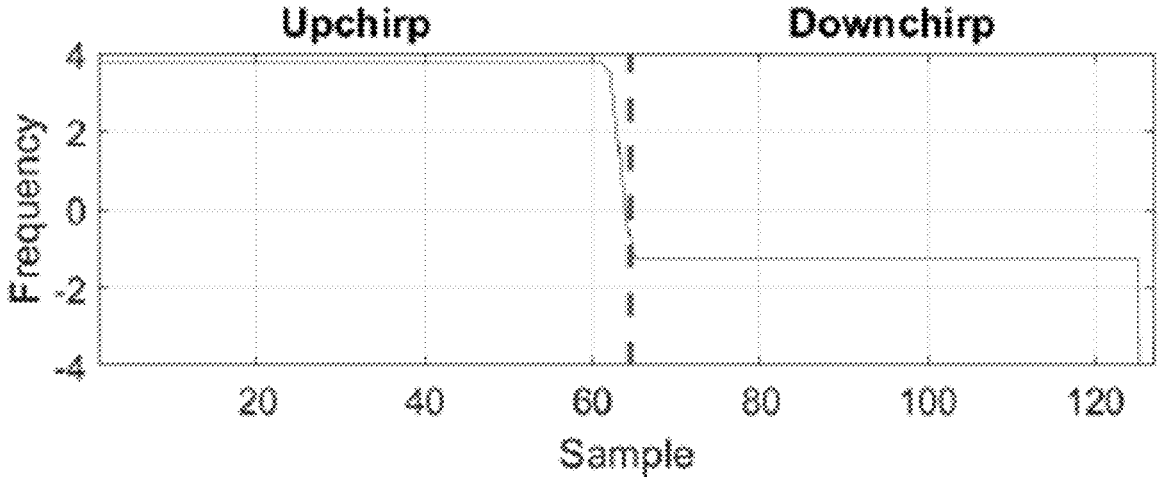
FIG. 9 shows the frequency of the dechirped preamble in an operation of ChirpPair.

Generally, dechirping the preamble refers to multiplying the conjugate of the preamble with a vector of the same length. For example, FIG. 9 shows the frequency of the dechirped preamble where SF=6, $\alpha=8$, $\tau=20$, and $\gamma=1.25$. The frequencies of the dechirped upchirp and downchirp are 3.75 and −1.25, respectively. SF can be sufficiently large so that packet acquisition is not the bottleneck of the system.

ChirpPair starts with an initial search stage, which spots potential packets by calculating signal vectors shown in Equation 33 and looking for peaks. The timing offsets and CFO of potential packets can then be calculated with an operation to narrow down the errors within a small range. The fine estimation stage can obtain the final estimate of the timing offset and CFO by finding the best match between the received preamble and versions of the clean preamble with certain shifts in time and frequency, which may be simplified with a fast scan method by exploiting the special structure of the preamble. Finally, the path delays and gains can be estimated by an iterative algorithm and solving a linear system.

Packet Acquisition Process.

Step 1—Initial Search: The initial search may detect the potential packets in the received signal and obtain coarse estimates of the timing and frequency offsets by solving a linear system.

Initial search may include a prescreening process. Prescreening may slide a window and performed up-dechirping and down-dechirping on the vector inside a window. If the window partially overlaps with the upchirp or downchirp in the preamble, the dechirped vector may contain a partial sinusoid, the FFT of which should have a peak.

Specifically, during pre-screening, the stride may be set to N/4, i.e., the window moved down by $N\alpha/4$ samples every time. For up-dechirping or down-dechirping, one sample was taken for every $\alpha$ sample, starting from the left end of the window, for a total of N samples. When the window meets the upchirp or downchirp in the preamble, peaks should exist in 7 consecutive signal vectors. Peaks in these signal vectors may satisfy the shift condition; that is, the peaks may be shifted by N/4 in consecutive signal vectors due to the timing misalignment, which was a sign that they are generated by the same preamble.

Figure 10:
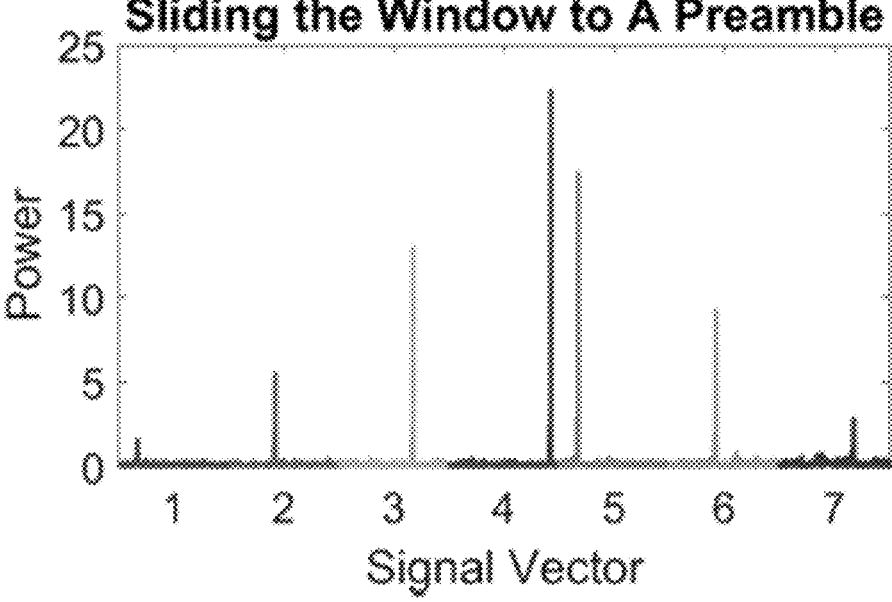
FIG. 10 shows an example of when the sliding window meets a preamble in an operation of ChirpPair.

FIG. 10 shows an example of when the sliding window meets a preamble, where different signal vectors are shown in different colors. The peak height increased and then decreased, proportional to the amount of overlap between the window and the preamble. Signal vectors 3, 4, and 5, as the center vectors, have larger overlap and higher peaks than other vectors. A packet may be detected if 3 or more peaks are detected that satisfy the shift condition. The detection relied on multiple peaks rather than a single peak, for better robustness.

The stride may be N/4 because the signal may be weak, and larger strides may miss packets. When the stride is N/4, the amount of overlaps between the center vectors and the window may be bounded from below by 7N/8 or 5N/8, which may be sufficient to spot the packet. If the stride further increased, say, to N/2, the amount of overlaps may be reduced to 3N/4 or N/4, which may be small and lead to packet loss.

Initial search may also include coarse estimation, e.g., based on the linear relation between the peak locations and the timing offset and CFO defined in Equation 31 and Equation 33. That is, let $x_u$ and $x_d$ be the locations of the upchirp peak and the downchirp peak of a packet, respectively. Based on Equation 31 and Equation 33, the timing offset and the CFO may be estimated as $\lfloor (x_u - x_d)/2 \rfloor \alpha$ and $\lfloor (x_u + x_d)/2 \rfloor$, where $\lfloor\ \rfloor$ denotes rounding a number to the nearest integer.

Figure 11:
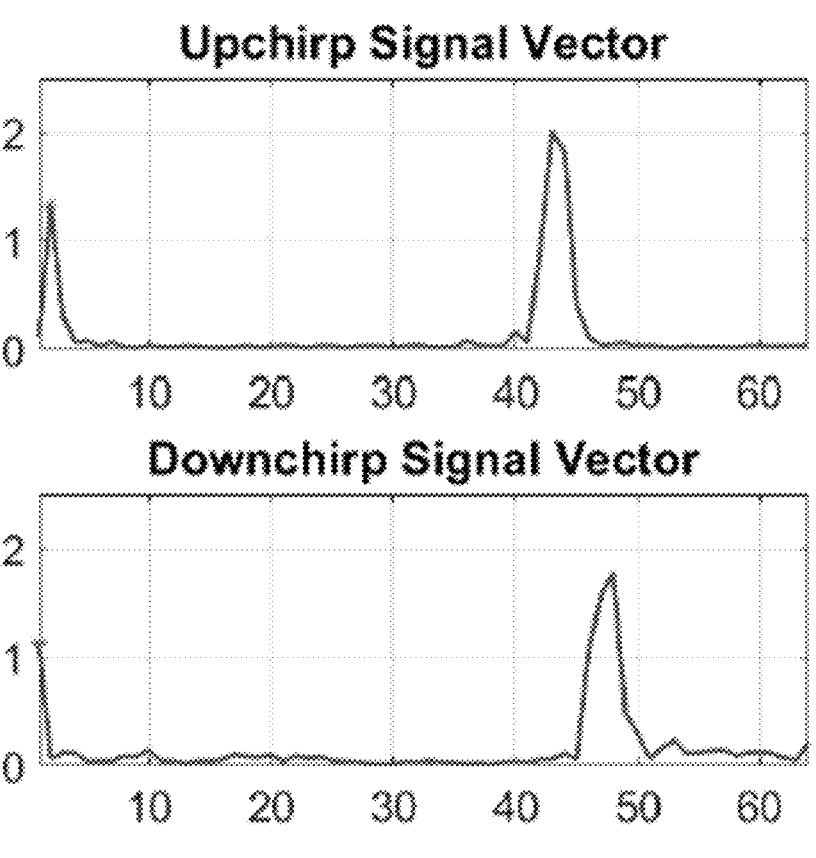
FIG. 11 shows an example of a signal vector in an operation of ChirpPair.

FIG. 11 shows an example of signal vectors, where the peaks produced by the packet of interest were marked with red stars. In this case, $x_u = 1$ and $x_d = 0$. The packet of interest may overlap with another packet, which may produce higher peaks. Therefore, $x_d$ may not be the highest point in the downchirp signal vector; instead, the signal around the peak in the upchirp signal vector may be defined as the path feature, and $x_d$ is the location in the downchirp signal vector that matches the path feature. There may be detected packets with start times that differ by no more than $4\alpha$, which may be duplicates and are filtered by selecting only the one with the highest power.

Step 2—Fine Estimation: After the initial search, Chirp-Pair began fine estimation to further fine-tune the timing offset and CFO. There are two methods for fine estimation.

(a) Full search: Let R be the dechirped preamble, which was received according to the coarse estimate. Let $P^{\tau,\gamma}$ be the original preamble with timing error rand CFO $\gamma$, i.e., $P^{\tau,\gamma}$ was the original preamble time-shifted by $\tau$ samples then element-wise multiplied by a sinusoid with frequency $\gamma$. Let $\lambda^{\tau,\gamma}$ be the dechirped version of $P^{\tau,\gamma}$. Let '•' be the operator of finding the dot product of two complex vectors. The Matching Function, $\Omega(\tau, \gamma)$, was defined per Equation 34:

$$\Omega(\tau, \gamma) = \left| R \cdot \overline{\lambda^{\tau,\gamma}} \right|^2. \tag{Eq. 34}$$

If there is only one path and both $\tau$ and $\gamma$ match the actual residual timing offset and CFO, respectively, $\lambda^{\tau,\gamma}$ is a scaled version of R, and $\Omega(\tau, \gamma)$ may be maximized. Therefore, the estimated residue timing offset and CFO, denoted as $\hat{\tau}$ and $\hat{\gamma}$, respectively, are defined per Equation 35.

$$(\hat{\tau}, \hat{\gamma}) = \underset{\tau,\gamma}{\mathrm{argmax}}\, \Omega(\tau, \gamma) \tag{Eq. 35}$$

In Equation 35, $\tau$ is in $[-4\alpha, 4\alpha]$ at a step of 1, and $\gamma$ is in $[-2, 2]$ at a step of $\frac{1}{4}$.

Figure 12:
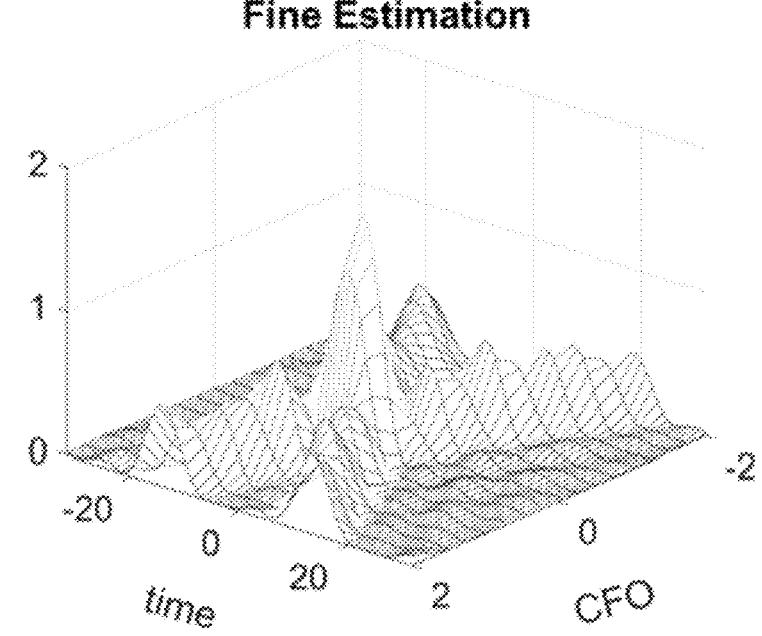
FIG. 12 shows an example where the peak location corresponds to the best estimate in an operation of ChirpPair.

FIG. 12 shows an example where the peak location corresponds to the best estimate. $\Omega(\tau, \gamma)$ may be calculated as in Equation 34 for every combination of $\tau$ and $\gamma$. Alternatively, by using circular convolution, $\Omega(\tau, \gamma)$ for all $\tau$ and a particular $\gamma$ may be found with a single FFT. However, as the range of $\tau$ was small, the savings with FFT were not significant, especially when SF was small, and $\alpha$ is large.

(b) Fast search: The full search method to find $\hat{\tau}$ and $\hat{\gamma}$ is to evaluate all 1105 combinations of $\tau$ and $\gamma$. While this was reasonable considering Equation 34, a fast search may be employed based on the structure of the preamble in Chirp-Pair and reduced the computation complexity to less than 15%.

Figure 13:
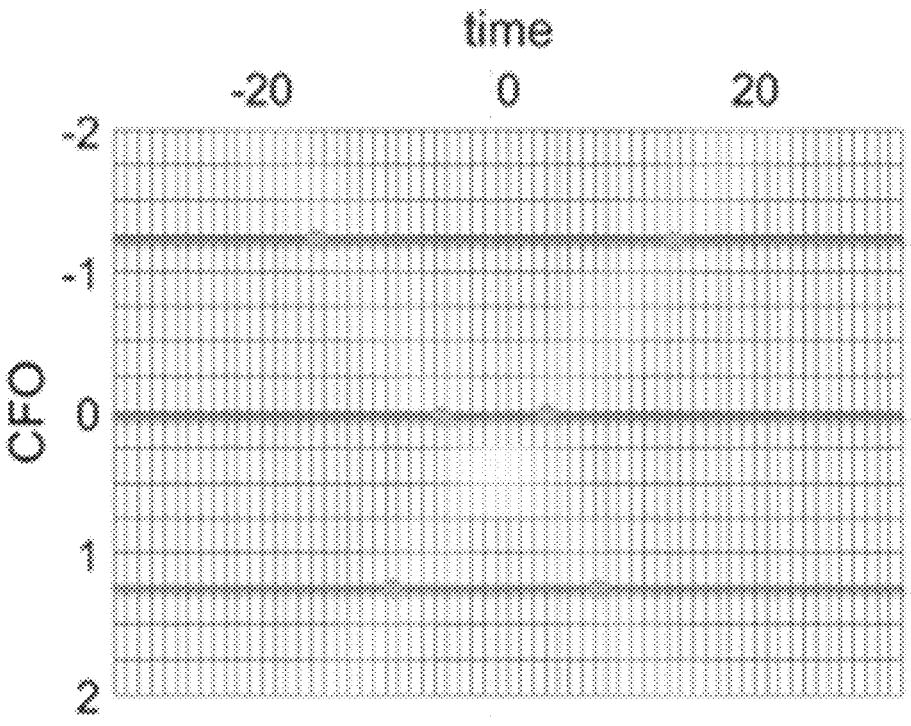
FIG. 13 shows an example aspect of fast search in an operation of ChirpPair.

Fast search may be based on ridges, which may be observed in FIG. 13. It may be seen that when there are two ridges, the intersection is the peak. The ridges may be caused by the upchirp and the downchirp, and it sufficed to explain the one caused by the upchirp because that for the downchirp was identical. Suppose the actual timing offset and CFO are $\hat{\tau}$ and $\hat{\gamma}$, respectively. After up-dechirping, the vector is a sinusoid with frequency contributed by both timing offset and CFO. When $\tau/=\hat{\tau}$ and $\gamma/=\hat{\gamma}$ but Equation 36 is met, then the frequency of the sinusoid is 0 so that the vector is a constant, leading to the maximum dot product.

$$(\tau - \hat{\tau})/\alpha = -(\gamma - \hat{\gamma}), \tag{Eq. 36}$$

The same combination of $\tau$ and $\gamma$, however, may not lead to a 0 frequency for the downchirp, so the dot product of the downchirp part was close to 0. Therefore, along the line where Equation 36 may be satisfied, the dot product of the preamble may be the dot product of the upchirp part about one-fourth the height of the peak. Based on Equation 36, the ridge lines may have constant slopes, i.e., either $1/\alpha$ or $-1/\alpha$.

FIG. 13 shows that in fast search, first, points along 3 evenly-spaced probe lines were evaluated, where points on a probe line had the same $\gamma$. A probe line can intersect both ridges, finding two ridge points on the probe line if the probe line does not happen to meet the peak and one ridge point otherwise, where a ridge point is a location with a higher value than the neighboring points. The peak location may be calculated based on the ridge points. To be more exact, let $(\tau_1, \gamma)$ and $(\tau_2, \gamma)$ be the coordinates of the ridge points on a probe line. As the ridge lines meet either above or below the probe line, the peak is either at $[(\tau_1+\tau_2)/2, \gamma+(\tau_2-\tau_1)/(2\alpha)]$ or $[(\tau_1+\tau_2)/2, \gamma-((\tau_2-\tau_1)/(2\alpha)]$, where these locations were called potential peak locations. It may not be possible to determine which potential peak location is the actual peak location with one probe line. Therefore, a total of 3 probe lines may be evaluated where each line may produce two potential peak locations, one of which should be the actual peak location. Therefore, the most common potential peak location, denoted as $(\tilde{\tau}, \tilde{\gamma})$, is chosen for the final scan, i.e., all combinations of $(\tau, \gamma)$ are evaluated where $\tau\epsilon[\tilde{\tau}-6, \tilde{\tau}+6]$ and $\gamma\epsilon[\tilde{\gamma}-\frac{1}{2}, \tilde{\gamma}+\frac{1}{2}]$. A fast search operation was considered successful if the highest point found in the final scan was higher than the median height of the ridge points multiplied by a constant, which was 2.

To reduce the computation complexity along a probe line, $\tau$ may be evaluated at a step of 2. Therefore, the total number of evaluated points with the fast scan was 161, which may be less than 15% of the total number of combinations. It may be possible to find the peak location with fewer probe lines. Three probe lines may be used for robustness because the ridges sometimes were not clean due to multi-path. With multiple paths, there may be multiple pairs of ridges, each produced by a path. Fast search may still work well if one path is stronger than other paths. If multiple paths have comparable strengths, fast search can be avoided. Therefore, the fast search may be skipped if the number of ridges is not clearly 2, i.e., if there were 3 or more high points on any probe line where the height of the third highest point is at least half of the highest point.

If a fast search failed or was skipped, the full search may be conducted, i.e., all combinations of $\tau$ and $\gamma$ are evaluated. In this case, the channel may be complicated, and there may be multiple peaks. Therefore, up to 4 peaks may be taken as candidate estimates, where a peak was taken if its height was at least 75% of the highest peak. The first estimate that leads to the decoding success of the PHY header may be used as the final estimate. Another step that reduced the errors is to check peaks with identical estimates of CFO first, because the peaks are generally caused by paths with different delays, but paths have the same CFO.

Step 3—Multi-path estimation: In high bandwidth channels, paths in the channel may become separable because the delay spread was larger than the sample time. For example, with 25 MHz bandwidth and $\alpha=8$, a sample was taken every 5 ns, while the delay spread of a satellite link may be tens of ns. The satellite received one copy of the packet from each path with different delay, magnitude, and phase, which were denoted as $\tau_p$, $a_p$, and $\theta_p$ for path p, respectively. Such information of each path may be estimated to assist data demodulation.

The maximum delay spread of the channel was known as D, which was measured in the number of samples. For simplicity, the number of significant paths was no more than P, where P was a small integer, such as 2 or 3, depending on the channel bandwidth. $a_p$ and $\theta_p$ were also merged into a single complex number denoted as $g_p$, called the path gain, where $g_p=a_p e^{i\theta}p$. At this point, the CFO of the packet may be estimated and canceled based on the strongest path. As the CFO of all paths was the same, the CFO was assumed to be 0. The idea was to divide-and-conquer. That was, the number of paths and the path delays were estimated first; then, the path gains were estimated.

(a) Estimate path delays: Let the received preamble signal be R. Let the original preamble shifted by $\tau$ samples be $P^\tau$. Consider the path function $F(\tau)$ in Equation 37.

$$F(\tau) = R \cdot \overline{P^\tau}, \text{ for} - D \le \tau \le D \qquad \text{(Eq. 37)}$$

Figure 14:
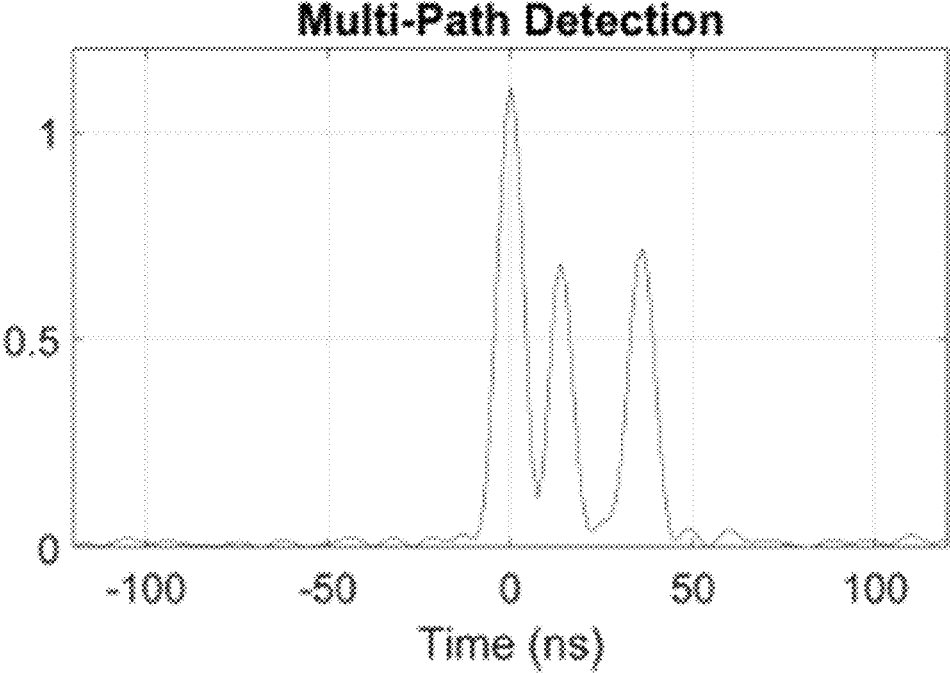
FIG. 14 shows multiple paths resulting in multiple peaks in an operation of ChirpPair.

In Equation 37, when $\tau$ was close to the delay of a particular path, $P^\tau$ may match the signal from that path so that the summation was high. FIG. 14 shows a case of $|F(\tau)|^2$, where 3 peaks may be seen, which corresponds to 3 significant paths.

Therefore, the number of paths and the path delays may be found with an iterative approach. In iteration p, the highest point in $|F(\tau)|^2$ may be found, the location of which, say, $\hat{\tau}_p$, may be used as the delay of path p. Then, the signal from this path was removed, as shown in Equation 38.

$$F(\tau) \leftarrow F(\tau) - F(\hat{\tau}_p)W^{\hat{\tau}p}(\tau), \text{ for} - D \le \tau \le D \qquad \text{(Eq. 38)}$$

In Equation 38, $W^{\hat{\tau}_p}(r)$ denotes the contribution at time $\tau$ by a clean preamble with delay $\hat{\tau}_p$, and $F(\hat{\tau}_p)$ approximated the gain of path p. $W^{\hat{\tau}p}(\tau)$ may be pre-computed by replacing R with Pip in Equation $P^{\hat{\tau}p}$. The process may be repeated until the highest point in $|F(\tau)|^2$ was below a threshold, which was 5% of the highest point before any path signal may be removed, or until an invalid path was found, where a path may be invalid if it resulted in a delay spread larger than D, or if it had the same delay value as a path that has been found before.

(b) Estimate path gains: After the path delays have been estimated, the path gains may be estimated. Consider the upchirp, as the same argument applies to the downchirp. Let $R^{u,\hat{\tau}p}$ be the received upchirp shifted according to the estimated delay of path p. Let $S_p$ be defined as a linear combination of the contributions from paths in Equation 39.

$$S^p = FFT(R^{u,\hat{\tau}p} \odot \overline{\Theta}) \qquad \text{(Eq. 39)}$$

As $R^{u,\hat{\tau}p}$ was aligned to the delay of path p, the received upchirp from path p may create a peak at location 0 in $S^p$, the height and phase of which may be the magnitude and phase of the path, respectively, if there was no other path. However, with multiple paths, $S_p$ may be the linear combination of the contributions from all paths. Therefore, the paths should be considered jointly by solving a linear system.

To elaborate, let Y be a column vector where element p was $y_p$ defined per Equation 40.

$$y_p = S_0^p \qquad \text{(Eq. 40)}$$

The FFT in Equation 39 may be avoided and replaced with $R^{u,\hat{\tau}p}$. $\overline{\odot}$ as only $S^p$ may be needed. Y is the observation that may be used to calculate the path gains. Let $P^{u,\tau}$ be the upchirp part of the clean preamble shifted by $\tau$ samples. Let $$V^\tau = FFT(P^{u,\tau} \odot \overline{\Theta}) \qquad \text{(Eq. 41)}$$

-continued and $$C(\tau) = V_0^\tau \qquad \text{(Eq. 42)}$$

Equations 41 and 42 may be pre-computed for $-D \leq \tau \leq D$. $C(\hat{\tau}_{p_2} - \hat{\tau}_{p_1}) g_{p_2}$ is the contribution to $y_{p_1}$ from path $p_2$. Let M be a P by P matrix which was defined in Equation 43.

$$M(p_1, p_2) = C(\hat{\tau}_p 2 - \hat{\tau}_p 1). \qquad \text{(Eq. 43)}$$

In Equation 43, if G is the vector of path gains and Y is a column vector, then Equation 44 may be defined as:

$$MG = Y \qquad \text{(Eq. 44)}$$

Therefore, the path gains can be found by solving the linear system. Due to symmetry, it may be verified that the downchirp part satisfied the same linear system, and therefore the observations from the upchirp and downchirp parts may be averaged first before the linear system is solved.

ChirpPair Discussion. Low Earth Orbit (LEO) satellite networks provide global data service coverage and have seen rapid growth in recent years. Due to the large physical distance between the user terminal and the satellite, the latency is large in LEO networks, such as around 25-50 ms for standard users in Starlink [23"]. Uncoordinated access channels allow user terminals to transmit packets to the satellite without prior resource allocation so that the latency is reduced to the one-way propagation delay.

ChirpPair can detect the packet and learn its key parameters, such as the start time, Carrier Frequency Offset (CFO), and path information in multipath channels. The first step of receiving packets was packet acquisition, which may have the packet colliding with other packets; therefore, signals of the targeted packet should be detected and extracted in the midst of those from other packets that may have different power levels, frequencies, delays, etc. Second, the signal may be weak due to the length of the link [5"], [8"]. Third, the preamble should have constant magnitude to reduce the Peak Average Power Ratio (PAPR), where the preamble was a known waveform transmitted at the beginning of the packet.

ChirpPair's preamble can be the concatenation of a chirp and its conjugate, referred to as the upchirp and the downchirp, respectively, where a chirp was a complex vector with a constant magnitude and linearly increasing frequency. The chirp can have constant magnitude to achieve the minimum PAPR, as well as its known capability to cope with very weak channels. Additionally, a chirp can be efficiently processed with the help of the Fast Fourier Transform (FFT). A received chirp can eventually be converted into a vector with a peak, while the time and frequency offsets mainly change the location but do not affect the existence of the peak. As a result, the computation complexity can be significantly reduced because the receiver can find the chirp by searching only in the time dimension with large strides such as N/4, where N denotes the length of the chirp and the stride refers to the amount of movement of the sliding window in each step. In contrast, with preambles based on binary sequences, the receiver needed to run an exhaustive search in a two-dimensional grid of both time and frequency because the auto-correlation of the binary sequence was very low unless the time and frequency offsets were both close to 0. Further, channel delay resulted in opposite effects for the upchirp and downchirp, which simplified parameter estimation.

ChirpPair adopts a multi-stage process, where the initial stage spots the packets and obtains coarse estimates of the packet parameters by exploiting the special characteristics of the chirp, while the subsequent stages obtain more accurate and detailed estimates. ChirpPair has a fast scan method that may reduce the complexity of the fine estimate stage to less than 15% of the full search by exploiting the duality of the upchirp and the downchirp. ChirpPair was demonstrated with real-world experiments in the POWDER wireless platform [2"], which was an open platform at the University of Utah with radios that may be controlled remotely. Simulations with the 3GPP New Radio (NR) Non-Terrestrial Network (NTN) channel model [4"], [6"], [5"], [24"], [19"] further show that ChirpPair achieved high accuracy.

Existing satellite random access techniques include Contention Resolution Diversity Slotted ALOHA (CRDSA) [7"], [9"] and Enhanced Spread Spectrum Aloha (E-SSA) [21"], [12"], [10"], [11"], where E-SSA has been adopted in for standardization [3"] and recently evaluated [13"]. With spread sequence techniques such as E-SSA, the receiver may check for potential preambles at every time instant and every possible CFO because a correlation peak appears when the time and frequency offsets are both close to 0. In contrast, ChirpPair reduced the computation complexity because its initial stages search in the time dimension with a large stride of N/4, while the complexity in the fine estimation stage can be further reduced to less than 15% with a fast scan method. Despite its simplicity, ChirpPair achieved similar performance as the preamble based on binary spread sequences.

Chirp has been used in sonar, radar, and laser systems, as well as in data communication systems, such as LoRa [1"] and IEEE 802.15.4a [15"], [20"], where it is commonly referred to as Chirp Spread Spectrum (CSS) modulation. ChirpPair was inspired by the LoRa preamble, which consisted of a configurable number of upchirps followed by 2.25 downchirps, because the upchirp and downchirp allow the time and frequency offsets to be estimated with a simple linear system [25"]. ChirpPair exploits the same linear system to obtain a coarse estimation of time and frequency. A difference is the simplified preamble in ChirpPair, which can be more balanced between the upchirp and downchirp. ChirpPair's fast scan can obtain fine estimates of the parameters based on the unique structure of the preamble, which may not have been previously explored.

3GPP has started its expansion to Non-Terrestrial Networks [16"], [18"], [17"], [22"], which will be based on Orthogonal Frequency-Division Multiplexing (OFDM) and similar to those in existing cellular networks. Random access channels in 5G NR networks are referred to as the Physical Random-Access Channel (PRACH), in which the user terminals may transmit the Zadoff-Chu (ZC) sequences to the base station to initiate connections. There have been studies to customize the PRACH channel for LEO networks [26"], [14"], [8"], [27"]; however, the problems in PRACH channels are different because the ZC sequence is transmitted in the frequency domain with OFDM. Although it has been proposed to use the ZC sequence and its conjugate as the PRACH preamble [26"], [14"], the mathematical foundation is similar to that discussed in [25"]. ChirpPair, with its fast scan, can exploit the duality of the upchirp and downchirp.

Experimental Results and Additional Examples

ZChirp. A first study was conducted to develop and evaluate a wireless communication protocol ZChirp, that can improve the capacity of LEO networks and LPWANs. The ZChirp protocol can modulate data by combining the chirps and the Z sequence to provide both simultaneous packet transmissions and higher data rate. In the study, the complete physical layer of ZChirp was designed, implemented, and tested, which includes data modulation, Z sequence design, and packet acquisition. Experiments in the POWDER platform confirm that ZChirp packets from multiple nodes can be received correctly over real-world wireless channels. Simulations with the NTN channel and LTE ETU channel model show that ZChirp achieves significant improvement over the state-of-the-art.

Experiments in the POWDER Platform. The experiments of the first study demonstrated the ZChirp protocol in a real-world scenario. The first study conducted experiments in the POWDER platform [23]. Four nodes were used, where "Honors" acted as the gateway, while "Hospital," "SMT," and "UStar," acted as the nodes with transmitter gains of 26 dB, 31 dB, and 31 dB, respectively. Each node transmitted a configurable number of packets at random times, where each packet was transmitted at the same power but with CFO randomly selected from [−2.44, 2.44] kHz. Each experiment lasted 10 seconds and was repeated 3 times. The SF was 6. The carrier frequency was 3.515 GHz, the bandwidth was 125 kHz, the OSF was 8, and the packet size was 64 bytes. The PRR of ZChirp was close to 1 when the traffic load was 30 kbps, i.e., when all 3 nodes were transmitting packets at their full capacities with very small gaps in between packets.

Simulations for LEO Networks. To assess the network capacity of ZChirp for LEO networks, simulations were run under the NTN channel [9], [11], [10], [85], [47]. The network capacity is defined as the network throughput when the PRR is above 0.9. In the simulation, the SF was 7, the bandwidth was 100 MHz, the packet size was 64 bytes, and the SNRs of the received packets were randomly selected in [−5, 15] dB. The SNR has a range of 20 dB to account for the errors in the transmission power control of the nodes. It has been found that the capacity of ZChirp is over 16 Mbps. In comparison, it was found that the existing satellite communication technologies, such as Enhanced Spread Spectrum Aloha (E-SSA) [64], [35], and IDMA [58], are less than 4 Mbps with the same simulation parameters. The capacity of ZChirp is, therefore, over 4×.

Simulations for LPWANs. To assess the network capacity of ZChirp for LPWANs, simulations were run under the LTE ETU channel model in the same manner as the experiments; that is, the bandwidth was 125 kHz, the packet size was 64 bytes, the OSF was 8, and the CFOs of the packets were randomly selected from [−2.44, 2.44] kHz. The SF was 7, and the SNRs of the received packets were randomly selected in [−5, 15] dB. It has been found that the capacity of ZChirp is over 25.6 kbps. In comparison, it was found that the capacity of the state-of-the-art, i.e., CurvingLoRa [44], is less than 10.9 kbps with the same simulation parameters. The capacity of ZChirp is, therefore, over 2.4×.

QCode. The first study also developed and evaluated QCode to improve the network capacity and data rates of LEO networks. QCode used long symbols while increasing the number of bits modulated on each symbol. Therefore, QCode achieved high network capacity without reducing data rates for individual user terminals. Experiments in the POWDER platform confirm that QCode packets may be received correctly in real-world wireless channels without prior synchronization. Simulations with satellite channel models show that QCode achieves higher network throughput than existing satellite communication technology.

Figure 15A:
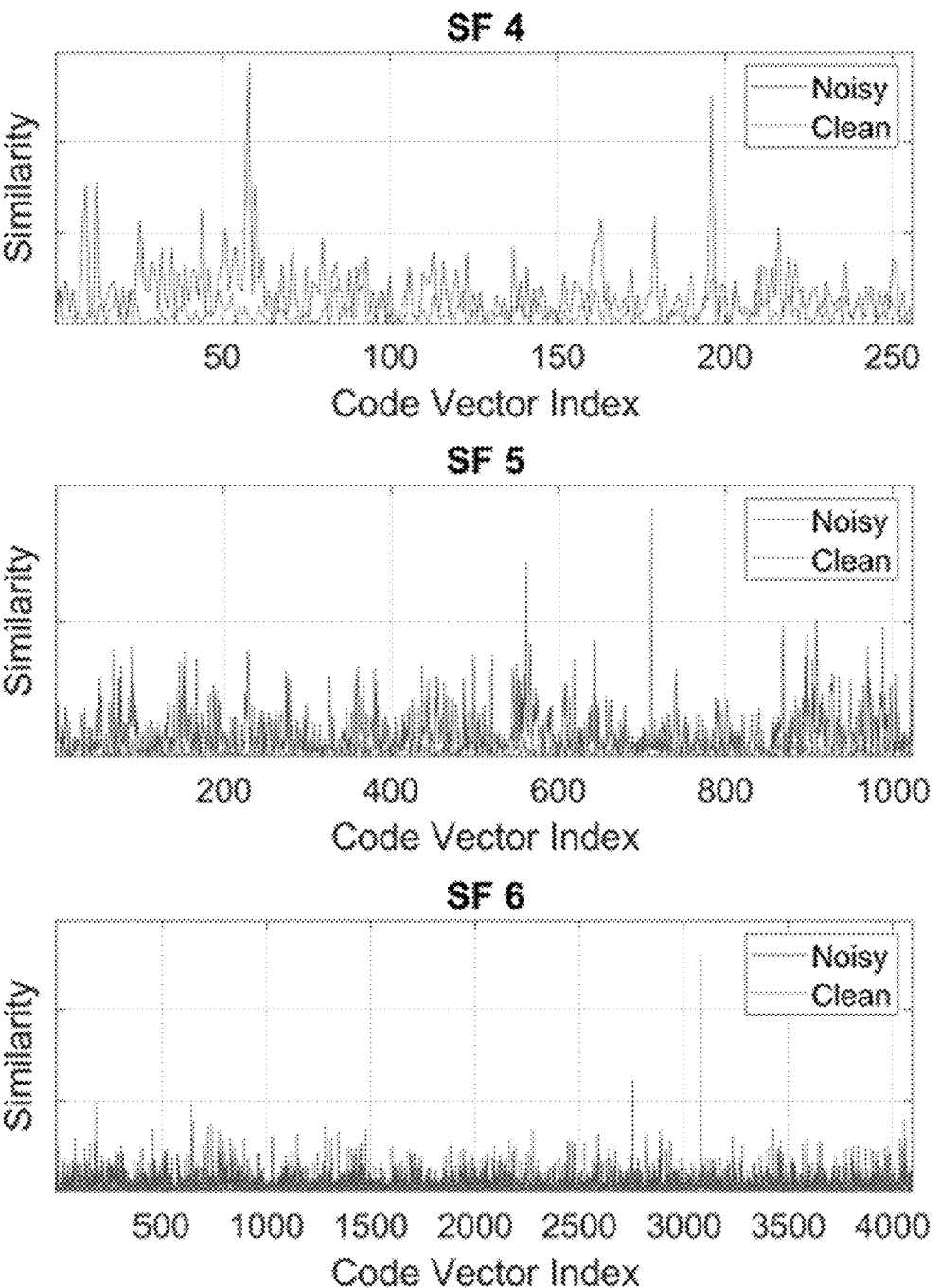

Examples of Demodulated Symbols. FIG. 15A shows examples of demodulated symbols. In the figures, "Clean" means when the noise power is negligible, while "Noisy" means when the noise power is significant. Specifically, in the noisy case, the SNRs are −2 dB, −4 dB, and −7 dB for SFs 4, 5, and 6, respectively, which are the lowest SNR at which packets can still be decoded reliably. The x-axis is the index of the code vectors, while the y-axis is the similarity between the code vectors with the received symbol. It can be seen that, for the clean signal, a peak exists in all cases, where the location of the peak is the index of the code vector used in the modulation of the symbol. The similarities of other code vectors are not 0 but all fairly low. The noisy cases show that noise is the dominant factor at the borderline SNRs. For better visibility of the peaks, different code vectors are modulated in symbols of the clean and noisy cases.

Figure 15B:
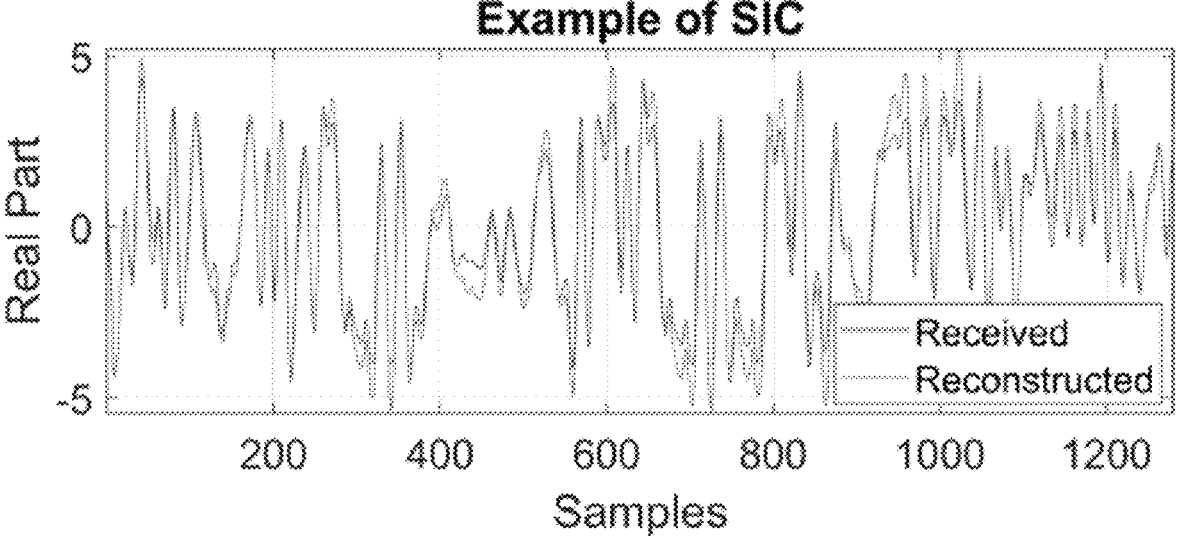

SIC simulations. FIG. 15B shows an example of SIC obtained in the simulations, where the SF is 4, the bandwidth is 25 MHz, the OSF is 8, the SNR is 10 dB, the channel model is NTN-TDL-A, the delay spread is 36 ns, and the fading is Rayleigh. The NTN-TDL-A channel generally generates 3 significant paths. In the figure, "Received" refers to the clean received signal of 10 symbols before white Gaussian noise is added, and "Reconstructed" refers to the reconstructed signal by SIC. It can be seen that "Reconstructed" matches "Received".

Comparison between QCode and E-SSA. The study compared QCode with E-SSA [36'], [20'], [23'], [19'], [21'] because E-SSA had been adopted for standardization [2'] and continues to generate interest [25']. With E-SSA, the data modulation applied a phase shift to a binary spreading sequence depending on the value of the data. E-SSA could be used in UCACH be-cause the autocorrelation of the binary sequence was low unless the time offset was close to 0 so that signals from different user terminals can usually be separated. In the implementation, E-SSA also used QPSK for data modulation and the Raised Cosine filter for baseband signal generation. As a result, the baseband waveforms of E-SSA and QCode had similar characteristics, except that the data modulation with QCode was based on code vectors.

The spreading code of E-SSA in the implementation was the Gold sequence [22']. Specifically, a Gold sequence of length 4096 was used as the base code. The spreading sequence of symbol i consisted of bits $(i-1)E$ to $iE-1$ of the base code, wrapped around if needed, where E was the length of the spreading sequence. To facilitate the comparison, the study chose E to match the data rate of QCode. That was, three configurations of E-SSA were implemented, denoted as E-SSA 4, E-SSA 5, and E-SSA 6, to match QCode with SFs 4, 5, and 6, respectively. The values of E were 3, 6, and 12, for E-SSA 4, E-SSA 5, and E-SSA 6, resulting in data rates of 8.33 Mbps, 4.17 Mbps, and 2.09 Mbps, respectively. For simplicity, in the study, QCode with SFs 4, 5, and 6 are referred to as QCode 4, QCode 5, and QCode 6, respectively.

For error correction, the same Turbo code for the phase modulation of QCode was used for E-SSA. E-SSA used the same preamble and PHY header as QCode, so that E-SSA had the same packet detection ratio and parameter estimation accuracy as QCode. The E-SSA receiver also used the same procedure for packet decoding as the QCode receiver; that was, the E-SSA receiver also decoded strong packets first, then applied SIC to remove the signals of decoded packets, then detected and decoded more packets. For channels with multiple paths, a Rake receiver was used.

Comparison Results. The study compared QCode 6 with E-SSA 6. The packet size was 64 bytes, the carrier frequency was 3.515 GHz, the OSF was 8, and the bandwidth was 125 kHz. A CFO within ±4.88 kHz was selected and added to each packet.

Figure 15C:
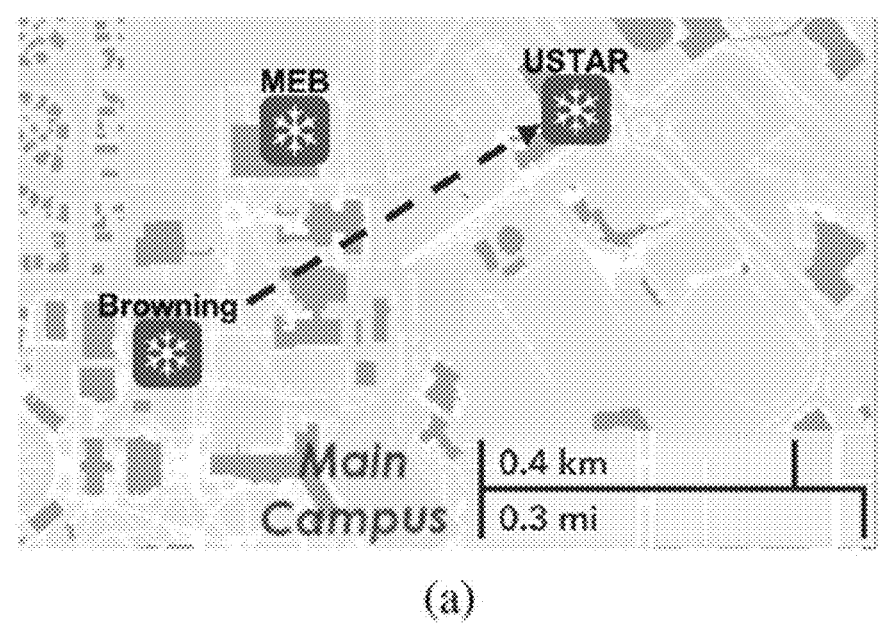
Figure 15C:
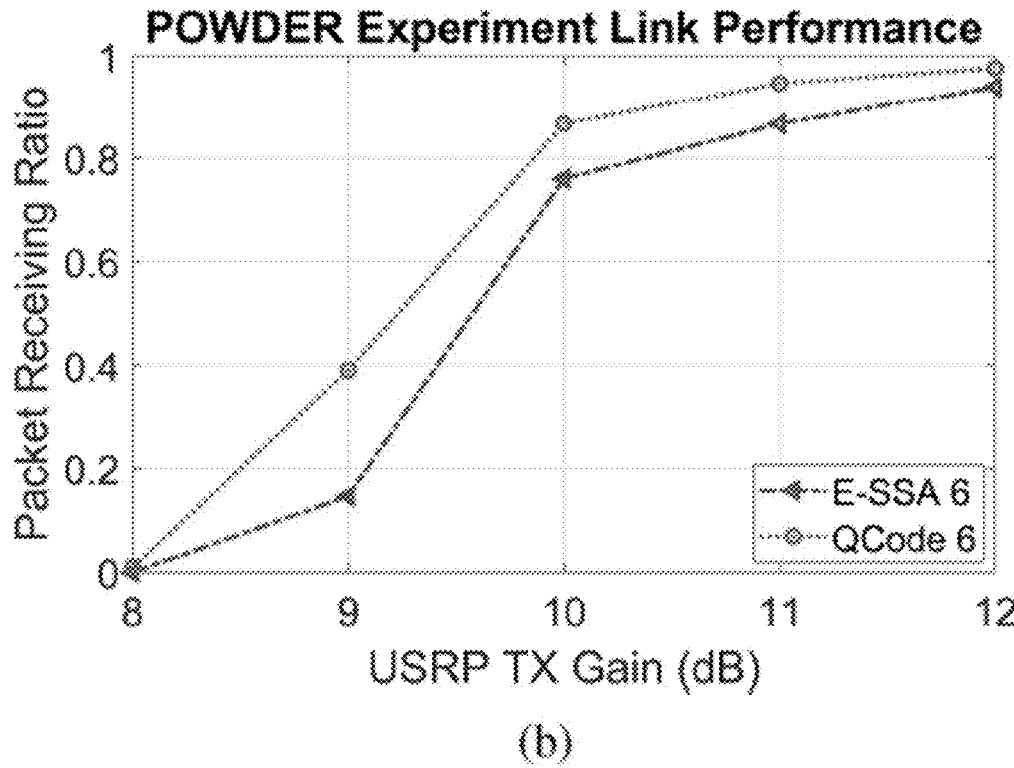

The first set of experiments demonstrated that QCode achieved the same or better communication distance than E-SSA at similar data rates. QCode was mainly designed to improve the network capacity; however, the increase of capacity should not be at the cost of communication distance. As the communication distance was determined by the capability to decode weak signals, in this set of experiments, the Packet Receiving Ratio (PRR) was measured between a single pair of transmitter and receiver with varying transmission power levels to probe the limits of both schemes. FIG. 15C, subpanel A, shows the locations of the transmitter and receiver in the POWDER platform. FIG. 15C, subpanel B shows the measured PRR as a function of the transmission gain. It may be seen that the PRR of QCode is consistently higher than E-SSA, suggesting that QCode reaches a longer communication distance.

The second set of experiments focused on network capacity, which was defined as the network throughput under the constraint that the PRR was at least 0.9. As shown in FIG. 15C, subpanel A, the test scenario consists of 4 nodes and one gateway. The nodes transmit packets at random times to the gateway for a total of 10 seconds. In any experiment, all nodes transmit the same number of packets. The transmission gains of "Browning," "Hospital," "Honors," and "Behavioral" are 26 dB, 21 dB, 31 dB, and 31 dB, respectively, to ensure connectivity and a certain level of power diversity. The measured PRRs are shown in FIG. 15B, subpanel B, as a function of the offered load. It can be seen that the PRR of QCode stays above 0.9 even for the highest load, while the PRR of E-SSA drops below 0.9 when the load is about 15 kbps. Therefore, for this network, the capacity gain of QCode is more than 2.65×.

Figure 15D:
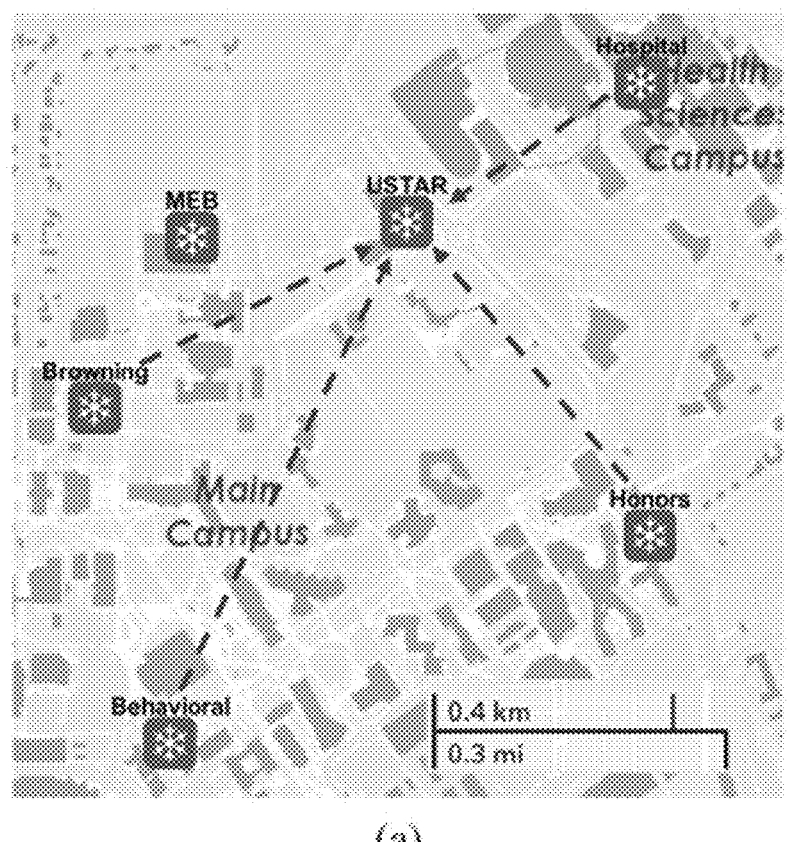
Figure 15D:
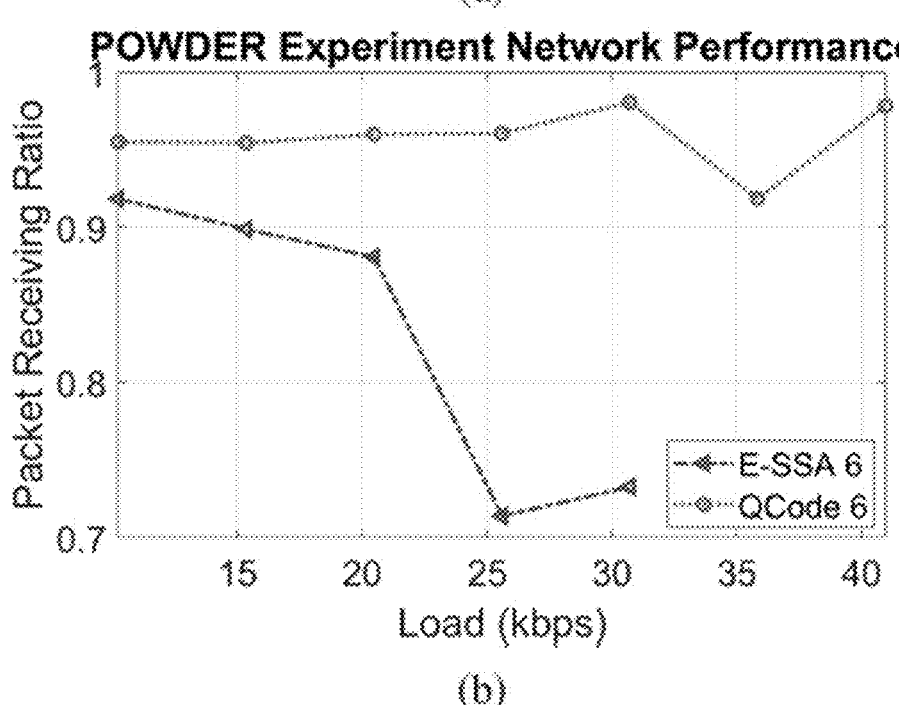

FIG. 15D shows the estimated signals from the nodes in one experiment where each node transmits 200 packets in 10 seconds, which is the highest load. Note that the actual signal from each node may not be known because the received signal is the summation of the signals from all nodes and noise. Once a packet is decoded, its signal is reconstructed for SIC, which may be used as an estimation of the actual signal. It may be seen that nodes transmit packets almost non-stop. The power difference is significant, which is caused by the wireless channel and the selected transmission gain.

The experiments show that QCode worked in real-world wireless channels with noise, multi-path, and interference. The experiments also demonstrated the existence of a large gain of network capacity over E-SSA.

Simulation with Satellite Channels.

(a) Simulation Setup. In the simulations, the NTN channel [3'], [5'], [4'], [47'], [30'] was used, which was designed for the satellite communication scenario. The delay profile of the NTN channel was either NTN-TDL-A or NTN-TDL-D, which represented channels with multiple strong paths and those with a single strong line-of-sight path, respectively. The fading settings were Rayleigh and Rician for the NTN-TDL-A and NTN-TDL-D profiles, respectively. The channel bandwidth was 25 MHz, and the carrier frequency was 10 GHz. The altitude and speed of the satellite were chosen to match those of LEO networks and were 600 km and 7562.2 m/s, respectively. A node may estimate the Doppler shift frequency based on the downlink signals from the satellite and approximate it with a constant frequency, which may be applied to its uplink signal to cancel most of the Doppler shift effect. The delay spread of a node was selected within [10, 40] ns. The number of antennas at the gateway was 2, and the OSF was 8. Each packet carried 64 bytes of data. The CFO of a packet was selected within ±0.98 MHz.

(b) Link Performance. The link performance of a scheme was measured by the SNR threshold, which was defined as the minimum SNR to achieve a PRR of 0.9 when there was one transmitter and one receiver. A lower SNR threshold means a scheme is better at coping with weak signals and can reach a longer communication distance. As mentioned earlier, the study demonstrated that QCode improved the network capacity, not at the cost of the communication distance.

Figure 15E:
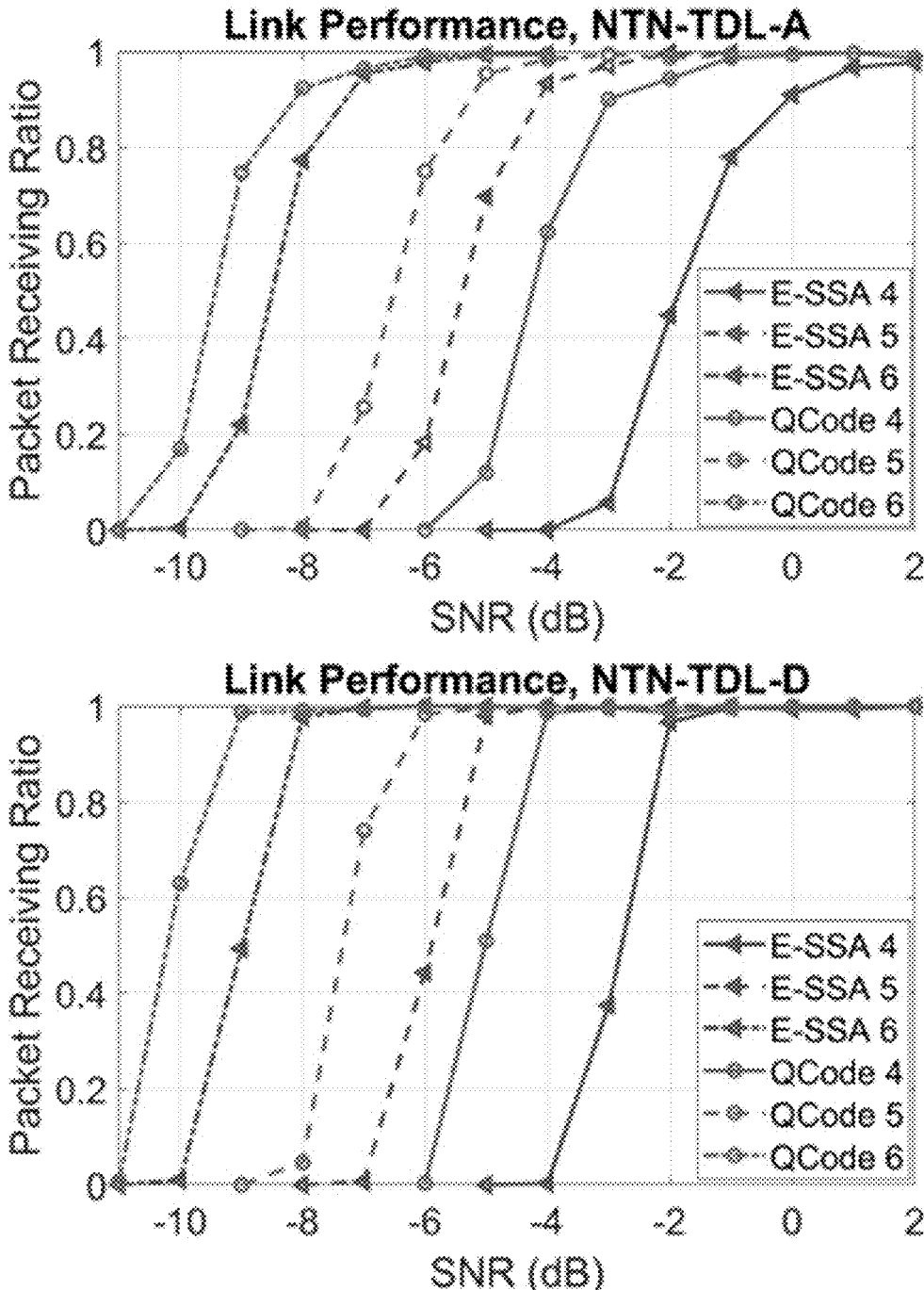

FIG. 15E shows the PRR as a function of the SNR for the NTN-TDL-A and NTN-TDL-D profiles. QCode had a 1-2 dB gain over E-SSA for all 3 data rates and both channel profiles, suggesting that QCode may potentially reach longer distances. The SNR thresholds of QCode for adjacent SFs were separated by about 3 dB because the data rate roughly doubled when the SF was incremented by 1. The SNR threshold of the NTN-TDL-A profile was higher than that of the NTN-TDL-D profile.

FIG. 15F shows the results with the NTN-TDL-A profile. Specifically, FIG. 28A shows the results of the Single-SF tests where all packets were transmitted with the same SF in any run of the simulation.

Figure 15G:
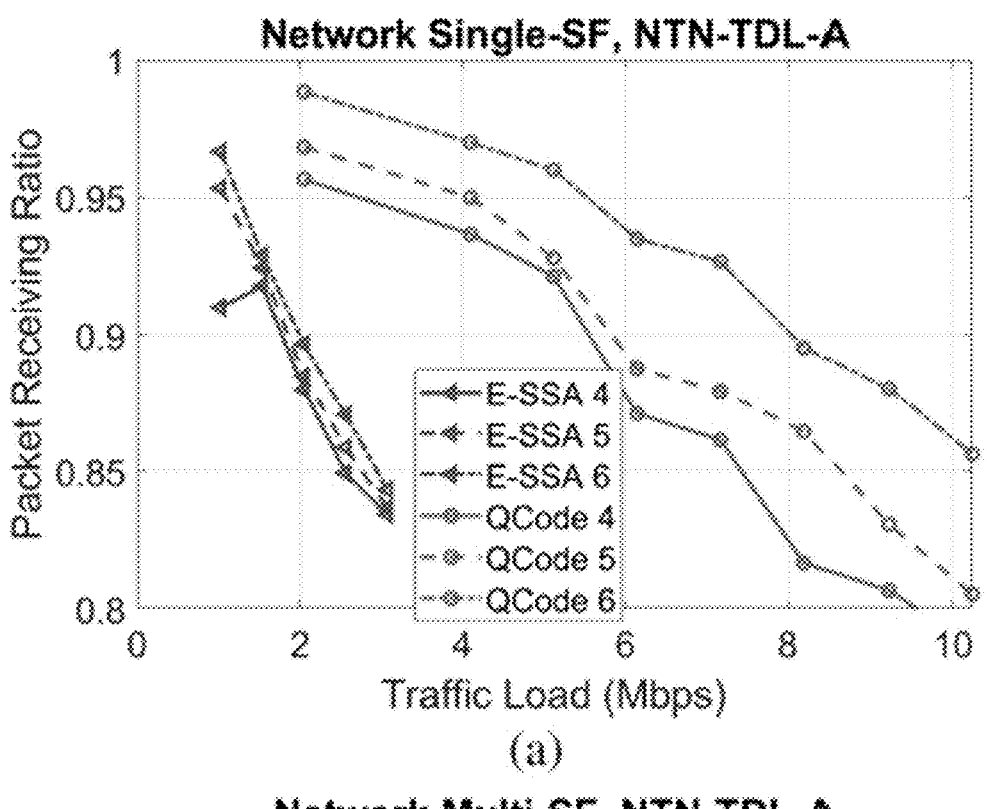
Figure 15G:
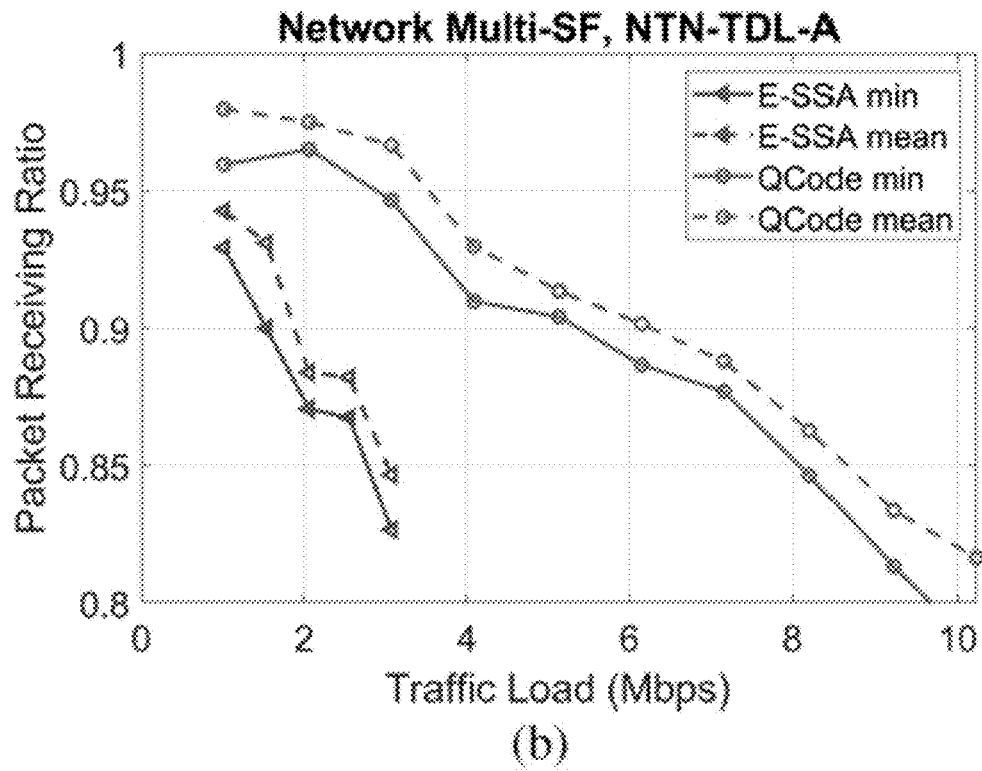

FIG. 15G shows those of the Multi-SF tests where an equal number of packets were transmitted with SFs 4, 5, and 6, respectively, in any run of the simulation. QCode outperformed E-SSA in both settings. For example, in the Single-SF tests of SF 5, the capacities of E-SSA and Qcode were 1.67 Mbps and 5.25 Mbps, respectively; therefore, the gain of QCode is 3.15×. The same trend may be observed in the Multi-SF tests, in which the performance was measured by the minimum and mean PRRs of all SFs. For example, when measured by the minimum PRR, the capacities of E-SSA and QCode were 1.38 Mbps and 4.84 Mbps, respectively; therefore, the gain of QCode was 3.50×. For both E-SSA and QCode, lower data rates led to higher capacity because the symbol was longer and could better cope with interference. The difference between the minimum and average PRRs of QCode in the Multi-SF tests was small, suggesting that QCode was fair to nodes using different data rates.

Figure 15H:
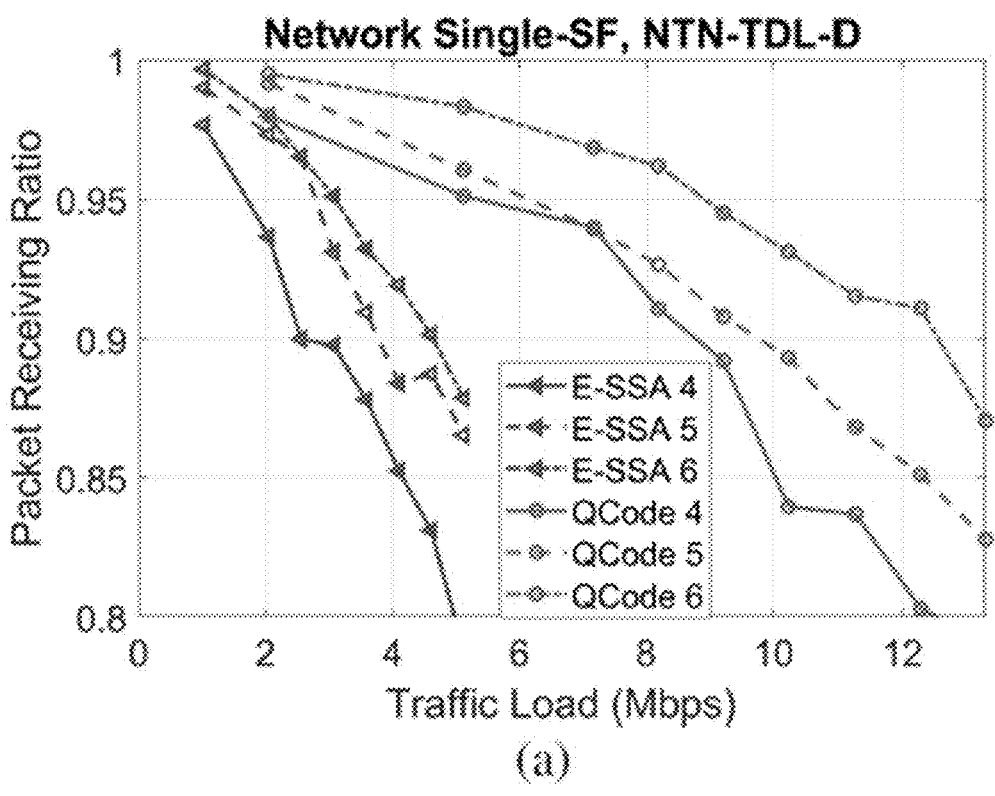
Figure 15H:
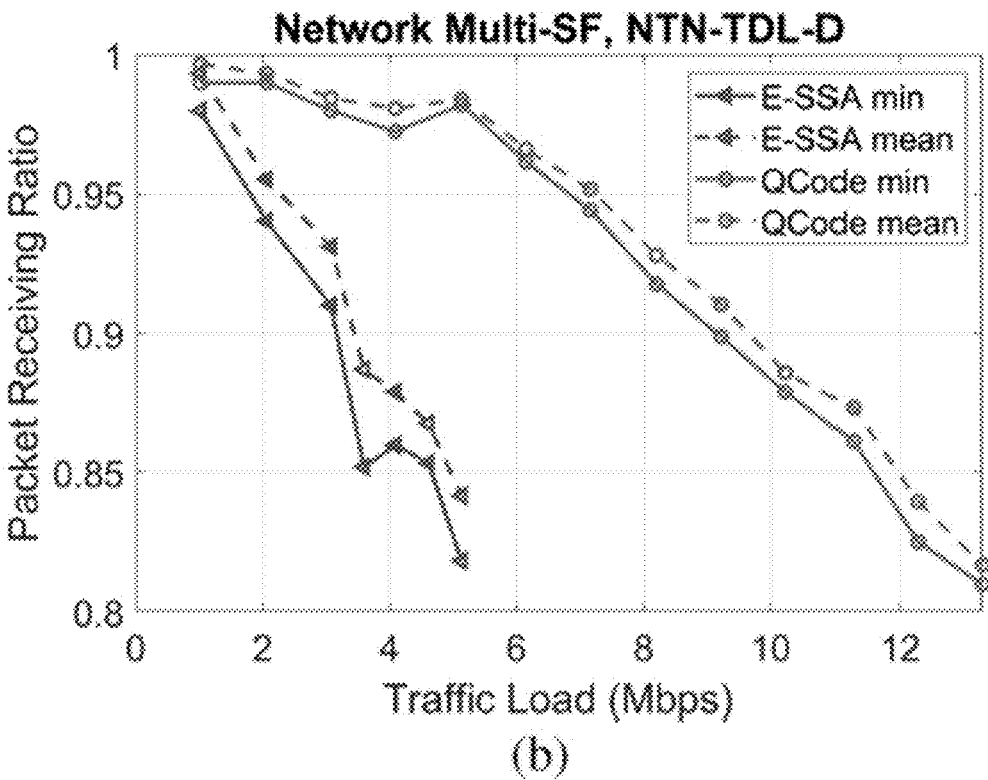

FIG. 15H shows the results with the NTN-TDL-D profile. As NTN-TDL-D is less challenging, the capacities of both E-SSA and QCode are higher than those with the NTN-TDL-A profile. Due to the same reason, the gains of QCode were also lower than those with the NTN-TDL-A profile. The results of all tested cases, as well as the gains of QCode, were listed in FIG. 27. The median of the gains in all cases is 3.14×, which is used to represent the gain of QCode over E-SSA.

Various Aspects of QCode. To evaluate the design choices, the study compared QCode with the following schemes which are obtained by replacing or disabling certain parts of QCode per Table 2.

TABLE 2

| Schemes | Description |
|---|---|
| noSIC | noSIC is the same as QCode except disabling the SIC component |
| noRake | noRake is the same as QCode except replacing the Rake |

TABLE 2-continued

| Schemes | Description |
| --- | --- |
| | receiver with a simple receiver that processes only the strongest path |
| RandSegVec | RandVec is the same as QCode except replacing the segment vectors with random vector |
| RandCodeVec | RandVec is the same as QCode except replacing the code vectors with random vectors |

RandSegVec used random vectors as segment vectors but still kept the segmented design of QCode and, therefore, the same computation complexity.

RandCodeVec, on the other hand, used random vectors as code vectors and, therefore may not take advantage of the segmented design and experiences high computation complexity. However, as random code vectors are more likely to be dissimilar to each other, RandCodeVec likely suffers fewer demodulation errors.

Figure 15I:
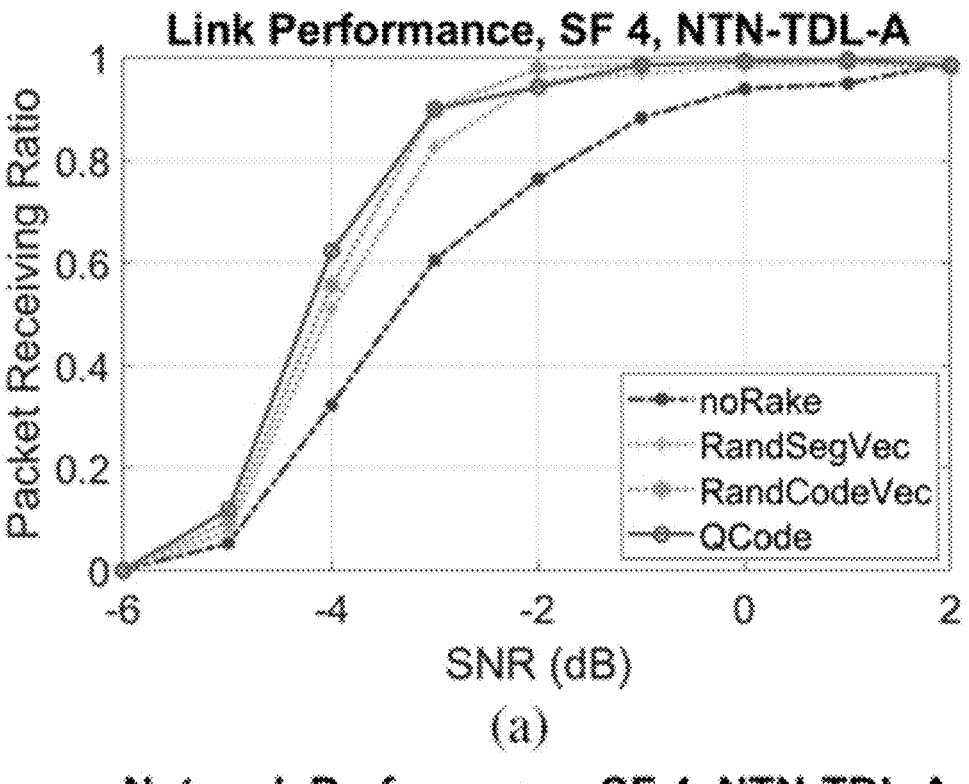
Figure 15I:
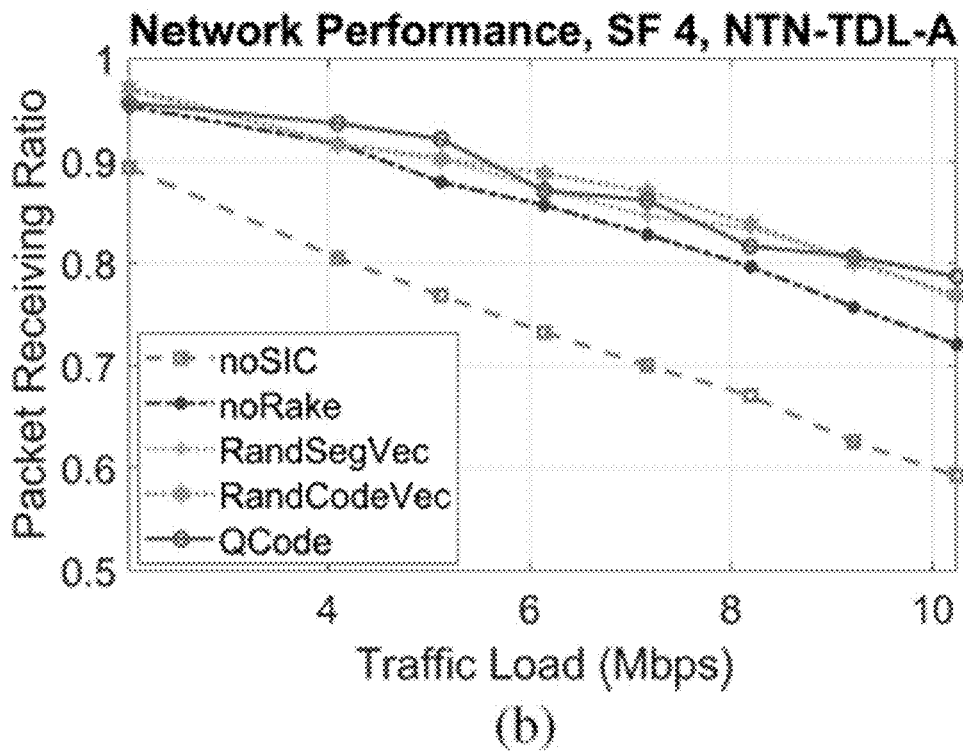

FIG. 15I, subpanel A, shows the link performance of SF 4 with the NTN-TDL-A profile. noSIC was not shown because SIC was not needed when packets did not overlap. QCode was better than noRake, which demonstrated the necessity of the Rake receiver. QCode was also better than RandSegVec, which confirmed that the segment vectors in QCode were better than random vectors. QCode was similar to RandCodeVec, which suggested that the code vectors in QCode were as good as random vectors.

FIG. 15I, subpanel B shows the network performance of SF 4 with the NTN-TDL-A profile. There may exist a large gap between noSIC and QCode, which demonstrates the necessity of SIC as well as the effectiveness of the SIC method used in QCode. The gap between noRake and QCode is also noticeable, confirming that the Rake receiver also helps in the network scenario. RandSegVec and RandCodeVec are both close to QCode.

ChirpPair. The study also developed and evaluated Chirp-Pair to detect the packets and estimate key parameters of the packet for data demodulation. ChirpPair adopted a multi-stage process that increases the estimation accuracy of the parameters without incurring high computation complexity. ChirpPair was demonstrated in real-world experiments with over-the-air transmissions and was evaluated by simulations with the 3GPP New Radio (NR) Non-Terrestrial Network (NTN) channel model. The study shows that ChirpPair achieved high accuracy despite its low computation complexity.

Over-the-air experiments in POWDER platform. In the study, radios "Ustar," "Hospital," and "SMT" acted as user terminals and transmitted packets to another radio, "Honors," which acted as the receiver. The user terminals played trace files prepared by software. Each trace contained 200 packets starting at random times with little gap in between. Each packet contained a sequence number, with which the transmitter of the packet may be identified. Packets from the same user terminal were transmitted at the same power but with random CFOs within ±4.88 kHz. The SF was 8, the carrier frequency was 3.515 GHz, the bandwidth was 125 kHz, the OSF was 8, and the experiment lasted 10 seconds. The signal power of the strongest and weakest user terminals differed by at least 10 dB. The receiver recorded the signal and stored it in a file to be processed by the same software used in simulations. The receiver software adopts Successive Interference Cancellation (SIC) for better performance.

Figure 16A:
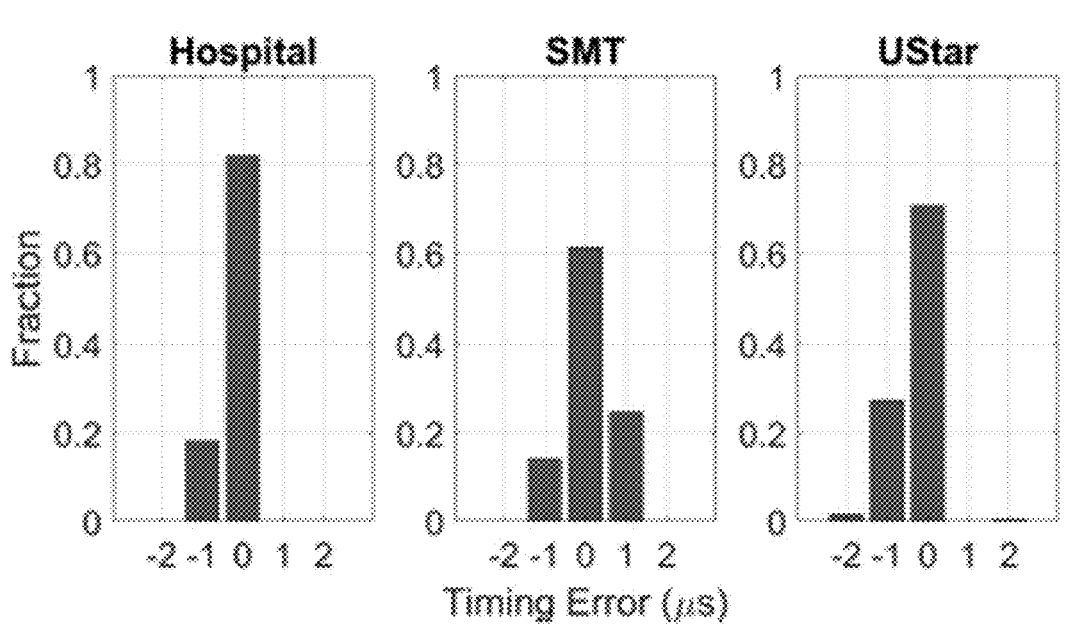
FIGS. 16A-16K show experimental results associated with ChirpPair.
Figure 16B:
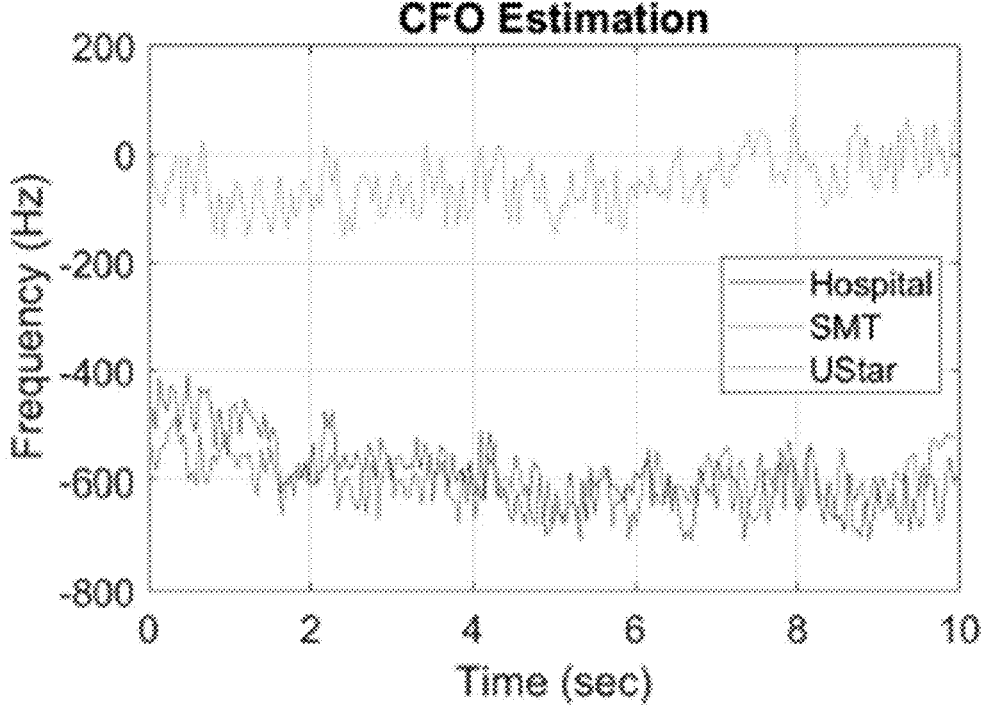

Over 99% of the packets could be detected. As the transmission time and CFO of each packet were recorded during the generation of the trace file, the study evaluated the estimation accuracy of ChirpPair. The smallest time granularity was 1 μs because the bandwidth was 125 kHz and the OSF was 8, so a sample was taken every 1 μs. FIG. 16A shows the difference between the actual and estimated start time where the estimation error was within $[-1, 1]$ μs, i.e., the errors were within 1 sample for most of the packets. FIG. 16B shows the difference between the randomly introduced CFO during packet generation and the estimated CFO in one experiment, where a data point was plotted at time t if a packet was received at time t. The difference was not 0 because it was the natural CFO between the user terminal and receiver. As the natural CFO fluctuated over time and was not known, the exact CFO estimation error may be obtained. However, FIG. 32 shows a continuous trend for every user terminal, which was likely caused by the natural fluctuation of the CFO rather than by estimation errors.

As the system bandwidth was low at 125 kHz, the delay spread of links in the network was very small compared to the sample time. As a result, there was no multi-path in the channel, which was why the accuracy of timing offset estimation may be obtained by finding the difference between the actual and estimated start time of the packets. The bandwidth was low because the noise power was reduced by reducing the bandwidth, so that the desired communication range may be achieved. Despite the low bandwidth and the terrestrial channel, the study demonstrated ChirpPair in the real-world, where 3 user terminals transmitted packets almost non-stop simultaneously to the receiver.

Network Simulation. For a more quantitative evaluation of ChirpPair, simulations were conducted with the 3GPP New Radio (NR) Non-Terrestrial Network (NTN) channel [4"], [6"], [5"], [24"], [19"].

(a) Simulation Setup. The NTN channel was set up with 100 MHz channel bandwidth and 10 GHz carrier frequency. The altitude and speed of the satellite were 600 km and 7562.2 m/s, respectively. The user terminal may estimate the Doppler shift frequency based on the downlink signals and cancel it by adding to its uplink signal a constant frequency shift that best matches the Doppler shift frequency. The SF was 6, and the CFO of a packet was randomly selected from ±3.90 MHz. Each packet carried 64 bytes of data and lasted 21 μs. The delay spread of a user terminal was randomly selected within [10, 40] ns. The number of antennas at the receiver was 2. The delay profile was NTN-TDL-A, and the fading was Rayleigh.

(b) Implementation of BinPreamble. The study also implemented and tested the BinPreamble, where the binary preamble was based on the Gold sequence. The Gold sequence was used because it had low cross-correlations and has been widely used in CDMA and satellite communications. In tests with BinPream-ble, the preamble of a packet was replaced with a Gold sequence of the same length, while the rest of the packet was unchanged. SIC was also implemented for the BinPreamble.

The study implemented BinPreamble to demonstrate that the performance of ChirpPair and BinPreamble were similar because ChirpPair had low computation complexity. With the same search granularity in the time and frequency domain, ChirpPair and BinPreamble may exhibit similar performance because both were based on correlating complex vectors of the same length.

Packet detection with BinPreamble was experimented in [13"], and the basic approach was an exhaustive search on time and frequency. In the simulations, the search granularity of BinPreamble was the same as ChirpPair both in the time and frequency domain. That was, $\alpha$ was 8, and the frequency step was $\beta/4$ Hz. The search space in the time domain was limited to ±50 samples of the actual start time of every packet. For this reason, BinPreamble in the simulation was referred to as "BinPreamble Ideal" because it only needed to use the local maximum in a small space to detect a packet and obtain estimations and may skip parts of the signal that were known to contain no preamble.

Figure 16C:
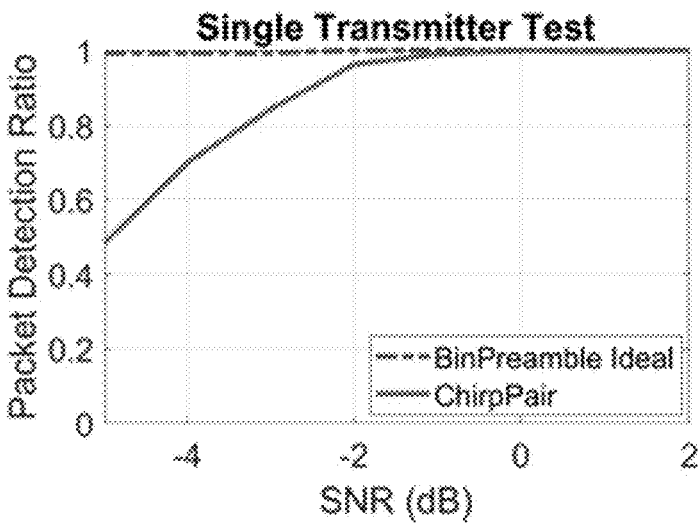

(c) Single Transmitter Test. To reveal the performance as a function of the SNR without interference from other packets, the first set of tests involved only one transmitter. FIG. 16C shows the ratio of detected packets, where both BinPreamble Ideal and ChirpPair detected almost all the packets when the SNR was −2 dB or above. When the SNR was lower than −2 dB, BinPreamble Ideal detected more packets. ChirpPair lost some packets because the signal was weak and could not be spotted in the initial search stage. On the other hand, as BinPreamble Ideal was given the start time of the packets in the simulation, BinPreamble Ideal was given a perfect initial search stage and therefore did not miss any packet.

Figure 16D:
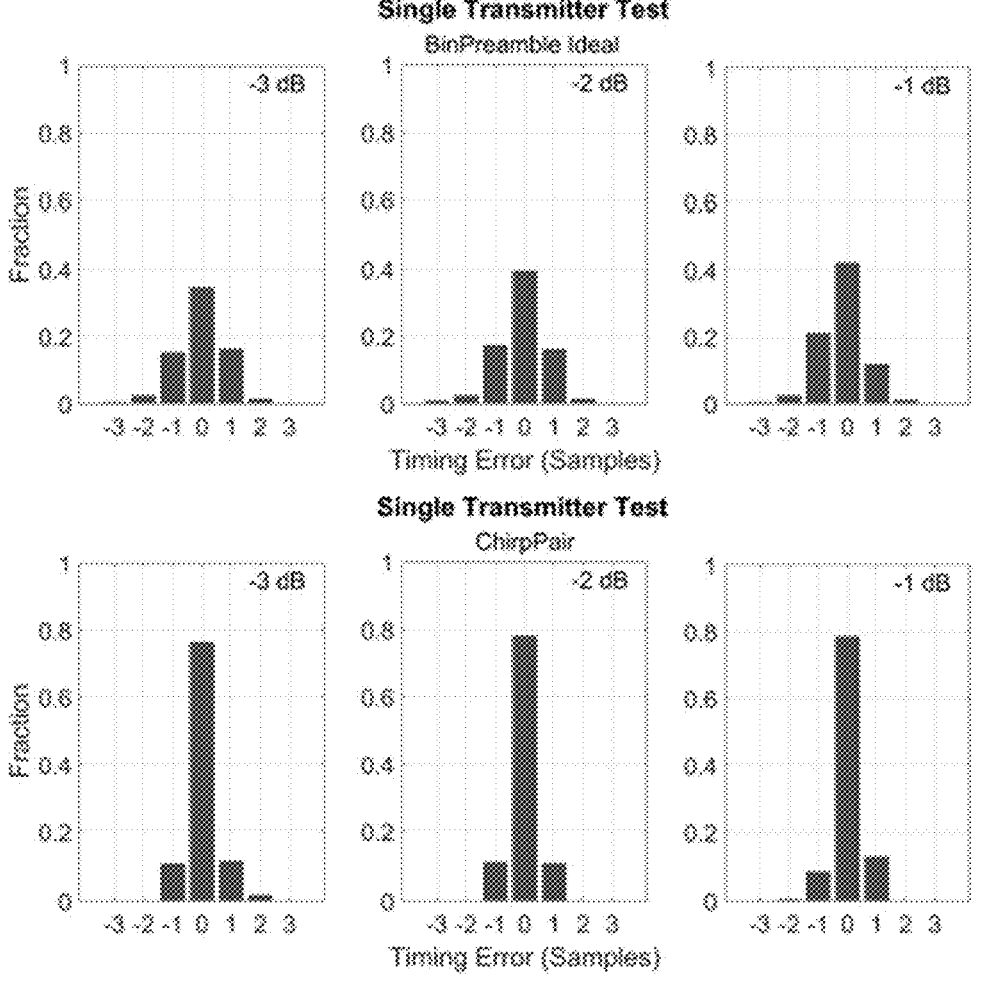

FIG. 16D shows the distribution of the estimation errors of timing off-set for 3 SNR values, which were near the transition point, i.e., when the packet detection ratio rose from below 0.9 to above 0.9 for ChirpPair. Both BinPreamble Ideal and ChirpPair located the start time of packets within ±1 samples for most of packets, while ChirpPair was more accurate and located more packets with 0 error.

Figure 16E:
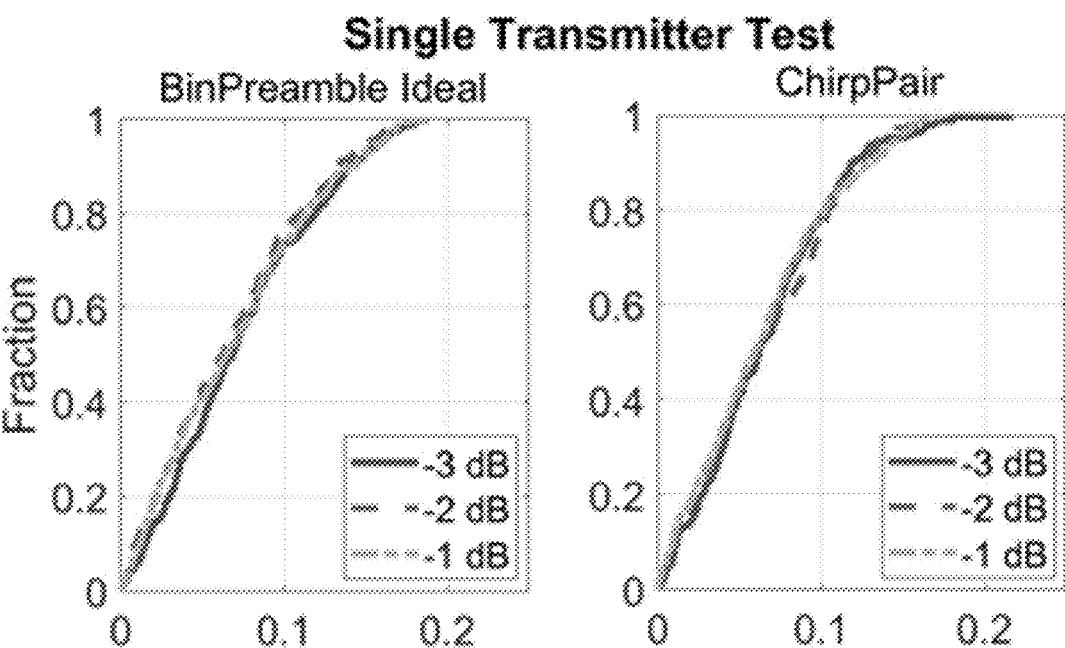

FIG. 16E shows the Cumulative Density Function (CDF) of the CFO estimation error for the same 3 SNR values near the transition point. The CFO estimation errors of BinPreamble Ideal and ChirpPair were similar with medians around 0.050 Hz.

Network Test. The study also carried out evaluations in a network setting, where user terminals transmitted packets at random times to the satellite. The SNR of the received packets were randomly distributed within [3, 23] dB. The minimum SNR was 3 dB, which was sufficiently high so that packet loss was mostly due to collisions. The largest and smallest SNR may differ by 20 dB to simulate errors in transmission power control. Each test lasted 125 ms, where the number of transmitted packets was from 200 to 800.

Figure 16F:
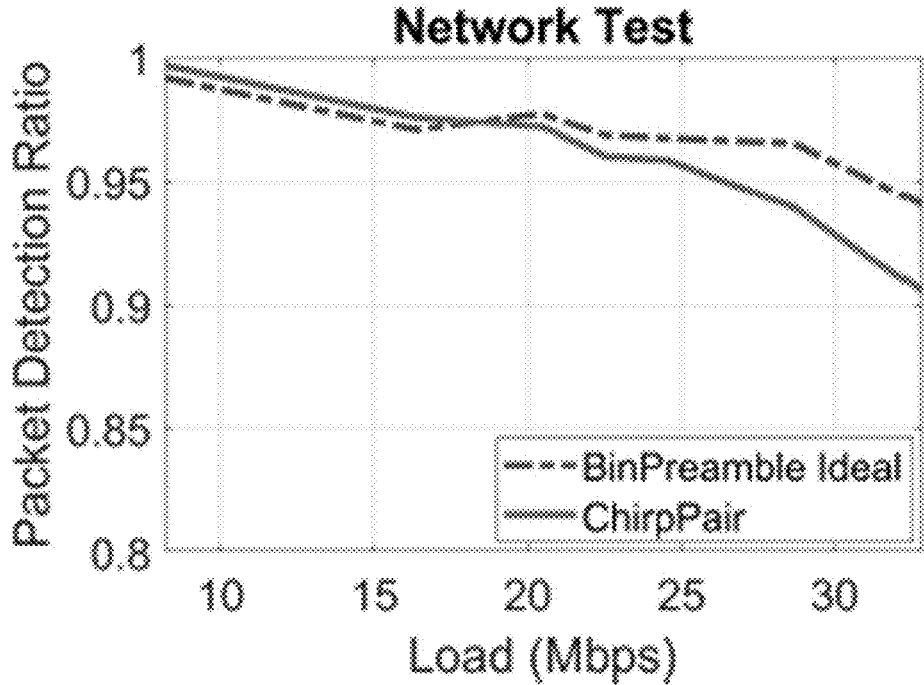
Figure 16G:
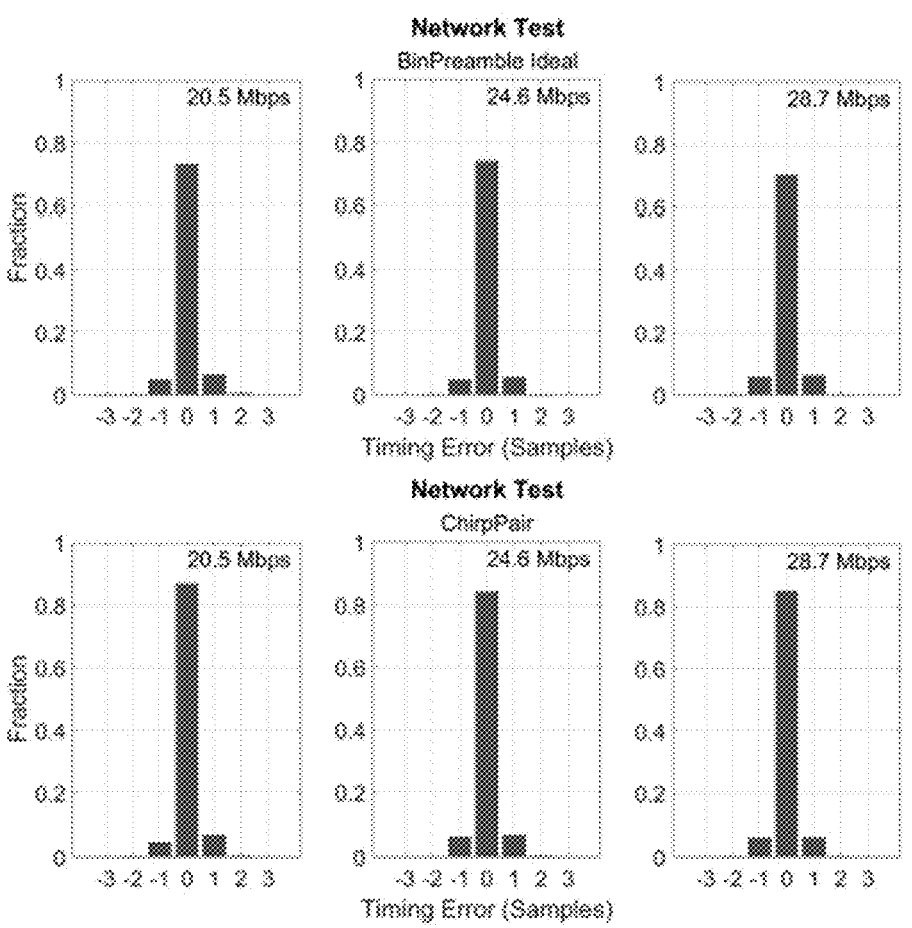
Figure 16H:
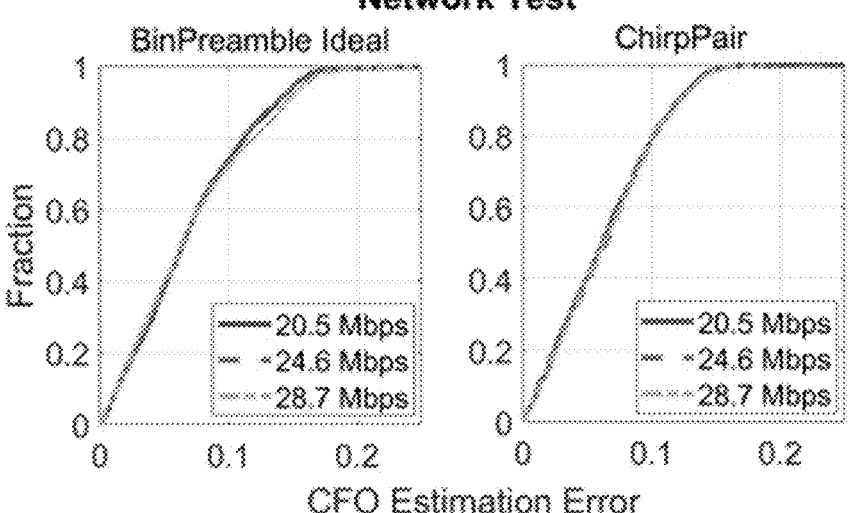

FIG. 16F shows the packet detection ratio as a function of network load. With ChirpPair, over 90% of packets were detected, even at the highest load. BinPreamble Ideal detected more packets than ChirpPair for the same reason. The detection with BinPreamble Ideal, however, was no longer perfect because of packet collision. FIG. 16G shows the distribution of the estimation errors of timing offset for 3 load values, where the distributions were similar, and the errors in most of the cases are within ±1 sample for both BinPreamble Ideal and ChirpPair. FIG. 16H shows the CDF of the CFO estimation error for 3 load values, which show similar trends as FIG. 35.

Figure 16I:
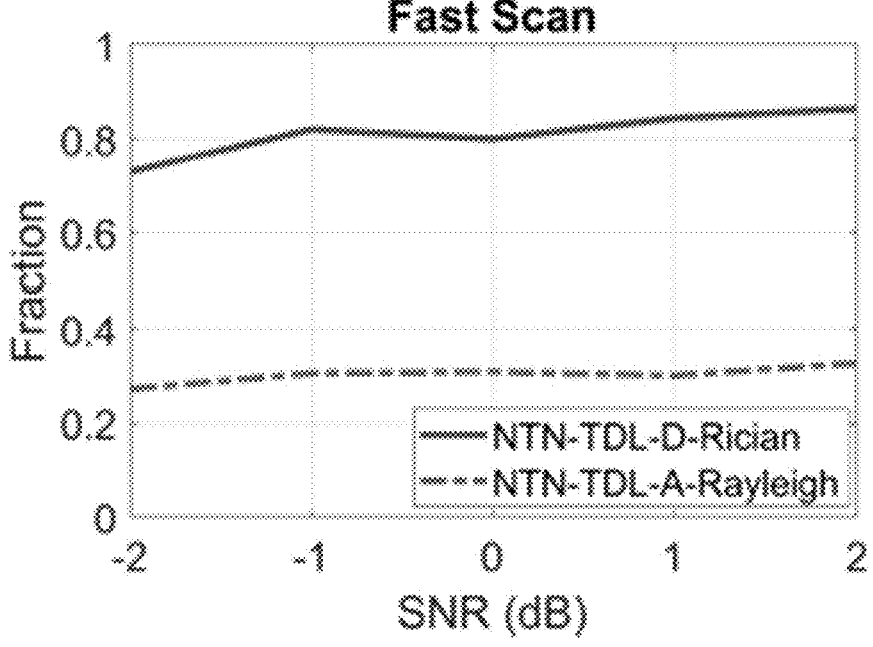

Fast scan. FIG. 16I shows the fraction of packets that were processed with the fast scan rather than the full scan. The fraction is related to the type of the channel. That is, about 80% or more packets were processed with fast scan in the NTN-TDL-D channel with Rician fading, while the fraction was only about 30% in the NTN-TDL-A channel with Rayleigh Rayleigh fading. This was because NTN-TDL-D channel models linked with line-of-sight paths, so the main path was significantly stronger than other paths, while NTN-TDL-A channel models linked without line-of-sight paths, where the paths may have similar strengths.

Path estimation. The study conducted a test in a single transmitter setting when the SNR was −1 dB to compare the estimated path delays and gains with the actual values. It was found that in 10% of the cases, the estimated path number was less than the actual path number, which was usually due to missing the weakest path and, therefore did not affect packet decoding. Statistics were collected in the remain cases where the estimated and actual path numbers match.

Figure 16J:
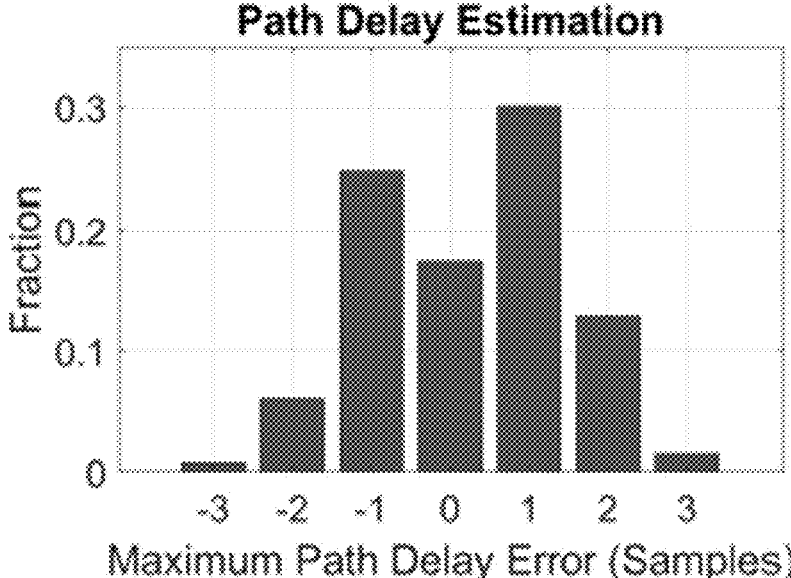

FIG. 16J shows the distribution of path delay estimation error, which was defined as the maximum error among all paths. The estimation errors were small.

Figure 16K:
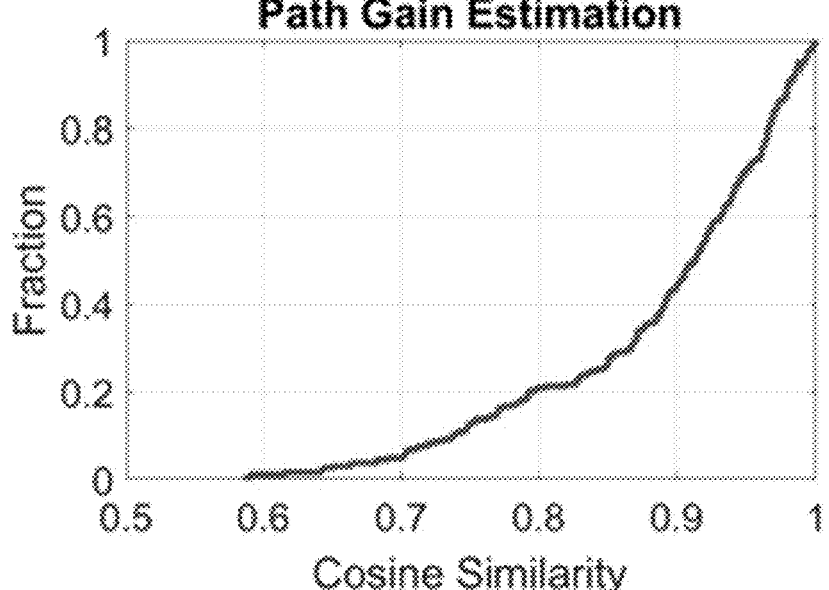

FIG. 16K shows the CDF of the cosine similarity between the estimated and actual path gains, where the cosine similarity was a value between −1 and 1, and 1 means two vectors were identical except for a scaling factor. The NTN model only reports the path magnitude; therefore, the comparison was between the path magnitude. The estimated gains were mostly similar to the actual gains, where the median of the cosine similarity is 0.91.

Example Computing Device. An example computing device upon which the exemplary system and methods (e.g., for a part searcher) described herein may be implemented can include, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In a configuration, a computing device includes at least one processing unit and system memory. Depending on the exact configuration and type of computing device, system memory may be volatile (such as random access memory (RAM)), non-volatile (such as read-only memory (ROM), flash memory, etc.), or some combination of the two. The processing unit may be a programmable processor that performs arithmetic and logic operations necessary for the operation of the computing device. The computing device may also include a bus or other communication mechanism for communicating information among various components of the computing device.

Computing devices may have additional features/functionality. For example, a computing device may include additional storage, such as removable storage and non-removable storage, including, but not limited to, magnetic or optical disks or tapes. A computing device may also contain network connection(s) that allow the device to communicate with other devices. A computing device may also have input device(s) such as a keyboard, mouse, touch screen, etc. Output device(s) such as a display, speakers, printer, etc. may also be included. The additional devices may be connected to the bus in order to facilitate communication of data among the components of the computing device.

The processing unit may be configured to execute program code encoded in tangible, computer-readable media. Tangible, computer-readable media refers to any media that is capable of providing data that causes the computing device (i.e., a machine) to operate in a particular fashion. A computer-readable media may be utilized to provide instructions to processing unit 206 for execution. Example tangible, computer-readable media may include, but is not limited to, volatile media, non-volatile media, removable media, and non-removable media implemented in any method or technology for storage of information such as computer-readable instructions, data structures, program modules or other data. System memory, removable storage, and non-removable storage are all examples of tangible, computer storage media. Example tangible, computer-readable recording media include but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit may execute program code stored in the system memory. For example, the bus may carry data to the system memory, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Conclusion

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with certain embodiments and specific examples, it is not intended that the scope be limited to the particular embodiments set forth, as the embodiments herein are intended in all respects to be illustrative rather than restrictive.

In this specification and in the claims that follow, reference will be made to a number of terms, which shall be defined to have the following meanings:

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of" Similarly, the term "consisting essentially of" is intended to include examples encompassed by the term "consisting of".

As used in the specification and the appended claims, the singular forms "a," "an" and "the" include plural referents unless the context clearly dictates otherwise. Thus, for example, reference to "a compound", "a composition", or "a cancer", includes, but is not limited to, two or more such compounds, compositions, or cancers, and the like.

It should be noted that ratios, concentrations, amounts, and other numerical data can be expressed herein in a range format. It can be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it can be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

The following patents, applications and publications as listed below and throughout this document are hereby incorporated by reference in their entirety herein.

REFERENCE LIST #1

[1] 3GPP TS 36.101. User Equipment (UE) Radio Transmission and Reception. 3rd Generation Partnership Project; Technical Specification Group Radio Access Network. Evolved Universal Terrestrial Radio Access (EUTRA).

[2] 3GPP TS 36.104. Base Station (BS) radio transmission and reception. 3rd Generation Partnership Project; Technical Specification Group Radio Access Network. Evolved Universal Terrestrial Radio Access (EUTRA).

[3] LoRaWAN 1.1 specification. https://www.lora-alliance.org/resourcehub/lorawantm-specification-v11.

[4] NB-IoT. http://www.3gpp.org/news-events/3gpp-news/1785-nb iot complete.

[5] RPMA Technology. https://www.ingenu.com/technology/rpma.

[6] Sigfox. https://www.sigfox.com.

[7] Weightless Specification. http://www.weightless.org/about/weightlessspecification.

[8] European Telecommunication Standardisation Institute (ETSI) EN 301 790 V1.4.1 (2005-09). Digital video broadcasting (dvb); interaction channel for satellite distribution systems.

[9] 3rd Generation Partnership Project. Technical Specification Group Radio Access Network. 3gpp tr 38.811. study on new radio (nr) to support non-terrestrial networks.

[10] 3rd Generation Partnership Project. Technical Specification Group Radio Access Network. 3gpp tr 38.821. solutions for nr to support nonterrestrial networks (ntn).

[11] 3rd Generation Partnership Project. Technical Specification Group Radio Access Network. 3gpp tr 38.901. study on channel model for frequencies from 0.5 to 100 ghz.

[12] 3rd Generation Partnership Project. Technical Specification Group Radio Access Network. 3gpp tr 38.300. v:15.2.0. nr; overall description; stage-2., June 2018.

[13] 3rd Generation Partnership Project. Technical Specification Group Radio Access Network. 3gpp tr 38.812. study on non-orthogonal multiple access (noma) for nr (release 16) v16.0.0, December 2018.

[14] 3rd Generation Partnership Project. Technical Specification Group Radio Access Network. 3gpp tr 38.824. v:16.0.0. study on physical layer enhancements for nr ultra-reliable and low latency case (urllc), March 2019.

[15] Rana Abbas, Mahyar Shirvanimoghaddam, Yonghui Li, and Branka Vucetic. A multi-layer grant-free noma scheme for short packet transmissions. In 2018 IEEE Global Communications Conference (GLOBECOM), pages 1-6, 2018.

[16] IEEE P802.11-TASK GROUP AH. http://www.ieee802.org/11/Reports/tgah update.htm.

[17] Godfrey Anuga Akpakwu, Bruno J. Silva, Gerhard P. Hancke, and Adnan M. Abu-Mahfouz. A survey on 5g networks for the internet of things: Communication technologies and challenges. IEEE Access, 6:3619-3647, 2018.

[18] Akram Al-Hourani. Session duration between handovers in dense leo satellite networks. IEEE Wireless Communications Letters, 10(12):2810-2814, 2021.

[19] Kelvin Au, Liging Zhang, Hosein Nikopour, Eric Yi, Alireza Bayesteh, Usa Vilaipornsawai, Jianglei Ma, and Peiying Zhu. Uplink contention based scma for 5g radio access. In 2014 IEEE Globecom Workshops (GC Wkshps), pages 900-905, 2014.

[20] Eren Balevi, Faeik T. Al Rabee, and Richard D. Gitlin. Aloha-noma for massive machine-to-machine iot communication. In 2018 IEEE International Conference on Communications (ICC), pages 1-5, 2018.

[21] Gilberto Berardinelli, Nurul Huda Mahmood, Renato Abreu, Thomas Jacobsen, Klaus Pedersen, Istv'an Z. Kov'acs, and Preben Mogensen. Reliability analysis of uplink grant-free transmission over shared resources. IEEE Access, 6:23602-23611, 2018.pag

[22] C. Berrou, A. Glavieux, and P. Thitimajshima. Near Shannon limit error correcting code and decoding—Turbo Codes (1). In IEE ICC, pages 1064-1070, 1993.

[23] Joe Breen, Andrew Buffmire, Jonathon Duerig, Kevin Dutt, Eric Eide, Mike Hibler, David Johnson, Sneha Kumar Kasera, Earl Lewis, Dustin Maas, Alex Orange, Neal Patwari, Daniel Reading, Robert Ricci, David Schurig, Leigh B. Stoller, Jacobus Van der Merwe, Kirk Webb, and Gary Wong. POWDER: Platform for open wireless data-driven experimental research. In Proceedings of the 14th International Workshop on Wireless Network Testbeds, Experimental Evaluation and Characterization (WiNTECH), September 2020.

[24] Enrico Casini, Riccardo De Gaudenzi, and Oscar Del Rio Herrero. Contention resolution diversity slotted aloha (crdsa): An enhanced random access schemefor satellite access packet networks. IEEE Transactions on Wireless Communications, 6(4):1408-1419, 2007.

[25] Kuor-Hsin Chang and Bob Mason. The IEEE 802.15.4g standard for smart metering utility networks. In IEEE Third International Conference on Smart Grid Communications, SmartGridComm 2012, Tainan, Taiwan, Nov. 5-8, 2012, pages 476-480, 2012.

[26] Min Chen, Yiming Miao, Yixue Hao, and Kai Hwang. Narrow band internet of things. IEEE Access, 5:20557-20577, 2017.

[27] Qian Chen and Jiliang Wang. Aligntrack: Push the limit of LoRa collision decoding. In 2021 IEEE 29th International Conference on Network Protocols (ICNP), pages 1-11, 2021.

[28] Jinho Choi, Jie Ding, Ngoc-Phuc Le, and Zhiguo Ding. Grantfree random access in machine-type communication: Approaches and challenges. IEEE Wireless Communications, 29(1):151-158, 2022.

[29] Xiaoming Dai, Zhenyu Zhang, Baoming Bai, Shanzhi Chen, and Shaohui Sun. Pattern division multiple access: A new multiple access technology for 5g. IEEE Wireless Communications, 25(2):54-60, 2018.

[30] Riccardo De Gaudenzi, Oscar del R'$_{10}$ Herrero, Guray Acar, and Eloi Garrido Barrab'es. Asynchronous contention resolution diversity aloha: Making crdsa truly asynchronous. IEEE Transactions on Wireless Communications, 13(11):6193-6206, 2014.

[31] Oscar Del Rio Herrero and Riccardo De Gaudenzi. High efficiency satellite multiple access scheme for machine-to-machine communications. IEEE Transactions on Aerospace and Electronic Systems, 48(4):2961-2989, 2012.

[32] Rashad Eletreby, Diana Zhang, Swarun Kumar, and Osman Yagan. Empowering low-power wide area networks in urban settings. In Proceedings of the Conference of the ACM Special Interest Group on Data Communication, SIGCOMM 2017, Los Angeles, CA, USA, Aug. 21-25, 2017, pages 309-321. ACM, 2017.

[33] Guillaume Ferr'e and Mohamed Amine Ben Temim. A dual waveform differential chirp spread spectrum transceiver for leo satellite communications. In ICC 2021—IEEE International Conference on Communications, pages 1-6, 2021.

[34] R. Gold. Optimal binary sequences for spread spectrum multiplexing (corresp.). IEEE Transactions on Information Theory, 13(4):619-621, 1967.

[35] T. Heyn, P. Nagel, B. Niemann, A. Recchia, F. Collard, R. Hermenier, M. A. Marchitti, M. Andrenacci, and G. Mendola. E-ssa satellite messaging return channel: Performance analysis and field trials results. In 2012 6th Advanced Satellite Multimedia Systems Conference (ASMS) and 12$^{th}$ Signal Processing for Space Communications Workshop (SPSC), pages 1-6, 2012.

[36] Bin Hu, Zhimeng Yin, Shuai Wang, Zhuqing Xu, and Tian He. SCLoRa: Leveraging multi-dimensionality in decoding collided LoRa transmissions. In 2020 IEEE 28th International Conference on Network Protocols (ICNP), pages 1-11, 2020.

[37] Todd E. Humphreys, Peter A. Iannucci, Zacharias Komodromos, and Andrew M. Graff. Signal structure of the starlink ku-band downlink. arXiv:2210.11578 [ee-ss.SP], October 2022.

[38] Ahan Kak and Ian F. Akyildiz. Large-scale constellation design for the internet of space things/cubesats. In 2019 IEEE Globecom Workshops (GC Wkshps), pages 1-6, 2019.

[39] Mohamed M. Kassem, Aravindh Raman, Diego Perino, and Nishanth Sastry. A browser-side view of starlink connectivity. In IMC, pages 151-158. ACM, 2022.

[40] Jae-Eon Kim, Jihoon Kang, Daeyoung Kim, Younghwoon Ko, and Jungsik Kim. Ieee 802.15.4a css-based localization system for wireless sensor networks. In 2007 IEEE International Conference on Mobile Adhoc and Sensor Systems, pages 1-3, 2007.

[41] Oltjon Kodheli, Abdelrahman Astro, Jorge Querol, Mohammad Gholamian, Sumit Kumar, Nicola Maturo, and Symeon Chatzinotas. Random access procedure over non-terrestrial networks: From theory to practice. IEEE Access, 9:109130-109143, 2021.

[42] Oltjon Kodheli, Eva Lagunas, Nicola Maturo, Shree Krishna Sharma, Bhavani Shankar, Jesus Fabian Mendoza Montoya, Juan Carlos Merlano Duncan, Danilo Spano, Symeon Chatzinotas, Steven Kisseleff, Jorge Querol, Lei Lei, Thang X. Vu, and George Goussetis. Satellite communications in the new space era: A survey and future challenges. IEEE Communications Surveys & Tutorials, 23(1):70-109, 2021.

[43] Chenning Li, Xiuzhen Guo, Longfei Shuangguan, Zhichao Cao, and Kyle Jamieson. CurvingLoRa Implementation. https://github.com/liecn/CurvingLoRa NSDI22.

[44] Chenning Li, Xiuzhen Guo, Longfei Shuangguan, Zhichao Cao, and Kyle Jamieson. Curvinglora to boost lora network throughput via concurrent transmission. In Proceedings of USENIX NSDI, 2022.

[45] Xingqin Lin, Stefan Rommer, Sebastian Euler, Emre A. Yavuz, and Robert S. Karlsson. 5g from space: An overview of 3gpp non-terrestrial networks. IEEE Communications Standards Magazine, 5(4):147-153, 2021.

[46] Nurul Huda Mahmood, Renato Abreu, Ronald B"ohnke, Martin Schubert, Gilberto Berardinelli, and Thomas H. Jacobsen. Uplink grant-free access solutions for urllc services in 5g new radio. In 2019 16th International Symposium on Wireless Communication Systems (ISWCS), pages 607-612, 2019.

[47] Matlab. Model nr ntn channel. https://www.mathworks-.com/help/satcom/ug/model-nr-ntnchannel.html.

[48] Brian McLemore and Mark L. Psiaki. Navigation using doppler shift from leo constellations and ins data. IEEE Transactions on Aerospace and Electronic Systems, 58(5):4295-4314, 2022.

[49] Yugi Mo, Minh-Tien Do, Claire Goursaud, and Jean-Marie Gorce. Uplink capacity derivation for ultra-narrow-band iot wireless networks. Int. J. Wirel. Inf. Networks, 24(3):300-316, 2017.

[50] Remmy Musumpuka, Tom M. Walingo, and J. Macgregor Smith. Performance analysis of correlated handover service in leo mobile satellite systems. IEEE Communications Letters, 20(11):2213-2216, 2016.

[51] Theodore J. Myers. Random phase multiple access system with meshing. U.S. Pat. No. 7,773,664B2, 2008.

[52] Marcel Muller, Julian Lategahn, and Christof R"ohrig. Pedestrian localization using ieee 802.15.4a tdoa wireless sensor network. In 2012 IEEE 1st International Symposium on Wireless Systems (IDAACS-SWS), pages 23-27, 2012.

[53] Thang K. Nguyen, Chuyen T. Nguyen, Hoang D. Le, and Anh T. Pham. Tcp performance over satellite-based hybrid fso/rf vehicular networks: Modeling and analysis. IEEE Access, 9:108426-108440, 2021.

[54] Hosein Nikopour and Hadi Baligh. Sparse code multiple access. In 2013 IEEE 24th Annual International Symposium on Personal, Indoor, and Mobile Radio Communications (PIMRC), pages 332-336, 2013.

[55] Niloofar Okati and Taneli Riihonen. Nonhomogeneous stochastic geometry analysis of massive leo communication constellations. IEEE Transactions on Communications, 70(3):1848-1860, 2022.

[56] Or Ordentlich and Yury Polyanskiy. Low complexity schemes for the random access gaussian channel. In 2017

IEEE International Symposium on Information Theory (ISIT), pages 2528-2532, 2017.

[57] Chol Hyun Park, Phillipe Austria, Yoohwan Kim, and Ju-Yeon Jo. Mptcp performance simulation in multiple leo satellite environment. In 2022 IEEE 12th Annual Computing and Communication Workshop and Conference (CCWC), pages 0895-0899, 2022.

[58] Li Ping, Lihai Liu, Keying Wu, and W. K. Leung. Interleave division multiple-access. IEEE Transactions on Wireless Communications, 5(4):938-947, 2006.

[59]F. S. Prol, et al., Position, navigation, and timing (pnt) through low earth orbit (leo) satellites: A survey on current status, challenges, and opportunities. IEEE Access, 10:83971-84002, 2022.

[60] Yubi Qian, Lu Ma, and Xuwen Liang. The performance of chirp signal used in leo satellite internet of things. IEEE Communications Letters, 23(8):1319-1322, 2019.

[61] Raghav Rathi and Zhenghao Zhang. TnB Implementation. https://github.com/raghavrathi10/TnB.

[62] Raghav Rathi and Zhenghao Zhang. Tnb: resolving collisions in lora based on the peak matching cost and block error correction. In Giuseppe Bianchi and Alessandro Mei, editors, Proceedings of the $18^{th}$ International Conference on emerging Networking EXperiments and Technologies, CoNEXT 2022, Roma, Italy, Dec. 6-9, 2022, pages 401-416. ACM, 2022.

[63] Usman Raza, Parag Kulkarni, and Mahesh Sooriyabandara. Low power wide area networks: An overview. IEEE Communications Surveys and Tutorials, 19(2):855-873, 2017.

[64]A. Reichman. Enhanced spread spectrum aloha (e-ssa), an emerging satellite return link messaging scheme. In 2014 IEEE 28th Convention of Electrical Electronics Engineers in Israel (IEEEI), pages 1-4, 2014.

[65] Harri Saarnisaari and Carlos de Lima. Application of 5g new radio for satellite links with low peak-to-average power ratios. International Journal of Satellite Communications and Networking, 39(4):445-454, 2021.

[66] Muhammad Basit Shahab, Rana Abbas, Mahyar Shirvanimoghaddam, and Sarah J. Johnson. Grant-free non-orthogonal multiple access for iot: A survey. IEEE Communications Surveys & Tutorials, 22(3):1805-1838, 2020.

[67] Muhammad Osama Shahid, Millan Philipose, Krishna Chintalapudi, Suman Banerjee, and Bhuvana Krishnaswamy. Concurrent interference cancellation: decoding multi-packet collisions in LoRa. In Fernando A. Kuipers and Matthew C. Caesar, editors, ACM SIGCOMM 2021 Conference, Virtual Event, USA, Aug. 23-27, 2021, pages 503-515. ACM, 2021.

[68] Chenglong Shao, Osamu Muta, Wenjie Wang, and Wonjun Lee. Toward ubiquitous connectivity via LoRaWAN: An overview of signal collision resolving solutions. IEEE Internet of Things Magazine, 4(4):114-119, 2021.

[69] Xiaoqiang Shao, Chungang Yang, Danyang Chen, Nan Zhao, and F. Richard Yu. Dynamic iot device clustering and energy management with hybrid noma systems. IEEE Transactions on Industrial Informatics, 14(10):4622-4630, 2018.

[70] Mahyar Shirvanimoghaddam, Mischa Dohler, and Sarah J. Johnson. Massive non-orthogonal multiple access for cellular iot: Potentials and limitations. IEEE Communications Magazine, 55(9):55-61, 2017.

[71] Chin-Sean Sum, Mohammad Azizur Rahman, Liru Lu, Fumihide Kojima, and Hiroshi Harada. On communication and interference range of IEEE 802.15.4g smart utility networks. In 2012 IEEE Wireless Communications and Networking Conference, WCNC 2012, Paris, France, Apr. 1-4, 2012, pages 1169-1174, 2012.

[72] Andrew Tanenbaum and David Wetherall. Computer Networks, Global Edition. Pearson, 6 edition, 2022. [73] Telecommunication Industry Association TIA-1008. Ip over satellite, October 2003.

[74] Liying Tian, Tao Liu, and Yubo Li. New constructions of binary golay spreading sequences for uplink grant-free noma. IEEE Communications Letters, 26(10):2480-2484, 2022. [75] Shuai Tong, Jiliang Wang, and Yunhao Liu. Combating packet collisions using non-stationary signal scaling in LPWANs. In MobiSys '20: The 8th Annual International Conference on Mobile Systems, Applications, and Services, Toronto, Ontario, Canada, Jun. 15-19, 2020, pages 234-246. ACM, 2020.

[76] Shuai Tong, Zhenqiang Xu, and Jiliang Wang. CoLoRa: Enabling multipacket reception in LoRa. In 39th IEEE Conference on Computer Communications, INFOCOM 2020, Toronto, ON, Canada, Jul. 6-9, 2020, pages 2303-2311. IEEE, 2020.

[77] Serbulent Tozlu, Murat Senel, Wei Mao, and Abtin Keshavarzian. Wifi enabled sensors for internet of things: A practical approach. IEEE Communications Magazine, 50(6):134-143, 2012.

[78] Mojtaba Vaezi, Amin Azari, Saeed R. Khosravirad, Mahyar Shirvanimoghaddam, M. Mahdi Azari, Danai Chasaki, and Petar Popovski. Cellular, wide-area, and non-terrestrial iot: A survey on 5g advances and the road toward 6g. IEEE Communications Surveys & Tutorials, 24(2):1117-1174, 2022.

[79] Deepak Vasisht, Jayanth Shenoy, and Ranveer Chandra. L2D2: low latency distributed downlink for LEO satellites. In SIGCOMM, pages 151-164. ACM, 2021.

[80] Bichai Wang, Linglong Dai, Talha Mir, and Zhaocheng Wang. Joint user activity and data detection based on structured compressive sensing for noma. IEEE Communications Letters, 20(7):1473-1476, 2016.

[81] Bo Wang, Tong Feng, and Dongyan Huang. A joint computation offloading and resource allocation strategy for leo satellite edge computing system. In 2020 IEEE 20th International Conference on Communication Technology (ICCT), pages 649-655, 2020.

[82] Xiong Wang, Linghe Kong, Liang He, and Guihai Chen. mLoRa: A multi-packet reception protocol in LoRa networks. In 2019 IEEE $27^{th}$ International Conference on Network Protocols (ICNP), pages 1-11, 2019.

[83]Y.-P. Eric Wang, Xingqin Lin, Ansuman Adhikary, Asbj"orn Gr'ovlen, Yutao Sui, Yufei W. Blankenship, Johan Bergman, and Hazhir Shokri-Razaghi. A primer on 3gpp narrowband internet of things. IEEE Communications Magazine, 55(3):117-123, 2017.

[84] Yugi Wang, Jibin Che, Ningyuan Wang, Liang Liu, Nan Wu, Xiaoqing Zhong, and Xiaodong Han. Load-balancing method for leo satellite edge-computing networks based on the maximum flow of virtual links. IEEE Access, 10:100584-100593, 2022.

[85]P Series; Radio wave propagation. Itu-r recommendation p. 681-11 (August 2019). propagation data required for the design systems in the land mobile-satellite service.

[86] Mathieu Xhonneux, Orion Afisiadis, David Bol, and J'er^ome Louveaux. A low-complexity LoRa synchronization algorithm robust to sampling time offsets. IEEE Internet of Things Journal, 9(5):3756-3769, 2022.

[87] Xianjin Xia, Ningning Hou, and Yuanqing Zheng. PCube: Scaling LoRa concurrent transmissions with reception diversities. In ACM Mobicom, 2021.

[88] Xianjin Xia, Yuanqing Zheng, and Tao Gu. FTrack: Parallel decoding for LoRa transmissions. IEEE/ACM Transactions on Networking, 28(6):2573-2586, 2020.

[89] Kexin Xiao, Bin Xia, Zhiyong Chen, Baicen Xiao, Dageng Chen, and Shaodan Ma. On capacity-based codebook design and advanced decoding for sparse code multiple access systems. IEEE Transactions on Wireless Communications, 17(6):3834-3849, 2018.

[90] Zhenqiang Xu, Pengjin Xie, and Jiliang Wang. Pyramid: Real-time LoRa collision decoding with peak tracking. In IEEE INFOCOM 2021—IEEE Conference on Computer Communications, pages 1-9, 2021.

[91] Neng Ye, Xiangming Li, Hanxiao Yu, Aihua Wang, Wenjia Liu, and Xiaolin Hou. Deep learning aided grant-free noma toward reliable low-latency access in tactile internet of things. IEEE Transactions on Industrial Informatics, 15(5):2995-3005, 2019.

[92] Neng Ye, Aihua Wang, Xiangming Li, Wenjia Liu, Xiaolin Hou, and Hanxiao Yu. On constellation rotation of noma with sic receiver. IEEE Communications Letters, 22(3):514-517, 2018.

[93] Neng Ye, Jihong Yu, Aihua Wang, and Rongrong Zhang. Help from space: grant-free massive access for satellite-based iot in the 6g era. Digit. Commun. Networks, 8(2):215-224, 2022.

[94] Hanxiao Yu, Zesong Fei, Nan Yang, and Neng Ye. Optimal design of resource element mapping for sparse spreading non-orthogonal multiple access. IEEE Wireless Communications Letters, 7(5):744-747, 2018.

[95] Quan Yuan, Qing Guo, Zhenyong Wang, and Wenchao Yang. Design of nonorthogonal multiple access systems: An information bottleneck perspective. IEEE Communications Letters, 26(8):1750-1754, 2022.

[96] Zhifeng Yuan, Chunlin Yan, Yifei Yuan, and Weimin Li. Blind multiple user detection for grant-free musa without reference signal. In 2017 IEEE 86th Vehicular Technology Conference (VTC-Fall), pages 1-5, 2017.

[97] Zhifeng Yuan, Guanghui Yu, Weimin Li, Yifei Yuan, Xinhui Wang, and Jun Xu. Multi-user shared access for internet of things. In 2016 IEEE 83rd Vehicular Technology Conference (VTC Spring), pages 1-5, 2016.

REFERENCE LIST #2

[1'] European Telecommunication Standardisation Institute (ETSI) EN 301 790 V1.4.1 (2005-09). Digital video broadcasting (dvb); interaction channel for satellite distribution systems.

[2'] European Telecommunication Standardisation Institute (ETSI) TS 102 721-3 V1.1.1 (2011-12). Satellite earth stations and systems; air interface for s-band mobile interactive multimedia (s-mim). Part 3: Physical layer specification, return link asynchronous access. Available online: https://www.etsi.org/deliver/etsits/102700 102799/10272103/01.01.01 60/ts10272103v010101p.pdf.

[3'] 3rd Generation Partnership Project. Technical Specification Group Radio Access Network. 3gpp tr 38.811. study on new radio (nr) to support non-terrestrial networks.

[4'] 3rd Generation Partnership Project. Technical Specification Group Radio Access Network. 3gpp tr 38.821. solutions for nr to support non-terrestrial networks (ntn).

[5'] 3rd Generation Partnership Project. Technical Specification Group Radio Access Network. 3gpp tr 38.901. study on channel model for frequencies from 0.5 to 100 ghz.

[6'] 3rd Generation Partnership Project. Technical Specification Group Radio Access Network. 3gpp tr 38.300. v:15.2.0. nr; overall description; stage-2., June 2018.

[7'] 3rd Generation Partnership Project. Technical Specification Group Radio Access Network. 3gpp tr 38.812. study on non-orthogonal multiple access (noma) for nr (release 16) v16.0.0, December 2018.

[8'] 3rd Generation Partnership Project. Technical Specification Group Radio Access Network. 3gpp tr 38.824. v:16.0.0. study on physical layer enhancements for nr ultra-reliable and low latency case (urllc), March 2019.

[9'] Rana Abbas, Mahyar Shirvanimoghaddam, Yonghui Li, and Branka Vucetic. A multi-layer grant-free noma scheme for short packet transmissions. In 2018 IEEE Global Communications Conference (GLOBECOM), pages 1-6, 2018.

[10'] Kelvin Au, Liging Zhang, Hosein Nikopour, Eric Yi, Alireza Bayesteh, Usa Vilaipornsawai, Jianglei Ma, and Peiying Zhu. Uplink contention based scma for 5g radio access. In 2014 IEEE Globecom Workshops (GC Wkshps), pages 900-905, 2014.

[11'] Eren Balevi, Faeik T. Al Rabee, and Richard D. Gitlin. Aloha-noma for massive machine-to-machine iot communication. In 2018 IEEE International Conference on Communications (ICC), pages 1-5, 2018.

[12'] Gilberto Berardinelli, Nurul Huda Mahmood, Renato Abreu, Thomas Jacobsen, Klaus Pedersen, Istva'n Z. Kova'cs, and Preben Mogensen. Reliability analysis of uplink grant-free transmission over shared resources. IEEE Access, 6:23602-23611, 2018.

[13'] C. Berrou, A. Glavieux, and P. Thitimajshima. Near Shannon limit error correcting code and decoding—Turbo Codes (1). In IEE ICC, pages 1064-1070, 1993.

[14'] Joe Breen, Andrew Buffmire, Jonathon Duerig, Kevin Dutt, Eric Eide, Mike Hibler, David Johnson, Sneha Kumar Kasera, Earl Lewis, Dustin Maas, Alex Orange, Neal Patwari, Daniel Reading, Robert Ricci, David Schurig, Leigh B. Stoller, Jacobus Van der Merwe, Kirk Webb, and Gary Wong. POWDER: Platform for open wireless data-driven experimental research. In *Proceedings of the 14th International Workshop on Wireless Network Testbeds, Experimental Evaluation and Characterization (WiNTECH)*, September 2020.

[15'] Enrico Casini, Riccardo De Gaudenzi, and Oscar Del Rio Herrero. Contention resolution diversity slotted aloha (crdsa): An enhanced random access scheme for satellite access packet networks. *IEEE Transactions on Wireless Communications,* 6(4):1408-1419, 2007.

[16'] Jinho Choi, Jie Ding, Ngoc-Phuc Le, and Zhiguo Ding. Grant-free random access in machine-type communication: Approaches and challenges. *IEEE Wireless Communications,* 29(1):151-158, 2022.

[17'] Xiaoming Dai, Zhenyu Zhang, Baoming Bai, Shanzhi Chen, and Shaohui Sun. Pattern division multiple access: A new multiple access technology for 5g. *IEEE Wireless Communications,* 25(2):54-60, 2018.

[18'] Riccardo De Gaudenzi, Oscar del R'$_{10}$ Herrero, Guray Acar, and Eloi Garrido Barrabe's. Asynchronous contention resolution diversity aloha: Making crdsa truly asynchronous. *IEEE Transactions on Wireless Communications,* 13(11):6193-6206, 2014.

[19'] Oscar Del Rio Herrero and Riccardo De Gaudenzi. High efficiency satellite multiple access scheme for machine-to-machine communications. *IEEE Transactions on Aerospace and Electronic Systems,* 48(4):2961-2989, 2012.

[20'] G. Gallinaro, N. Alagha, R. De Gaudenzi, K. Kansanen, R. Müller, and P. Salvo Rossi. Me-ssa: An advanced random access for the satellite return channel. In 2015 *IEEE International Conference on Communications (ICC)*, pages 856-861, 2015.

[21'] Riccardo De Gaudenzi, Oscar del Rio Herrero, Gennaro Gallinaro, Stefano Cioni, and Pantelis-Daniel M. Arapoglou. Random access schemes for satellite networks, from VSAT to M2M: a survey. *Int. J. Satell. Commun. Netw.*, 36(1):66-107, 2018.

[22'] R. Gold. Optimal binary sequences for spread spectrum multiplexing (corresp.). *IEEE Transactions on Information Theory*, 13(4):619-621, 1967.

[23'] T. Heyn, P. Nagel, B. Niemann, A. Recchia, F. Collard, R. Hermenier, M. A. Marchitti, M. Andrenacci, and G. Mendola. E-ssa satellite messaging return channel: Performance analysis and field trials results. In 2012 *6th Advanced Satellite Multimedia Systems Conference (ASMS) and 12th Signal Processing for Space Communications Workshop (SPSC)*, pages 1-6, 2012.

[24'] Todd E. Humphreys, Peter A. Iannucci, Zacharias Komodromos, and Andrew M. Graff. Signal structure of the starlink ku-band downlink. arXiv:2210.11578 [eess.SP'], October 2022.

[25'] Agostino Isca, Nader Alagha, Riccardo Andreotti, and Marco Andrenacci. Recent advances in design and implementation of satellite gateways for massive uncoordinated access networks. *Sensors*, 22(2), 2022.

[26'] Oltjon Kodheli, Abdelrahman Astro, Jorge Querol, Mohammad Gholamian, Sumit Kumar, Nicola Maturo, and Symeon Chatzinotas. Random access procedure over non-terrestrial networks: From theory to practice. *IEEE Access*, 9:109130-109143, 2021.

[27'] Oltjon Kodheli, Eva Lagunas, Nicola Maturo, Shree Krishna Sharma, Bhavani Shankar, Jesus Fabian Mendoza Montoya, Juan Carlos Merlano Duncan, Danilo Spano, Symeon Chatzinotas, Steven Kisseleff, Jorge Querol, Lei Lei, Thang X. Vu, and George Goussetis. Satellite communications in the new space era: A survey and future challenges. *IEEE Communications Surveys & Tutorials*, 23(1):70-109, 2021.

[28'] Xingqin Lin, Stefan Rommer, Sebastian Euler, Emre A. Yavuz, and Robert S. Karlsson. 5g from space: An overview of 3gpp non-terrestrial networks. *IEEE Communications Standards Magazine*, 5(4):147-153, 2021.

[29'] Nurul Huda Mahmood, Renato Abreu, Ronald Böhnke, Martin Schubert, Gilberto Berardinelli, and Thomas H. Jacobsen. Uplink grant-free access solutions for urllc services in 5g new radio. In 2019 *16th International Symposium on Wireless Communication Systems (ISWCS)*, pages 607-612, 2019.

[30'] Matlab. Model nr ntn channel. https://www.mathworks.com/help/satcom/ug/model-nr-ntn-channel.html.

[31'] Hosein Nikopour and Hadi Baligh. Sparse code multiple access. In 2013 *IEEE 24th Annual International Symposium on Personal, Indoor, and Mobile Radio Communications (PIMRC)*, pages 332-336, 2013.

[32'] Alan W. Nordstrom and John P. Robinson. An optimum nonlinear code. *Information and Control*, 11(5-6):613-616, 1967.

[33'] Or Ordentlich and Yury Polyanskiy. Low complexity schemes for the random access gaussian channel. In 2017 *IEEE International Symposium on Information Theory (ISIT)*, pages 2528-2532, 2017.

[34'] Imtiaz Parvez, Ali Rahmati, Ismail Guvenc, Arif I. Sarwat, and Huaiyu Dai. A survey on low latency towards 5g: Ran, core network and caching solutions. *IEEE Communications Surveys & Tutorials*, 20(4):3098-3130, 2018.

[35'] Li Ping, Lihai Liu, Keying Wu, and W. K. Leung. Interleave division multiple-access. *IEEE Transactions on Wireless Communications*, 5(4):938-947, 2006.

[36'] A. Reichman. Enhanced spread spectrum aloha (e-ssa), an emerging satellite return link messaging scheme. In 2014 *IEEE 28th Convention of Electrical Electronics Engineers in Israel (IEEEI)*, pages 1-4, 2014.

[37'] Harri Saarnisaari and Carlos de Lima. Application of 5g new radio for satellite links with low peak-to-average power ratios. *International Journal of Satellite Communications and Networking*, 39(4):445-454, 2021.

[38'] Muhammad Basit Shahab, Rana Abbas, Mahyar Shirvanimoghaddam, and Sarah J. Johnson. Grant-free non-orthogonal multiple access for iot: A survey. *IEEE Communications Surveys & Tutorials*, 22(3):1805-1838, 2020.

[39'] Xiaoqiang Shao, Chungang Yang, Danyang Chen, Nan Zhao, and F. Richard Yu. Dynamic iot device clustering and energy management with hybrid noma systems. *IEEE Transactions on Industrial Informatics*, 14(10):4622-4630, 2018.

[40'] Mahyar Shirvanimoghaddam, Mischa Dohler, and Sarah J. Johnson. Massive non-orthogonal multiple access for cellular iot: Potentials and limitations. *IEEE Communications Magazine*, 55(9):55-61, 2017.

[41'] Andrew Tanenbaum and David Wetherall. *Computer Networks, Global Edition. Pearson*, 6 edition, 2022.

[42'] Telecommunication Industry Association TIA-1008. Ip over satellite, October 2003.

[43'] Liying Tian, Tao Liu, and Yubo Li. New constructions of binary golay spreading sequences for uplink grant-free noma. *IEEE Communications Letters*, 26(10):2480-2484, 2022.

[44'] Mojtaba Vaezi, Amin Azari, Saeed R. Khosravirad, Mahyar Shirvanimoghaddam, M. Mahdi Azari, Danai Chasaki, and Petar Popovski. Cellular, wide-area, and non-terrestrial iot: A survey on 5g advances and the road toward 6g. *IEEE Communications Surveys & Tutorials*, 24(2):1117-1174, 2022.

[45'] A. Vardy. The nordstrom-robinson code: representation over gf(4) and efficient decoding. *IEEE Transactions on Information Theory*, 40(5):1686-1693, 1994.

[46'] Bichai Wang, Linglong Dai, Talha Mir, and Zhaocheng Wang. Joint user activity and data detection based on structured compressive sensing for noma. *IEEE Communications Letters*, 20(7):1473-1476, 2016.

[47'] P Series; Radio wave propagation. Itu-r recommendation p. 681-11 (August 2019). propagation data required for the design systems in the land mobile-satellite service.

[48'] Kexin Xiao, Bin Xia, Zhiyong Chen, Baicen Xiao, Dageng Chen, and Shaodan Ma. On capacity-based codebook design and advanced decoding for sparse code multiple access systems. *IEEE Transactions on Wireless Communications*, 17(6):3834-3849, 2018.

[49'] Neng Ye, Xiangming Li, Hanxiao Yu, Aihua Wang, Wenjia Liu, and Xiaolin Hou. Deep learning aided grant-free noma toward reliable low-latency access in tactile internet of things. *IEEE Transactions on Industrial Informatics*, 15(5):2995-3005, 2019.

[50'] Neng Ye, Aihua Wang, Xiangming Li, Wenjia Liu, Xiaolin Hou, and Hanxiao Yu. On constellation rotation of noma with sic receiver. *IEEE Communications Letters*, 22(3):514-517, 2018.

[51'] Neng Ye, Jihong Yu, Aihua Wang, and Rongrong Zhang. Help from space: grant-free massive access for satellite-based iot in the 6g era. *Digit. Commun. Networks,* 8(2):215-224, 2022.

[52'] Hanxiao Yu, Zesong Fei, Nan Yang, and Neng Ye. Optimal design of resource element mapping for sparse spreading non-orthogonal multiple access. *IEEE Wireless Communications Letters,* 7(5):744-747, 2018.

[52'] Quan Yuan, Qing Guo, Zhenyong Wang, and Wenchao Yang. Design of nonorthogonal multiple access systems: An information bottleneck perspective. *IEEE Communications Letters,* 26(8):1750-1754, 2022.

[53'] Zhifeng Yuan, Chunlin Yan, Yifei Yuan, and Weimin Li. Blind multiple user detection for grant-free musa without reference signal. In 2017 *IEEE 86th Vehicular Technology Conference (VTC-Fall),* pages 1-5, 2017.

[54'] Zhifeng Yuan, Guanghui Yu, Weimin Li, Yifei Yuan, Xinhui Wang, and Jun Xu. Multi-user shared access for internet of things. In 2016 *IEEE 83rd Vehicular Technology Conference (VTC Spring),* pages 1-5, 2016.

REFERENCE LIST #3

[1"] LoRaWAN 1.1 specification. https://www.lora-alliance-.org/resource-hub/lorawantm-specification-v11.

[2"] Powder (the Platform for Open Wireless Data-driven Experimental Research). https://powderwireless.net/.

[3"] European Telecommunication Standardisation Institute (ETSI) TS 102 721-3 V1.1.1 (2011-12). Satellite earth stations and systems; air interface for s-band mobile interactive multimedia (s-mim). part 3: Physical layer specification, return link asynchronous access. available online: https://www.etsi.org/deliver/etsi ts/102700 102799/10272103/01.01.01 60/ts 10272103v010101p.pdf.

[4"] 3rd Generation Partnership Project. Technical Specification Group Radio Access Network. 3gpp tr 38.811. study on new radio (nr) to support non-terrestrial networks.

[5"] 3rd Generation Partnership Project. Technical Specification Group Radio Access Network. 3gpp tr 38.821. solutions for nr to support non-terrestrial networks (ntn).

[6"] 3rd Generation Partnership Project. Technical Specification Group Radio Access Network. 3gpp tr 38.901. study on channel model for frequencies from 0.5 to 100 ghz.

[7"] Enrico Casini, Riccardo De Gaudenzi, and Oscar Del Rio Herrero. Contention resolution diversity slotted aloha (crdsa): An enhanced random access schemefor satellite access packet networks. IEEE Transactions on Wireless Communications, 6(4):1408-1419, 2007.

[8"] Hua-Min Chen, Peng Wang, Sijia Li, Shaofu Lin, Zhuwei Wang, and Chao Fang. A novel preamble design for 5g enabled leo nonterrestrial networks. In GLOBECOM 2022-2022 IEEE Global Communications Conference, pages 680-686, 2022.

[9"] Riccardo De Gaudenzi, Oscar del R'$_{10}$ Herrero, Guray Acar, and Eloi Garrido Barrab'es. Asynchronous contention resolution diversity aloha: Making crdsa truly asynchronous. IEEE Transactions on Wireless Communications, 13(11):6193-6206, 2014.

[10"] Oscar Del Rio Herrero and Riccardo De Gaudenzi. High efficiency satellite multiple access scheme for machine-to-machine communications. IEEE Transactions on Aerospace and Electronic Systems, 48(4):2961-2989, 2012.

[11"] Riccardo De Gaudenzi, Oscar del Rio Herrero, Gennaro Gallinaro, Stefano Cioni, and Pantelis-Daniel M. Arapoglou. Random access schemes for satellite networks, from VSAT to M2M: a survey. Int. J. Satell. Commun. Netw., 36(1):66-107, 2018.

[12"] T. Heyn, P. Nagel, B. Niemann, A. Recchia, F. Collard, R. Hermenier, M. A. Marchitti, M. Andrenacci, and G. Mendola. E-ssa satellite messaging return channel: Performance analysis and field trials results. In 2012 6th Advanced Satellite Multimedia Systems Conference (ASMS) and 12th Signal Processing for Space Communications Workshop (SPSC), pages 1-6, 2012.

[13"] Agostino Isca, Nader Alagha, Riccardo Andreotti, and Marco Andrenacci. Recent advances in design and implementation of satellite gateways for massive uncoordinated access networks. Sensors, 22(2), 2022.

[14"] Talha Ahmed Khan and Xingqin Lin. Random access preamble design for 3gpp non-terrestrial networks. In 2021 IEEE Globecom Workshops (GC Wkshps), pages 1-5,2021.

[15"] Jae-Eon Kim, Jihoon Kang, Daeyoung Kim, Younghwoon Ko, and Jungsik Kim. Ieee 802.15.4a css-based localization system for wireless sensor networks. In 2007 IEEE International Conference on Mobile Adhoc and Sensor Systems, pages 1-3, 2007.

[16"] Oltjon Kodheli, Abdelrahman Astro, Jorge Querol, Mohammad Gholamian, Sumit Kumar, Nicola Maturo, and Symeon Chatzinotas. Random access procedure over non-terrestrial networks: From theory to practice. IEEE Access, 9:109130-109143, 2021.

[17"] Oltjon Kodheli, Eva Lagunas, Nicola Maturo, Shree Krishna Sharma, Bhavani Shankar, Jesus Fabian Mendoza Montoya, Juan Carlos Merlano Duncan, Danilo Spano, Symeon Chatzinotas, Steven Kisseleff, Jorge Querol, Lei Lei, Thang X. Vu, and George Goussetis. Satellite communications in the new space era: A survey and future challenges. IEEE Communications Surveys & Tutorials, 23(1):70-109, 2021.

[18"] Xingqin Lin, Stefan Rommer, Sebastian Euler, Emre A. Yavuz, and Robert S. Karlsson. 5g from space: An overview of 3gpp nonterrestrial networks. IEEE Communications Standards Magazine, 5(4):147-153, 2021.

[19"] Matlab. Model nr ntn channel. https://www.mathworks.com/help/satcom/ug/model-nr-ntnchannel.html.

[20"] Marcel M"uller, Julian Lategahn, and Christof R*ohrig. Pedestrian localization using ieee 802.15.4a tdoa wireless sensor network. In 2012 IEEE 1st International Symposium on Wireless Systems (IDAACS-SWS), pages 23-27, 2012.

[21"] Arie Reichman. Enhanced spread spectrum aloha (e-ssa), an emerging satellite return link messaging scheme. In 2014 IEEE 28th Convention of Electrical & Electronics Engineers in Israel (IEEEI), pages 1-4, 2014.

[22"] Harri Saarnisaari and Carlos de Lima. Application of 5g new radio for satellite links with low peak-to-average power ratios. International Journal of Satellite Communications and Networking, 39(4):445-454, 2021.

[23"] Starlink. Starlink specifications. https://www.starlink-.com/legal/documents/DOC-1002-69942-69.

[24"] P Series; Radio wave propagation. Itu-r recommendation p. 681-11 (August 2019). propagation data required for the design systems in the land mobile-satellite service.

[25"] Mathieu Xhonneux, Orion Afisiadis, David Bol, and J'er^ome Louveaux. A low-complexity lora synchronization algorithm robust to sampling time offsets. IEEE Internet of Things Journal, 9(5):3756-3769, 2022.

[26"] Li Zhen, Shuchang Li, Wenjing Wang, Yue Wang, Guangyue Lu, Jing Jiang, and Keping Yu. Prach in self-powered satellite internet of things: Low-cubic metric preamble design and detection. IEEE Sensors Journal, 23(18):20882-20893, 2023.

[27"] Zuxiang Zheng, Dongdong Wang, Lizhe Liu, Bin Wang, and Chenhua Sun. Robust random access preamble detection scheme for 5g integrated leo satellite communication systems. In 2022 IEEE 22nd International Conference on Communication Technology (ICCT), pages 463-467, 2022.

What is claimed is:

1. A method for modulating digital or waveform data for transmission in satellite-or long-distance-communication, the method comprising:

modulating, via a signal processing circuit of a transmitter or a transceiver, data in a packet to generate a chirp modulated waveform to be transmitted by applying chirp modulation to a waveform representing the data, wherein the packet includes a preamble, a physical layer (PHY) header, and the data, and wherein the preamble includes an upchirp followed by a downchirp both with spreading factor SF+2, where SF is the spreading factor used in the data modulation;

further modulating, via the signal processing circuit of the transmitter or the transceiver, the chirp modulated waveform with one or a set of z-transform binary sequences of a same length, to generate a z-transformed chirp-modulated waveform, wherein each z-transform binary sequence is a concatenation of a plurality of data symbols, each symbol having one or more network elements arranged in a predefined patterns; and transmitting, via the transmitter or the transceiver, the packet having the generated z-transformed chirp-modulated waveform to a receiver or another receiver, wherein the generated z-transformed chirp-modulated waveform includes the plurality of data symbols.

2. The method of claim 1, wherein the length of the preamble is the same as 8 data symbols.

3. The method of claim 1, wherein symbols in the PHY header are modulated only with a shift modulation and encoded with a Reed-Solomon (RS) code with coding rate 1/2.

4. The method of claim 3, wherein the modulated symbols are modulated with a special binary vector generated according to a Gold sequence.

5. The method of claim 3, wherein the chirp modulation includes a shifted chirp signal C cyclically shifted k times ($C_k$).

6. The method of claim 3, wherein the modulating is performed according to phase t, shift k, and Z sequence h, wherein a modulated symbol is where $0 \leq t < 4$, $0 \leq k < N$, and $0 \leq h < G$ and the modulated symbol is $\Omega_{t,k,h} = e^{(it\pi)/2} Ck \odot Z^h$, where $Z^h$ denotes Z sequence h for $0 \leq h < G$.

7. The method of claim 1, wherein the PHY header includes information of the packet, including the packet length followed by cyclic redundancy check (CRC) bits.

8. The method of claim 1, where a number of symbols in the PHY header is a constant for a given SF, which is 8 if SF≤7 and 6 for other SFs.

9. The method of claim 1, wherein an element in a symbol of a codebook for the data has possible values from a quadrature phase shift keying (QPSK) constellation.

10. The method of claim 1 further comprising:

demodulating data in the packet, wherein a possible symbol waveform is a code vector that is almost orthogonal in that a norm of an inner product is not 0 but a small number.

11. The method of claim 10, wherein each code vector is a concatenation of 4 segment vectors each of length N/4, wherein N is a length of a chirp for the chirp modulation.

12. The method of claim 10, wherein the demodulating of the data employs a partial inner product that is first computed between each of length N/4 and corresponding segment vectors, wherein results of the partial inner products are then added together to obtain a full inner product result.

13. The method of claim 1, wherein the chirp modulation includes a chirp comprising a complex vector with a constant magnitude and linearly increasing frequency.

14. The method of claim 1, wherein the chirp modulation includes a chirp concatenated with a conjugate of the chirp.

15. The method of claim 14 further comprising:

performing a coarse estimation of a received signal to determine presence of a packet;

performing a fine estimation of packet parameters for each detected packet determined from the coarse estimation.

16. The method of claim 15 comprising:

determining a path delay and path gain for each detected packet.

17. The method of claim 1, wherein the transmission is performed asynchronously and without a handshake operation with the receiver.

18. A non-transitory computer readable medium comprising instructions that, when executed by a processor of a processing system, cause the processing system to:

modulate, via a signal processing circuit of a transmitter or a transceiver, data in a packet to be transmitted by applying chirp modulation to a waveform representing the data, wherein the packet includes a preamble, a physical layer (PHY) header, and the data, and wherein the preamble includes an upchirp followed by a downchirp both with spreading factor SF+2, where SF is the spreading factor used in the data modulation;

further modulate, via the signal processing circuit of the transmitter or the transceiver, the chirp modulated waveform with one or a set of z-transform binary sequences of a same length, to generate a z-transformed chirp-modulated waveform, wherein each z-transform binary sequence is a concatenation of a plurality of data symbols, each symbol having one or more network elements arranged in a predefined patterns; and transmit, via the transmitter or the transceiver, the packet having the generated z-transformed chirp-modulated waveform to a receiver or another receiver, wherein the generated z-transformed chirp-modulated waveform includes the plurality of data symbols.

19. A system for transmitting or receiving data, comprising:

a memory comprising executable instructions; and a processor configured to execute the executable instructions and cause the system to:

modulate, via a signal processing circuit of a transmitter or a transceiver, data in a packet to be transmitted by applying chirp modulation to a waveform representing the data, wherein the packet includes a preamble, a physical layer (PHY) header, and the data, and wherein the preamble includes an upchirp followed by a downchirp both with spreading factor SF+2, where SF is the spreading factor used in the data modulation;

further modulate, via the signal processing circuit of the transmitter or the transceiver, the chirp modulated waveform with one or a set of z-transform binary sequences of a same length, to generate a z-transformed chirp-modulated waveform in the packet, wherein each z-transform binary sequence is a concatenation of a plurality of data symbols, each symbol having one or more network elements arranged in a predefined patterns; and transmit, via the transmitter or the transceiver, the packet having the generated z-transformed chirp-modulated waveform to a receiver or another receiver, wherein the generated z-transformed chirp-modulated waveform includes the plurality of data symbols.

\* \* \* \* \*